United States Patent

Taussig et al.

[11] Patent Number: 5,179,270
[45] Date of Patent: Jan. 12, 1993

[54] SCANNER SYSTEM INTERFACE

[75] Inventors: Andrew P. Taussig; Nicholas N. Tabet, both of Eugene; Blake L. Isaacs, Springfield, all of Oreg.

[73] Assignee: Spectra-Physics, Inc., San Jose, Calif.

[21] Appl. No.: 348,861

[22] Filed: May 8, 1989

[51] Int. Cl.$^5$ .............................................. G06K 7/10
[52] U.S. Cl. .................................. 235/462; 235/472; 235/383
[58] Field of Search .............. 235/383, 385, 462, 472, 235/375

[56] References Cited

U.S. PATENT DOCUMENTS

| | | | |
|---|---|---|---|
| 3,986,169 | 10/1976 | Kobayashi et al. | 340/146.1 |
| 4,068,213 | 1/1978 | Nakamura | 235/381 |
| 4,415,065 | 11/1983 | Sandstedt | 186/39 |
| 4,434,472 | 2/1984 | Kachun | 364/900 |
| 4,525,788 | 6/1985 | Gottlieb et al. | 364/478 |
| 4,569,421 | 2/1986 | Sandstedt | 186/39 |
| 4,621,325 | 11/1986 | Naftzger et al. | 364/406 |
| 4,639,727 | 1/1987 | Blasius et al. | 340/825.57 |
| 4,654,793 | 3/1987 | Elrod | 364/401 |
| 4,656,344 | 4/1987 | Mergenthaler et al. | 235/462 |
| 4,716,281 | 12/1987 | Amacher et al. | 235/383 |
| 4,734,858 | 3/1988 | Schlafly | 364/408 |
| 4,766,581 | 8/1988 | Korn et al. | 369/30 |
| 4,805,175 | 2/1989 | Knowles | 372/24 |
| 4,841,442 | 6/1989 | Hosayama | 364/405 |
| 4,855,581 | 8/1989 | Mertel et al. | 235/463 X |
| 4,855,908 | 8/1989 | Shimoda et al. | 364/405 |
| 4,879,650 | 11/1989 | Kurimoto et al. | 364/405 |
| 4,894,522 | 1/1990 | Elliott | 235/472 |

FOREIGN PATENT DOCUMENTS 0094571 11/1983 European Pat. Off. .
WO88/03685 5/1988 PCT Int'l Appl. .

Primary Examiner—Eugene R. LaRoche
Assistant Examiner—Tan Nguyen
Attorney, Agent, or Firm—Killworth, Gottman, Hagan & Schaeff

[57] ABSTRACT

An optical scanner for use at a checkout counter determines information relating to products to be purchased, including coded label data. The scanner supplies the information to a cash register system. The scanner includes a scanner controller for reading coded labels on the products. The scanner further includes an interface circuit, mounted in said scanner and receiving power therefrom, for providing coded label data to said cash register system.

10 Claims, 5 Drawing Sheets

SCANNER SYSTEM INTERFACE

BACKGROUND OF THE INVENTION

The present invention relates generally to a scanner system and an interface for data gathering systems of the type used at point of sale checkout counters. More particularly, the present invention relates to a scanner having an improved interface for providing communications between an optical scanner and a host system, such as for example an IBM 4683 cash register system, to facilitate the transfer of data from the scanner to the cash register system.

Supermarket checkout counters commonly include optical scanners mounted therein for optically scanning bar code labels on products to be purchased as the products are moved over scanning windows in the top surfaces of the scanners. Such a scanner reads the bar code labels and transmits the bar code data to the cash register system via an interface which in the past has been a separate, external system component. The bar code data may include product identification and pricing information which is used for the sale and other mechandising purposes, such as inventory control.

In the past there has been considerable difficulty in interfacing bar code scanners of this type with certain cash register systems. The requirement of a separate, external interface circuit has increased the cost and complexity of such systems. Specifically noted as a difficult cash register system to link via an interface is the IBM 4683 Cash Register System. The specifications regarding communication with this system are unique and exacting. In the past it has been common to provide a separate, external interface to reconfigure data prior to its submission to the 4683 Cash Register System. Further, such a separate system has typically required its own, separate power supply.

It is seen, however, that there is a need for an improved interface for use with bar code scanners and cash register systems, and for such an interface which is capable of receiving power from any of several sources.

SUMMARY OF THE INVENTION

This need is met by an optical scanner according to the present invention for determining information relating to products to be purchased and providing such information to a cash register system. The scanner scans coded labels on the products and provides a signal indicative of the coded label data. The scanner includes scanning controller means, mounted in and responsive to the optical scanner, for identifying the data on the bar code labels; and interface means, mounted in the optical scanner and responsive to the scanning controller means, for providing coded label data to the cash register system.

The scanning controller means includes a bar code decoder circuit for decoding scan signals to provide coded label data. The scanning controller means also includes a scanner microprocessor for correlating coded label data and supplying the coded label data to the common interface circuit, and scanner memory means for storing control software for use by the scanner microprocessor.

The interface means comprises an interface microprocessor, responsive to coded label data from the scanning controller means; interface memory means for storing control software for use by the interface microprocessor; and a driver circuit, responsive to the interface microprocessor, for supplying coded label data to the cash register system.

A power means provides power to the interface means. The interface power means providing power from the scanner as long as such power is available and, subsequently, provides power for the interface from the cash register system.

An optical scanner for use at a checkout counter to determine information relating to products to be purchased, including coded label data, and to supply the information to a cash register system, comprises a scanner controller for reading coded labels on the products, and an interface circuit, mounted in the scanner and receiving power therefrom, for providing coded label data to the cash register system.

An interface power means provides power to the interface means from the scanner as long as such power is available and, subsequently, provides power for the interface from the cash register system. The scanner controller includes a bar code decoder circuit for decoding scan signals to provide coded label data, a scanner microprocessor for correlating coded label data and supplying the coded label data to the interface circuit, and memory means for storing control software for use by the scanner microprocessor. The interface circuit comprises an interface microprocessor, responsive to coded label data from the optical scanning means, memory means for storing control software for use by the interface microprocessor, and a driver circuit, responsive to the interface microprocessor, for providing coded label data to the cash register system.

Accordingly, it is an object of the present invention to provide a scanner capable of communicating directly with a cash register system; to provide such a scanner including an internal interface; to provide such a scanner including an interface which may receive its power from either the scanner or the cash register system; and to provide such a scanner in which the interface includes a programmed microprocessor to facilitate interface operation.

Other objects and advantages of the invention will be apparent from the following description, the accompanying drawings and the appended claims.

DETAILED DESCRIPTION OF THE PREFERRED EMBODIMENT

Figure 1:
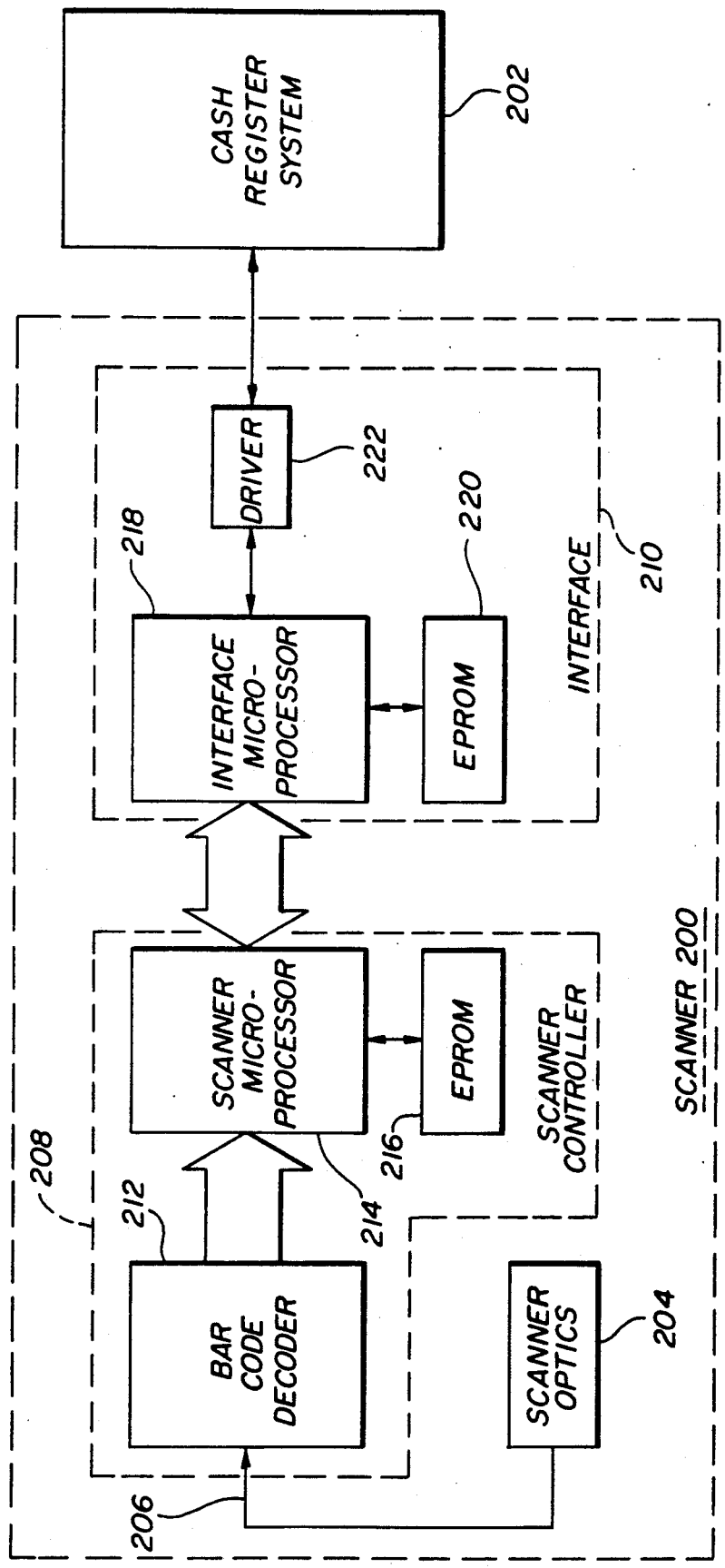
FIG. 1 is an electrical schematic representation of the scanner controller, interface circuit, and associated circuitry, which provides weight data and coded label data to the cash register system.

Reference is made to FIG. 1 of the drawings which illustrates schematically an optical scanner 200 according to the present invention for determining information relating to products to be purchased and providing such information to a cash register system 202. The scanner 200 scans coded labels on the products and the scanner optics 204 of conventional construction provide a signal on line 206 indicative of the coded label data. The scanner 200 includes scanning controller means 208, mounted in the optical scanner 200 and responsive thereto, for identifying the data on the bar code labels. The scanner 200 further includes interface means 210, mounted in the optical scanner 200, and responsive to the scanning controller means 208, for providing coded label data to the cash register system 202, which may be an IBM Model 4683 cash register system.

The optical scanner controller 208 includes a bar code decoder circuit 212 for decoding scan signals to provide coded label data. Circuit 212, preferably an NCR VLSI decoder circuit, in combination with gate array and timer circuit 224, decodes label segment data received on line 206. Scanner microprocessor 214 correlates the coded label data received from circuit 212 and supplies the coded label data to the interface circuit 210 under control of control software stored in scanner memory means 216, preferably comprising an EPROM. Scanner microprocessor 214 is preferably an INTEL 8039 microprocessor.

The interface circuit 210 comprises an interface microprocessor 218, responsive to coded label data from the scanner controller 214. Microprocessor 218 is preferably a ZILOG Super8 microprocessor. Interface circuit 210 also includes an interface memory means 220, preferably an EPROM, for storing control software for use by the interface microprocessor 218. A driver circuit 222 is responsive to the interface microprocessor 218 for supplying weight data and coded label data to the cash register system 202.

Figure 2A:
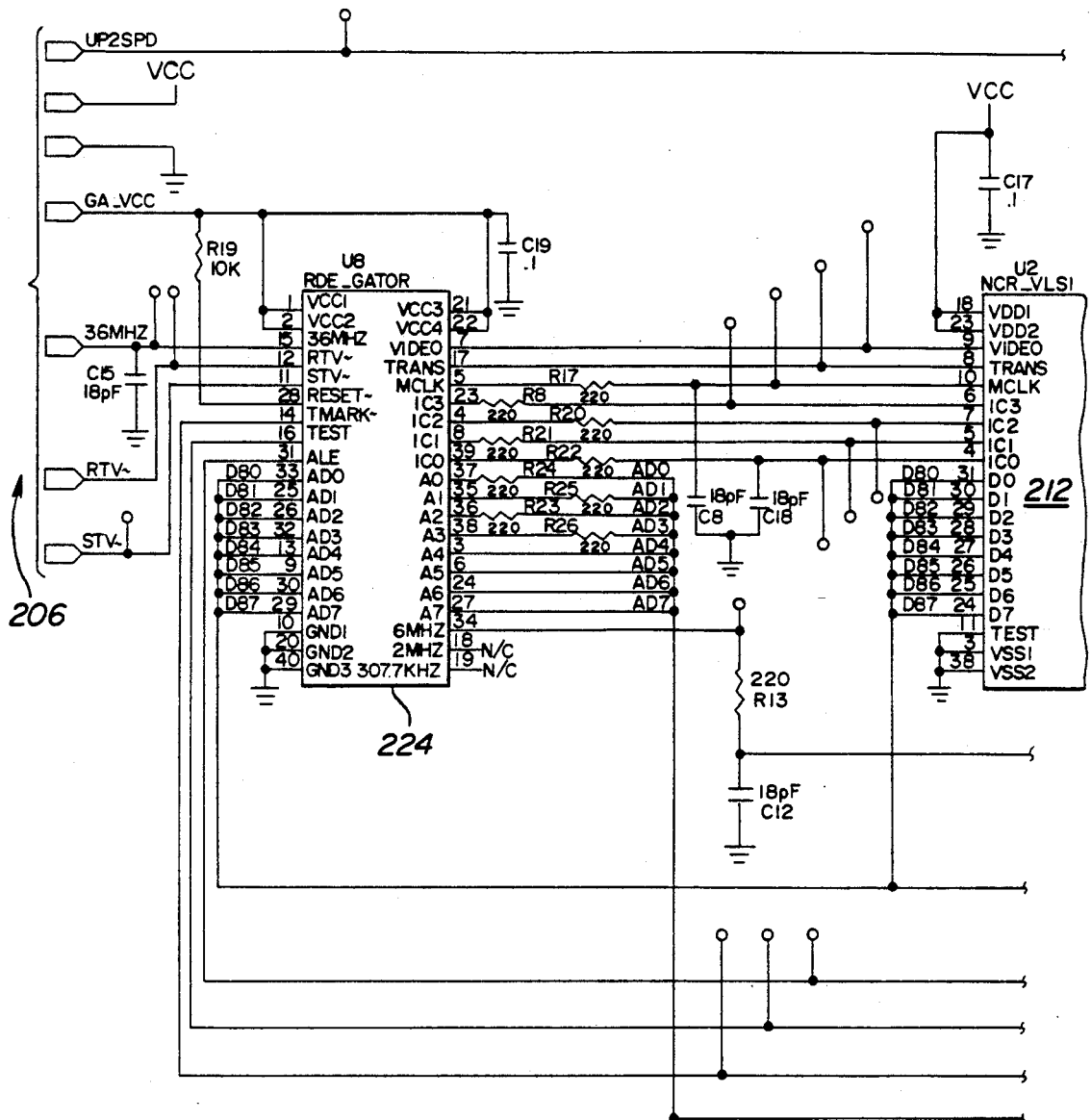
FIGS. 2A and 2B, when assembled with FIG. 2A to the left of FIG. 2B, represent schematically the scanner controller of FIG. 1 in greater detail.
Figure 2A:
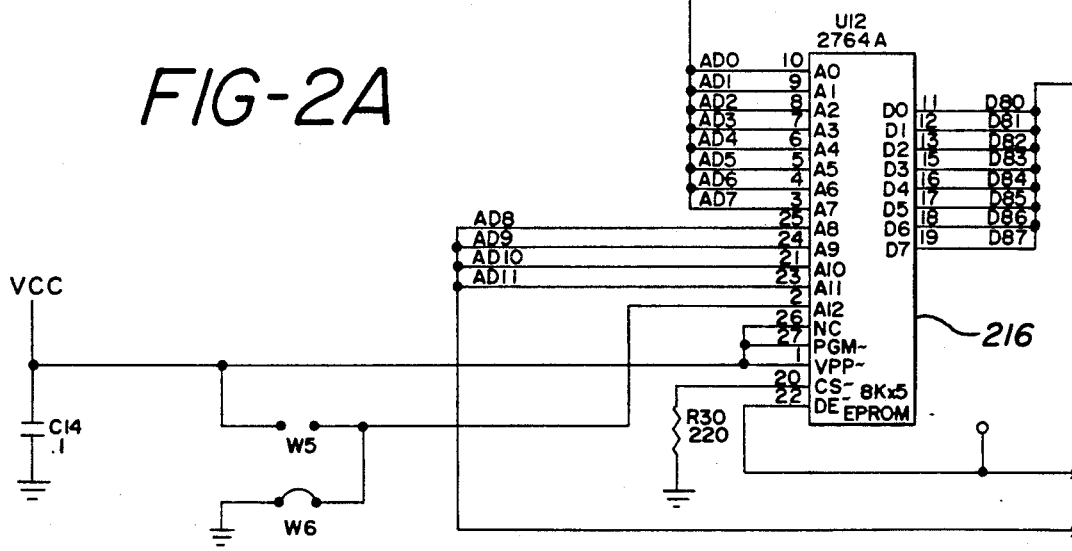
Figure 2B:
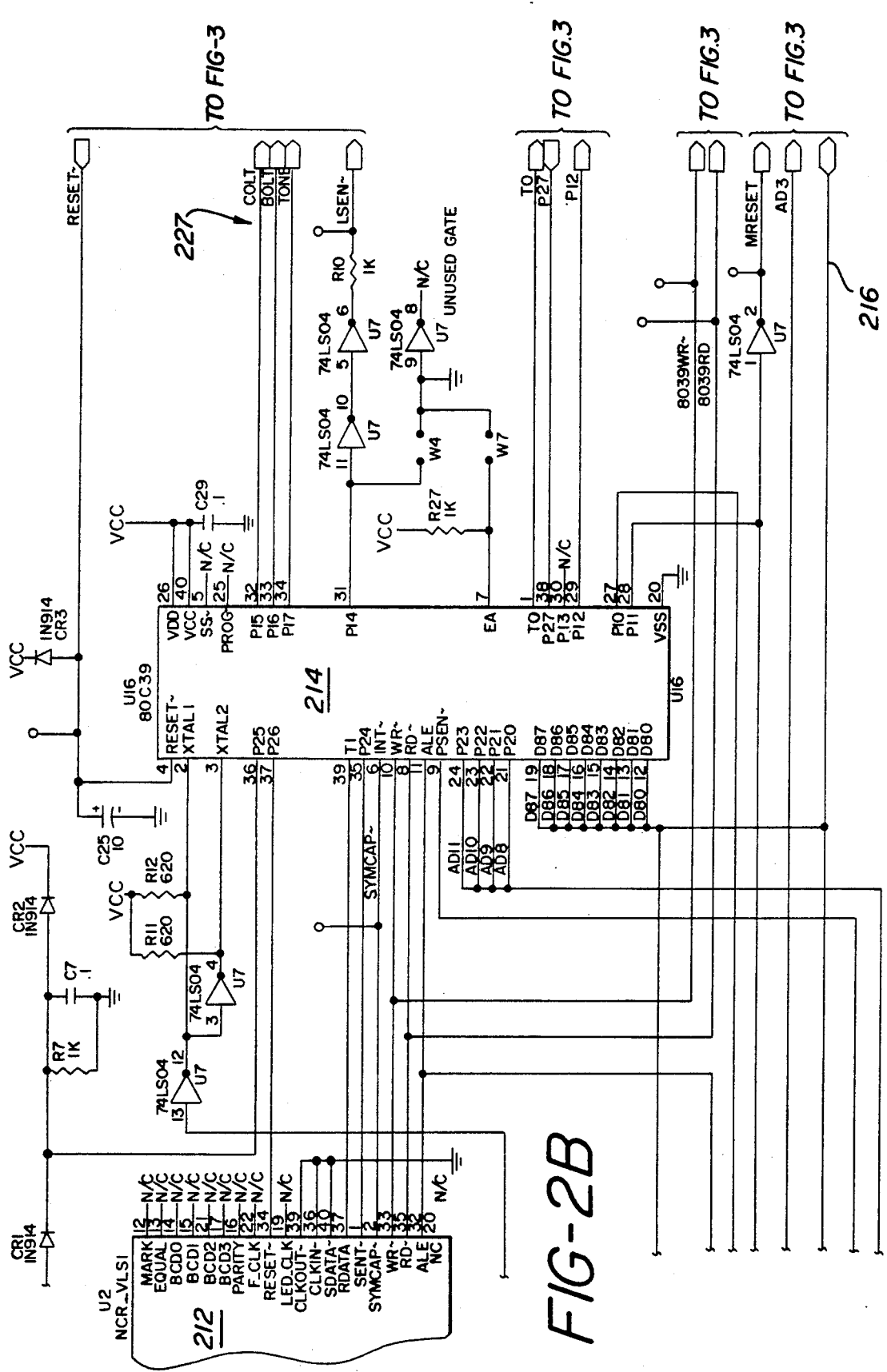

Reference is made to FIGS. 2A and 2B which, when assembled with FIG. 2A to the left of FIG. 2B, collectively illustrate schematically the circuitry of scanner controller 208. A pulse stream is provided on lines 206, labeled "RTV~" and "STV~", which defines the width of successive bars and spaces read by the scanner optics across a bar code label. These widths are quantified by timer circuit 224 which counts the number of 36 MHz cycles between start-of-low and start-of-high signals defining these widths. The decoder chip 212 then decodes segments of the bar code data and supplies these segments to microprocessor 214 where they are correlated. The correlated data is transmitted to the interface circuit 210 over lines 226. Lines 227 are connected to appropriate audible and visual indicators to signal the operator that a scan has been made ("GDLT"), or that a scan has not been made ("BDLT"). The line labeled TONE activates an audible signal.

Figure 3A:
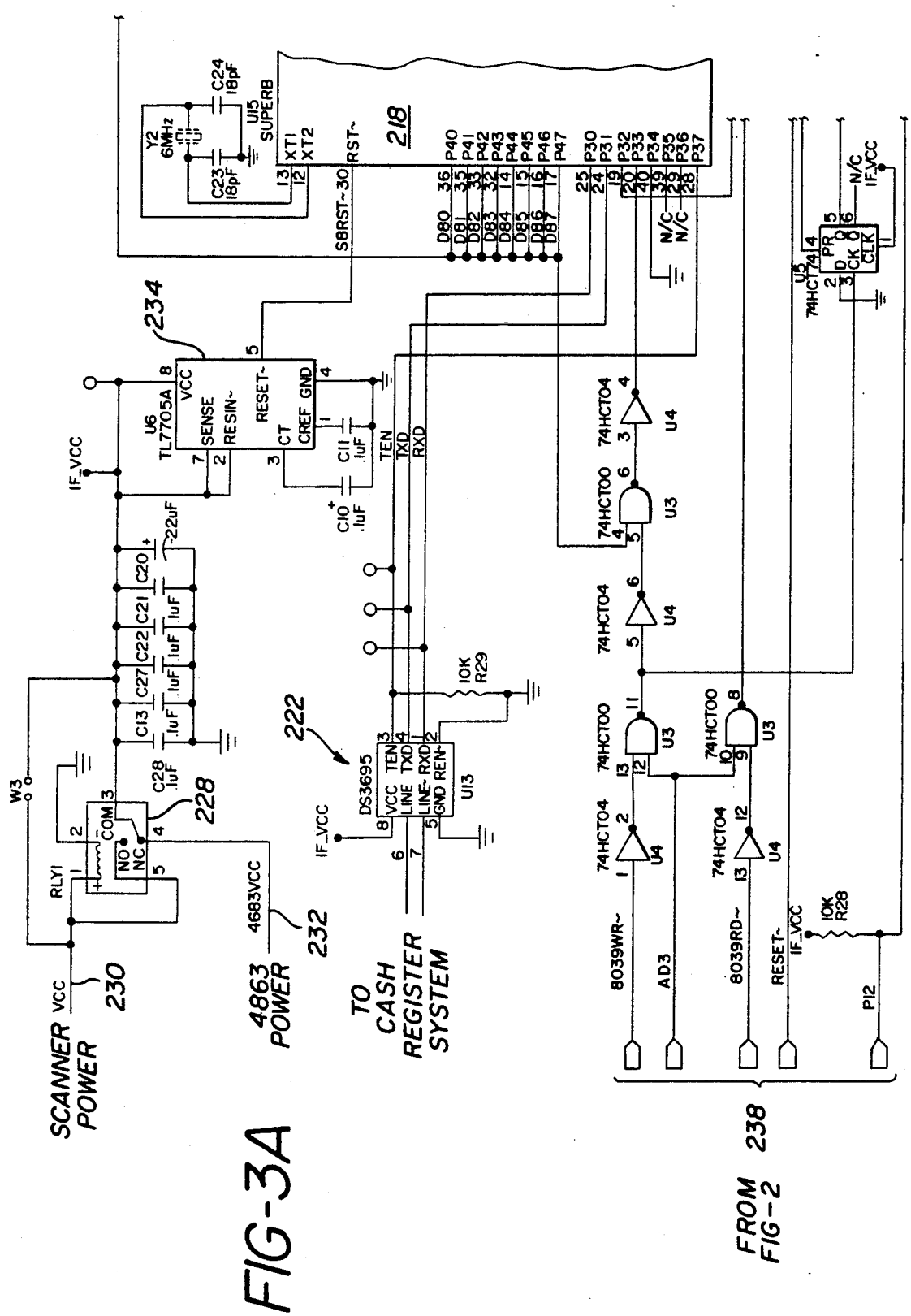
FIGS. 3A and 3B, when assembled with FIG. 3A to the left of FIG. 3B, represent schematically the interface circuit of the present invention.
Figure 3B:
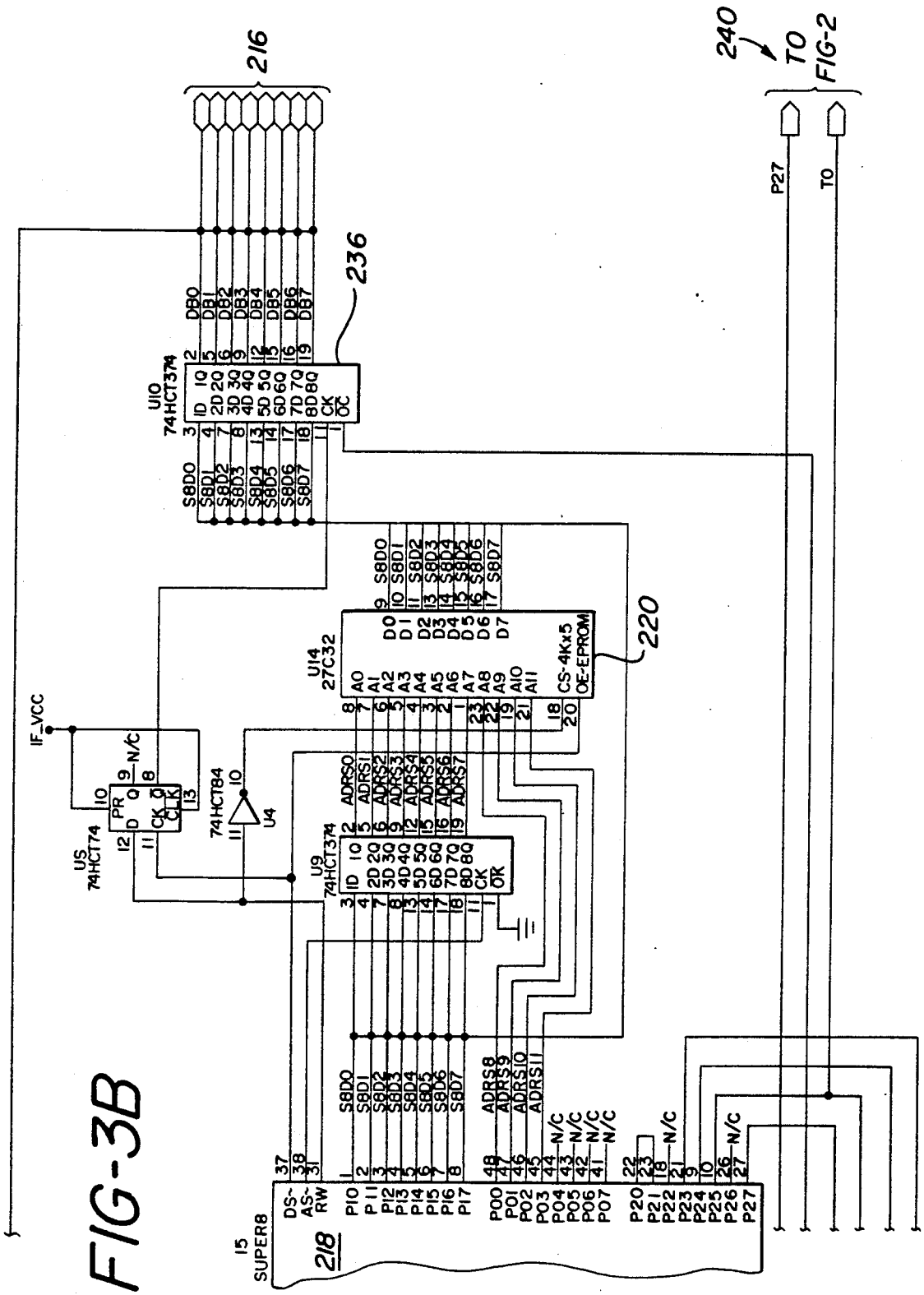

Reference is made to FIGS. 3A and 3B which, when assembled with FIG. 3A to the left of FIG. 3B, schematically illustrate the interface circuitry 210 in greater detail. The interface circuit 210 includes an interface power means, comprising relay 228, for providing power to the interface means. As is apparent, the relay 228 provides power from the scanner on line 230 as long as such power is available and, subsequently, provides power for the interface from the cash register system via line 232 when the scanner power is terminated. Thus, it is assured that the interface 210 will receive power, even in the event that either the scanner 200 or the cash register system 202 should lose power.

The interface microprocessor 218 is reset by means of power-on sensor circuit 234 when the power to the system is turned on. Bidirectional communication with the scanner controller 208 is provided via buffer 236. Similarly, bidirectional communication is provided with the cash register system via driver 222. Data transmitted to the driver 222 via the line "TXD", while information may be received from the cash register system via the line "RXD". Control signals are received from the controller 208 via lines 238 and sent to the controller 208 via lines 240.

The control software stored in scanner controller memory means 216 may be exemplified by the following listing.

```
ISIS-II MCS-48/UPI-41 MACRO ASSEMBLER, V4.2          PAGE    1
IFTD95 750F 4683 W/UPC-D B ISAACS 12/7/88

LOC OBJ         LINE        SOURCE STATEMENT

1  ;*****************************************************************
                 2  ;   FILE:  IFTD95.SRC   10-27-88 10:15  BLAKE ISAACS
                 3  ;          FROM GMD095.SRC BLAKE ISAACS
                 4  ;
                 5  ;   FIRMWARE FOR THE 750F SCANNER
                 6  ;   WILL READ UPC-A,E,D AND EAN/JAN8,13,
                 7  ;   IBM-4683 SERIAL I/O CHANNEL, I/F OPTION #95.
                 8  ;
                 9  ;   S-P PART NUMBER R96-0265
                10  ;   PROGRAMMED IC NUMBER 0438-7100
                11  ;
                12  ;*****************************************************************
                13  $       INCLUDE(:F1:HISTRY.SRC)
=               14  ;*****************************************************************
=               15  ;   FILE:  HISTRY.SRC   06-21-88 13:10  BOB ACTIS
=               16  ;
=               17  ;   IVRD53 - 750F IG DEMO, SP-OC, VERSION D3 W/ 2ND CHECK    MAY 1983
=               18  ;
=               19  ;   FVRD53 - 750F FT DEMO, SP-OC, VERSION D3 W/ 2ND CHECK    OCT 1983
=               20  ;
=               21  ;   GMA053 - 750SL, SP-OC/NCR-OCIA, READS ALL UPC,EAN & JAN  JUN 1986
=               22  ;
=               23  ;   GMA069 - 750SL, SWEDA PARALLEL/OMRON, READS ONLY A,E,8,13 OCT 1986
=               24  ;
=               25  ;   GMA066 - 750SL, IBM-OCR/FUJITSU                          OCT 1986
=               26  ;                   IBM-OCR READS ONLY A,E,8,13
=               27  ;                   FUJITSU WILL ALSO READ VERSION D
=               28  ;
=               29  ;   IFTP95 - 750F, IBM4683 SERIAL I/O CHANNEL, ONLY A,E,8,13 APR 1987
=               30  ;
=               31  ;   GMA095 - 750SL, IBM4683 SERIAL I/O CHANNEL               APR 1987
=               32  ;
=               33  ;   GM2095 - 750SL, IBM4683 SERIAL I/O, MODIFIED 2-SCAN      JUN 1988
=               34  ;           REQUIRES 2 SCANS MINIMUM FOR ALL ENABLED LABEL
```

```
=  35 ;            TYPES.EXCEPT UPC-A N/S<>2 AND EAN/JAN-13 F1<>2
=  36 ;                 WHICH ONLY REQUIRE 1 SCAN TO READ.
=  37 ;   GMD095 - 750SL, IBM4683 SAME AS GM2095 WITH UPC-D ADDED   AUG 1988
=  38 ;           DOES NOT REQUIRE TWO SCAN FOR VERSION D
=  39 ;*****************************************************************
   40 $        INCLUDE(:F1:DDEFS.SRC)
=  41 ;*****************************************************************
=  42 ;  FILE: FTDEFS.SRC  06-21-88 13:10  BOB ACTIS
=  43 ;
=  44 ;  *** SYSTEM DEFINITION ***
=  45 ;
=  46 ;  PORT 1 DEFINITION:
=  47 ;
0001    =  48 ETEST   EQU    00000001B      ;P10-O-ENABLE TEST MODE
        =  49                                ;P10-O-I/F RESET
0002    =  50 ETMARK  EQU    00000010B      ;P11-O-TEST MARK
0002    =  51 EMTREB  EQU    00000010B      ;P11-O-ENABLE MOTOR
0004    =  52 EP12    EQU    00000100B      ;P12-O-HANDSHAKE FOR SUPER-8 TO 8039 I/F
0008    =  53 EP13    EQU    00001000B      ;P13-I-MODE CONTROL FOR S8-8039 I/F
0010    =  54 ELASDB  EQU    00010000B      ;P14-O-DISABLE LASER
0020    =  55 EGDLT   EQU    00100000B      ;P15-O-ENABLE GOOD LIGHT
0040    =  56 EBDLT   EQU    01000000B      ;P16-O-ENABLE BAD LIGHT
0080    =  57 ETONE   EQU    10000000B      ;P17-O-TONE BIT (AC COUPLED)
        =  58 ;
        =  59 ;  PORT 2 DEFINITION:
        =  60 ;
        =  61 ;        EQU    00001111B      ;P20-P23 EXTERNAL PROGRAM ADDRESS LINES
0010    =  62 ESENT   EQU    00010000B      ;P24-I-VLSI DATA SENT* (USED ONLY FOR TEST)
0020    =  63 EUP2SP  EQU    00100000B      ;P25-I-MOTOR UP2SPD SIGNAL (750SL ONLY)
0040    =  64 EVLSIR  EQU    01000000B      ;P26-O-VLSI POWER RESET* (750SL ONLY)
0080    =  65 EDISMS  EQU    10000000B      ;P27-I-HANDSHAKE FOR SUPER-8 TO 8039 I/F
        =  66 ;
        =  67 ;                              ;T0-I-HANDSHAKE FOR 8039 TO SUPER-8 I/F
        =  68 ;
        =  69 ;*****************************************************************
        =  70 ;  FRAME CONTROL ARRAY:
        =  71 ;
        =  72 ;      EXTERNAL MEMORY ADDRESSES
        =  73 ;
0000    =  74 EPARRD  EQU    00H            ;R - PARITY BYTE
0001    =  75 ESRRD   EQU    01H            ;R - SEGMENT REGISTER
0001    =  76 EFRRST  EQU    01H            ;W - FRAME RESET (CLEARS SEGMENT)
0002    =  77 EOCIA   EQU    02H            ;R/W - OCIA REGISTERS
0003    =  78 EFCRST  EQU    03H            ;W - RESET FCA
0004    =  79 EPRDEC  EQU    04H            ;R - DECODED PARITY BYTE
        =  80 ;
        =  81 ;      PARITY DECODE BYTE
        =  82 ;
000F    =  83 EDECOD  EQU    00001111B      ;0-9 IS DECODED DIGIT
000A    =  84 EDEC8L  EQU    00001010B      ;A IS 8L
000B    =  85 EDEC8R  EQU    00001011B      ;B IS 8R
000C    =  86 EDECAL  EQU    00001100B      ;C IS AL
000D    =  87 EDECAR  EQU    00001101B      ;D IS AR
000E    =  88 EDECBE  EQU    00001110B      ;E IS NOT USED
000F    =  89 EDECBF  EQU    00001111B      ;F IS "NO DECODE" (ERROR)
0010    =  90 EDECE   EQU    00010000B      ;E-TAG
0020    =  91 EDECD   EQU    00100000B      ;D-TAG
0040    =  92 EDECBK  EQU    01000000B      ;BACKWARD CAPTURE
0080    =  93 EDECB7  EQU    10000000B      ;NOT USED. ALWAYS=1.
        =  94 ;
        =  95 ;      SHIFT REGISTER READ
        =  96 ;
000F    =  97 ESRCHR  EQU    00001111B      ;BCD CHARACTER
0010    =  98 ESR4CH  EQU    00010000B      ;4-CHAR CAPTURE
0020    =  99 ESRF13  EQU    00100000B      ;FRAME 1 OR 3 CAPTURE
0040    = 100 ESRPER  EQU    01000000B      ;PERIODICAL CAPTURE
0080    = 101 ESRSDT  EQU    10000000B      ;SDATA BYTE AVAILABLE
        = 102 ;*****************************************************************
        = 103 ;  FLAG REGISTERS:
        = 104 ;
        = 105 ;    RB0-R4   SCAN FLAGS
        = 106 ;
0001    = 107 ESCNG   EQU    00000001B      ;SCANNING (FLAG CKFCA TO GET SEGMENTS)
0002    = 108 ER4B1   EQU    00000010B      ;NOT USED
0004    = 109 ER4B2   EQU    00000100B      ;NOT USED
0008    = 110 ESBFUL  EQU    00001000B      ;SEND BUFFER HAS DATA TO SEND
0010    = 111 ER4B4   EQU    00010000B      ;NOT USED
0020    = 112 EBFREQ  EQU    00100000B      ;BUFMAN REQUEST FLAG
0040    = 113 ER4B6   EQU    01000000B      ;NOT USED
0080    = 114 ER4B7   EQU    10000000B      ;NOT USED
        = 115 ;
        = 116 ;    RB0-R6   VERSION POINTER/FLAG
        = 117 ;
0000    = 118 EVER00  EQU    00H            ;NO VALID VERSIONS
0001    = 119 EVERA   EQU    01H            ;UPC-A
0002    = 120 EVER13  EQU    02H            ;EAN-13
0003    = 121 EVERE   EQU    03H            ;UPC-E
0004    = 122 EVER8   EQU    04H            ;EAN-8
0005    = 123 EVERD1  EQU    05H            ;UPC-D1
0006    = 124 EVERD2  EQU    06H            ;UPC-D2
0007    = 125 EVERD3  EQU    07H            ;UPC-D3
0008    = 126 EVERD4  EQU    08H            ;UPC-D4
```

```
0009            = 127 EVERD5   EQU     09H             ;UPC-D5
                = 128 ;
0010            = 129 ER6B4    EQU     00010000B       ;NOT USED
0020            = 130 ER6B5    EQU     00100000B       ;NOT USED
0040            = 131 ER6B6    EQU     01000000B       ;NOT USED
0080            = 132 ER6B7    EQU     10000000B       ;NOT USED
                = 133 ;*******************************************************
                = 134 ; TIMER CONSTANTS:
                = 135 ;
0004            = 136 E80MS    EQU     4               ;80 MSEC
000A            = 137 E200MS   EQU     10              ;200 MSEC
0018            = 138 E480MS   EQU     24              ;480 MSEC
0032            = 139 E1000M   EQU     50              ;1000 MSEC, 1.0 SECOND
0064            = 140 E2000M   EQU     100             ;2000 MSEC, 2.0 SECOND
000D            = 141 E260M    EQU     13              ;260 MSEC
0019            = 142 E500M    EQU     25              ;500 MSEC
                = 143 ;
0004            = 144 EGDTON   EQU     4               ;80 MSEC, GOOD TONE ON TIME
0014            = 145 EBDTON   EQU     20              ;400 MSEC, BAD TONE ON TIME
                = 146 ;
0028            = 147 ETONCT   EQU     40              ;TONE COUNT (CYCLES/20MS)
FFFA            = 148 ETONFQ   EQU     -6              ;TONE FREQUENCY CONSTANT (500US)
                = 149 ;
                = 150 ; SUPER-8 INTERFACE EXTERNAL MEMORY ADDRESS
0008            = 151 ESUP8    EQU     08H
                = 152 ;
                = 153 ; COMMUNICATIONS ROUTINE CONSTANTS
00BB            = 154 EMSNBY   EQU     0BBH            ;MISSCAN BYTE FOR SEND BUFFER
00CC            = 155 ETRMBY   EQU     0CCH            ;TERMINATION BYTE FOR SEND BUFFER
                = 156 ;
                = 157 ; COMMUNICATIONS ROUTINE RECEIVE COMMANDS (SUPER-8 TO 8039)
0011            = 158 ENSCAN   EQU     11H             ;ENABLE SCANNING (LASER ON)
0012            = 159 DISCAN   EQU     12H             ;DISABLE SCANNING (LASER OFF)
0014            = 160 ENBEEP   EQU     14H             ;ENABLE TONE AFTER GOOD READ
0018            = 161 DIBEEP   EQU     18H             ;DISABLE TONE AFTER GOOD READ
0032            = 162 COMRST   EQU     32H             ;RESET SCANNER COMMAND
0079            = 163 IFRSMG   EQU     79H             ;I/F ROM CHECKSUM GOOD "COMMAND"
                = 164 ;
                = 165 ; FLATTOP TIME CONSTANTS
0008            = 166 EWAIT    EQU     8               ;VALUE FOR "NO SEGS" WAIT
002A            = 167 EGDLTW   EQU     50-EWAIT        ;GD-LT ON WAIT CONSTANT
0016            = 168 EDRDLY   EQU     30-EWAIT        ;DOUBLE READ WAIT, IBM-OCR, 0.6 SEC
002A            = 169 EDRDLF   EQU     50-EWAIT        ;DOUBLE READ WAIT, FUJITSU, 1.0 SEC
                = 170 ;
                = 171 ; RAM POINTERS AND CONSTANTS USED IN THE HORSE TEST
0030            = 172 TSEG1    EQU     30H             ;SEGMENT BUFFER
0034            = 173 TSEG2    EQU     34H
0038            = 174 TCNT1    EQU     38H             ;SEGMENT COUNTER
003A            = 175 TCNT2    EQU     3AH
0050            = 176 TSCBUF   EQU     50H             ;FCA READ BUFFER
00D1            = 177 EHCNTL   EQU     0D1H            ;HORSE CONTROL BYTE
                = 178 ;*******************************************************
                = 179 ; DATA MEMORY MAP - RAM - 8039 NEEDED
                = 180 ;
                = 181 ;    REGISTER BANK 0 (NON-INTERRUPT USEAGE)
0000            = 182           ORG     000H
0000            = 183 MRB0:    DS      4               ;R0 TO R3 - SCRATCH
0004            = 184 SCNFLG:  DS      1               ;R4 - SCAN FLAGS
0005            = 185 DRTIMR:  DS      1               ;R5 - DOUBLE READ TIMER
0006            = 186 VERFLG:  DS      1               ;R6 - VERSION POINTER/FLAG
0007            = 187 TIMREG:  DS      1               ;R7 - GENERAL PURPOSE TIMER/COUNTER
                = 188 ;
                = 189 ;    STACK AREA
0008            = 190 STACK:   DS      16              ;8 LEVELS OF SUBROUTINES ALLOWED
                = 191 ;
                = 192 ;    REGISTER BANK 1 (INTERRUPT USEAGE)
0018            = 193 MRB1:    DS      3               ;R0 TO R2 - SCRATCH (NOT USED)
001B            = 194 MRB1R3:  DS      1               ;R3 - GOOD READ TONE DISABLE FLAG
001C            = 195 MRB1R4:  DS      1               ;R4 - NOT USED
001D            = 196 TONCNT:  DS      1               ;R5 - TONE CYCLE COUNTER (CYCLES/20MS)
001E            = 197 TONLTH:  DS      1               ;R6 - TONE LENGTH COUNTER
001F            = 198 TASAVE:  DS      1               ;R7 - TIMER "A" SAVE REGISTER
                = 199 ;
                = 200 ;    FREE MEMORY AREA
                = 201 ;
                = 202 ;    SEGMENT BUFFERS
0020            = 203 SEGBUF   EQU     $
0020            = 204 SCNBUF:  DS      4               ;SCAN BUFFER
                = 205 ;
0024            = 206 BF6CST   EQU     $
0024            = 207 L6S1:    DS      4               ;SCAN 1 BUFFER
0028            = 208 L6S2:    DS      4               ;SCAN 2 BUFFER
002C            = 209 L6SCNT:  DS      1               ;PACKED SCAN COUNTER (SCAN2/SCAN1)
002D            = 210 L6STOT:  DS      1               ;TOTAL COUNTER
                = 211 ;
002E            = 212 R6S1:    DS      3
0031            = 213 R6S2:    DS      3
0034            = 214 R6SCNT:  DS      1
0035            = 215 R6STOT:  DS      1
0012            = 216 BF6CNT   EQU     $-BF6CST
                = 217 ;
0036            = 218 BF4CST   EQU     $
```

```
0036           = 219 L4S1:   DS     2
0038           = 220 L4S2:   DS     2
003A           = 221 L4SCNT: DS     1
003B           = 222 L4STOT: DS     1
               = 223 ;
003C           = 224 R4S1:   DS     2
003E           = 225 R4S2:   DS     2
0040           = 226 R4SCNT: DS     1
0041           = 227 R4STOT: DS     1
               = 228 ;
0042           = 229 N1S1:   DS     2
0044           = 230 N1S2:   DS     2
0046           = 231 N1SCNT: DS     1
0047           = 232 N1STOT: DS     1
               = 233 ;
0048           = 234 N2S1:   DS     2
004A           = 235 N2S2:   DS     2
004C           = 236 N2SCNT: DS     1
004D           = 237 N2STOT: DS     1
               = 238 ;
004E           = 239 N3S1:   DS     2
0050           = 240 N3S2:   DS     2
0052           = 241 N3SCNT: DS     1
0053           = 242 N3STOT: DS     1
               = 243 ;
0054           = 244 N4S1:   DS     2
0056           = 245 N4S2:   DS     2
0058           = 246 N4SCNT: DS     1
0059           = 247 N4STOT: DS     1
               = 248 ;
005A           = 249 N5S1:   DS     2
005C           = 250 N5S2:   DS     2
005E           = 251 N5SCNT: DS     1
005F           = 252 N5STOT: DS     1
               = 253 ;
0060           = 254 N6S1:   DS     2
0062           = 255 N6S2:   DS     2
0064           = 256 N6SCNT: DS     1
0065           = 257 N6STOT: DS     1
0030           = 258 BF4CNT  EQU    $-BF4CST
               = 259 ;
               = 260 ;       SEND BUFFER
0066           = 261 SBFPNT: DS     1                  ;POINTER
               = 262 ;
0067           = 263 SBUFAD  EQU    $                  ;FIRST DATA BYTE ADDRESS
0067           = 264 SBUF:   DS     18                 ;DATA BUFFER
00CE           = 265 SBSTRT  EQU    2*SBUF             ;PACKED BUFFER START POINTER
0012           = 266 SBUFSZ  EQU    $-SBUF             ;BYTES IN SEND BUFFER
0078           = 267 SBFEND  EQU    $-1                ;LAST RAM LOCATION IN BUFFER
               = 268 ;
               = 269 ; WORK AREA USED BY EMOD10 ROUTINE
0079           = 270 WRKBUF: DS     3
               = 271 ;
               = 272 ; DOUBLE READ LABEL DATA SUM LOCATION
007C           = 273 DRSUM:  DS     1
               = 274 ;
007C           = 275 LSTUSD  EQU    $-1                ;LAST USED RAM LOCATION
                 276 ; FVECTR.SRC INCLUDES FTIMER.SRC
$      INCLUDE(:F1:FVECTR.SRC)
$      INCLUDE(:                   277 $     INCLUDE(:F1:FVECTR.SRC)
               = 278 ;****************************************************************
               = 279 ; FILE: FVECTR.SRC  06-16-86 13:00  BOB ACTIS
               = 280 ;
               = 281 ; RESET AND INTERRUPT VECTORS
               = 282 ;
0000           = 283         ORG    000H               ;RESET TRAP
0000 E5        = 284 RSTTRP: SEL    MB0
0001 6445      = 285         JMP    POWUP              ;GO START PROGRAM
               = 286 ;
0003           = 287         ORG    003H               ;EXTERNAL INTERRUPT TRAP
0003 93        = 288 INTTRP: RETR                      ;RETURN FROM SPURIOUS INTERRUPTS
               = 289 ;
0007           = 290         ORG    007H               ;INTERNAL TIMER INTERRUPT TRAP
0007           = 291 TIMTRP  EQU    $                  ;GO TO TIMER ROUTINE
               = 292 $       INCLUDE(:F1:FTIMER.SRC)
              1= 293 ;****************************************************************
              1= 294 ; FILE: FTIMER.SRC  10-08-86 15:40  BOB ACTIS
              1= 295 ; FUNCTION: IF NO TONE IN PROGRESS, DECREMENT RB0-R5 & R7 UNTIL 0.
              1= 296 ;           IF TONE IN PROGRESS, DECREMENT RB1-R6 UNTIL 0.
              1= 297 ; ENTRY: RB1-R6 = TONE LENGTH IN 20'S OF MS.
              1= 298 ;        RB1-R4 = IBM-4683 CLOCK TIMER
              1= 299 ;        RB0-R5 = DOUBLE READ TIMER COUNTER
              1= 300 ;        RB0-R7 = GENERAL PURPOSE TIMER COUNTER
              1= 301 ; EXIT:  RB1-R7 = ACCUMULATOR SAVE
              1= 302 ;        RB1-R5 = TONE CYCLE COUNTER
              1= 303 ;        RB1-R6 = DECREMENTED UNTIL 0
              1= 304 ;        RB1-R4 = DECREMENTED UNTIL 0
              1= 305 ;        RB0-R5 = DECREMENTED UNTIL 0
              1= 306 ;        RB0-R7 = DECREMENTED UNTIL 0
0007 D5       1= 307 TIMER:  SEL    RB1
0008 AF       1= 308         MOV    R7,A               ;SAVE A
0009 FE       1= 309         MOV    A,R6               ;GET TONE COUNTER
```

```
000A 961F    1= 310           JNZ    TIME30          ;JUMP IF TONE IN PROGRESS
             1= 311 ;
000C FC      1= 312           MOV    A,R4
000D C610    1= 313           JZ     TIME02          ;JUMP IF IBM-4683 TIMER = 0
000F CC      1= 314           DEC    R4
             1= 315 ;
0010 C5      1= 316 TIME02:   SEL    RB0
0011 FF      1= 317           MOV    A,R7
0012 C615    1= 318           JZ     TIME05          ;JUMP IF TIMER COUNTER = 0
0014 CF      1= 319           DEC    R7
             1= 320 ;
0015 FD      1= 321 TIME05:   MOV    A,R5
0016 C619    1= 322           JZ     TIME10          ;JUMP IF DOUBLE READ TIMER = 0
0018 CD      1= 323           DEC    R5
             1= 324 ;
0019 2306    1= 325 TIME10:   MOV    A,#-250         ;20MS/80US = 250
001B 62      1= 326 TIME20:   MOV    T,A             ;SET TIMER COUNTER
001C D5      1= 327           SEL    RB1
001D FF      1= 328           MOV    A,R7            ;RESTORE A
001E 93      1= 329           RETR
             1= 330 ;
001F 09      1= 331 TIME30:   IN     A,P1            ;GET TONE BIT
0020 997F    1= 332           ANL    P1,#255-ETONE   ;SET TONE BIT LOW
0022 F226    1= 333           JB7    TIME40          ;JUMP IF TONE BIT WAS HIGH
0024 8980    1= 334           ORL    P1,#ETONE       ;SET TONE BIT HIGH
             1= 335 ;
0026 55      1= 336 TIME40:   STRT   T               ;CLEAR THE PRESCALAR
0027 ED3B    1= 337           DJNZ   R5,TIME60       ;JUMP IF NOT 20MS YET
0029 BD28    1= 338           MOV    R5,#ETONCT      ;SET TONE CYCLE COUNTER
             1= 339 ;
002B FC      1= 340           MOV    A,R4
002C C62F    1= 341           JZ     TIME45          ;JUMP IF IBM-4683 TIMER = 0
002E CC      1= 342           DEC    R4
             1= 343 ;
002F C5      1= 344 TIME45:   SEL    RB0
0030 FF      1= 345           MOV    A,R7
0031 C634    1= 346           JZ     TIME50          ;JUMP IF TIMER COUNTER = 0
0033 CF      1= 347           DEC    R7
             1= 348 ;
0034 D5      1= 349 TIME50:   SEL    RB1
0035 EE3B    1= 350           DJNZ   R6,TIME60       ;JUMP IF TONE NOT FINISHED
0037 8980    1= 351           ORL    P1,#ETONE       ;LEAVE TONE LINE HIGH
0039 0419    1= 352           JMP    TIME10
             1= 353 ;
003B 23FA    1= 354 TIME60:   MOV    A,#ETONFQ       ;SET TONE FREQ CONSTANT
003D 041B    1= 355           JMP    TIME20
                356 $         INCLUDE(:F1:FSDATA.SRC)
                = 357 ;************************************************************
                = 358 ; FILE: FSDATA.SRC  10-06-86  14:05  BOB ACTIS
                = 359 ;
                = 360 ; ROUTINE: SDATA
                = 361 ; FUNCTION: CLEAR THE SDATA BYTE THEN RETURN.
                = 362 ;           THE 750SL DOES NOT IMPLEMENT HORSE OR RESET FROM SDATA
                = 363 ; ENTRY: RB0
                = 364 ;          SDATA READY IN FCA
                = 365 ; EXIT: USES R0,A
                = 366 ;
003F B802       = 367 SDATA:   MOV    R0,#EOCIA      ;ENTERED FROM CKFCA ROUTINE
0041 80         = 368          MOVX   A,@R0          ;GET SDATA BYTE
                = 369 ;
0042 D3D1       = 370 SDATA4:  XRL    A,#EHCNTL
0044 9656       = 371          JNZ    SDATA9         ;JUMP IF NOT THE HORSE CONTROL BYTE
0046 27         = 372 SDATAH:  CLR    A              ;CLEAR STACK POINTER/RETURN LINKAGE SINCE WE
0047 D7         = 373          MOV    PSW,A          ;WILL JUMP INTO HORSE TEST AND STAY THERE
0048 C5         = 374          SEL    RB0            ;SETUP FOR HORSE TEST ENTRY
0049 85         = 375          CLR    F0
004A 95         = 376          CPL    F0             ;SET FLAG FOR CONTROL BYTE RECEIVED
004B A5         = 377          CLR    F1
004C B830       = 378          MOV    R0,#TSEG1
004E BB10       = 379          MOV    R3,#16
0050 99DF       = 380          ANL    P1,#255-EGDLT
0052 8952       = 381          ORL    P1,#EBDLT+ELASDB+EMTREB ;BDLT & MOTOR ON, LASER OFF
0054 840A       = 382          JMP    THO05          ;BDLT INDICATES CNTL BYTE RECEIVED
                = 383 ;
0056 83         = 384 SDATA9:  RET                   ;SPURIOUS SDATA
                  385 ;****************************************
0057 A3           386 TROPG0:  MOVP   A,@A
0058 83           387          RET
0100              388          ORG    100H
                  389 $        INCLUDE(:F1:TROMSM.SRC)
                = 390 ;************************************************************
                = 391 ; ROUTINE: TROMSM  10-07-86 10:40 BOB ACTIS
                = 392 ;
                = 393 ; FUNCTION - SUM ALL BYTES IN BOTH MEMORY BANKS
                = 394 ;            ASSUMES THAT EACH OF THE SIXTEEN PAGES CONTAINS THE
                = 395 ;            SEQUENCE "TROPGX: MOVP A,@A ; RET" FOR PAGE X.
                = 396 ;
0100 B90B       = 397 TROMSM:  MOV    R1,#STACK+3    ; R1 POINTS TO SECOND STACK ENTRY
                = 398 ;
                = 399 ; DO SIXTEEN PAGES WITH 256 BYTES PER PAGE
                = 400 ;
0102 27         = 401          CLR    A
```

```
0103 A1       = 402          MOV     @R1,A        ; STACK+3 = PAGE 0 TO START
0104 AA       = 403          MOV     R2,A         ; R2 = BYTE ADDRESS
0105 BB10     = 404          MOV     R3,#16       ; R3 = PAGES TO DO
0107 A8       = 405          MOV     R0,A         ; R0 = SUM OF BYTES
0108 D7       = 406          MOV     PSW,A        ; INSURE STACK IS EMPTY
              = 407 ;
              = 408 ; PUT PAGE ACCESS ADDRESS IN STACK
              = 409 ;
0109 F1       = 410 TRO10:   MOV     A,@R1
010A 0321     = 411          ADD     A,#LOW TROTAB
010C A3       = 412          MOVP    A,@A
010D C9       = 413          DEC     R1
010E A1       = 414          MOV     @R1,A
010F 19       = 415          INC     R1
              = 416 ;
              = 417 ; DO A PAGE
              = 418 ;
0110 341C     = 419 TRO20:   CALL    TRO50        ; FETCH BYTE
0112 68       = 420          ADD     A,R0         ; ADD TO SUM
0113 A8       = 421          MOV     R0,A
0114 EA10     = 422          DJNZ    R2,TRO20     ; JMP = NOT DONE WITH PAGE
0116 11       = 423          INC     @R1          ; PAGE NUMBER INCREMENTED
0117 EB09     = 424          DJNZ    R3,TRO10     ; JMP = NOT THRU WITH PAGES
0119 17       = 425          INC     A            ; (A) = ZERO FOR CORRECT SUM
011A 6402     = 426          JMP     TRORET
              = 427 ;
              = 428 ; LINK TO EACH PAGE
              = 429 ;
011C 2302     = 430 TRO50:   MOV     A,#02
011E D7       = 431          MOV     PSW,A        ; SET STACK POINTER AHEAD
011F FA       = 432          MOV     A,R2         ; A = ADDRESS OF BYTE TO FETCH
0120 83       = 433          RET                  ; JMP TO SELECTED PAGE
              = 434 ;
              = 435 ; TABLE FOR ADDRESS OF FETCH ROUTINE IN EACH PAGE
              = 436 ;
0121 57       = 437 TROTAB:  DB      LOW TROPG0
0122 4B       = 438          DB      LOW TROPG1
0123 B0       = 439          DB      LOW TROPG2
0124 93       = 440          DB      LOW TROPG3
0125 C6       = 441          DB      LOW TROPG4
0126 43       = 442          DB      LOW TROPG5
0127 D3       = 443          DB      LOW TROPG6
0128 6E       = 444          DB      LOW TROPG7
0129 E4       = 445          DB      LOW TROPG8
012A D8       = 446          DB      LOW TROPG9
012B CC       = 447          DB      LOW TROPGA
012C D7       = 448          DB      LOW TROPGB
012D E0       = 449          DB      LOW TROPGC
012E E3       = 450          DB      LOW TROPGD
012F 7E       = 451          DB      LOW TROPGE
0130 AD       = 452          DB      LOW TROPGF
                453 ;        INCLUDE(:F1:TRAM.SRC)     ; 750SL ONLY
                454 $        INCLUDE(:F1:TOCIA.SRC)    ; 750F ONLY      <----
              = 455 ;****************************************************************
              = 456 ; ROUTINE: TOCIA   07-03-86 10:40  BOB ACTIS
              = 457 ;
              = 458 ; FUNCTION: SEND BYTE TO HOST, THEN CHECK RDATA
              = 459 ;
0131 8901     = 460 TOCIA:   ORL     P1,#ETEST    ;TEST CONTROL ACTIVE
0133 B803     = 461          MOV     R0,#EFCRST
0135 90       = 462          MOVX    @R0,A        ;RESET FCA
              = 463 ;
0136 B802     = 464          MOV     R0,#EOCIA
0138 23AA     = 465          MOV     A,#0AAH
013A 90       = 466          MOVX    @R0,A        ;WRITE BYTE TO FCA SR
              = 467 ;
013B 27       = 468          CLR     A
013C B809     = 469          MOV     R0,#09H      ;LOOP COUNTER
013E 4647     = 470          JNT1    TOC50        ;JUMP IF RDATA NOT HIGH TO START WITH
              = 471 ;
0140 3C       = 472 TOC10:   MOVD    P4,A         ;GENERATE A CLKIN*
0141 E7       = 473          RL      A
0142 4645     = 474          JNT1    TOC20        ;JUMP IF RDATA NOT IN ONE STATE
0144 17       = 475          INC     A
0145 E840     = 476 TOC20:   DJNZ    R0,TOC10     ;JUMP TO GENERATE 9 CLKIN* PULSES
              = 477 ;
0147 D3AA     = 478 TOC50:   XRL     A,#0AAH      ;COMPARE RECEIVED BYTE
0149 640A     = 479          JMP     TOCRET       ;A=0 IF CHECK WAS GOOD
                480 ;****************************************************************
014B A3         481 TROPG1:  MOVP    A,@A
014C 83         482          RET
0200            483          ORG     200H
                484 $        INCLUDE(:F1:TTAG.SRC)
              = 485 ;****************************************************************
              = 486 ; ROUTINE: TTAG   06-19-86 15:30  BOB ACTIS
              = 487 ;
              = 488 ; FUNCTION: CHECK DIGITAL LOGIC FOR CAPTURE OF 6 INCREASINGLY
              = 489 ;          LARGER TAGS - 012345 678912 . THE SYMBOL CAPTURE
              = 490 ;          PROCESSING IS USED TO COLLECT THE SEGMENTS FROM THE FCA.
              = 491 ;
0200 FE       = 492 TTATAB:  DB      0FEH,9AH,64H,16H,0B7H,0DDH,0ABH
0201 9A       =
0202 64       =
0203 16       =
```

```
0204 B7    =
0205 DD    =
0206 AB    =
0207 3A    = 493         DB      3AH,0B9H,42H,0B6H,59H,2EH,03EH
0208 B9    =
0209 42    =
020A B6    =
020B 59    =
020C 2E    =
020D 3E    =
020E B803  = 494 TTAG:   MOV     R0,#EFCRST
0210 90    = 495         MOVX    @R0,A               ;RESET FCA
0211 8901  = 496         ORL     P1,#ETEST           ;TEST CONTROL ACTIVE
0213 B800  = 497         MOV     R0,#LOW TTATAB      ; R0 POINTS TO CHAR GEN TABLE
0215 BE06  = 498         MOV     R6,#06H  ;THIS ROUTINE CHECKS DIGITAL LOGIC
0217 BF06  = 499         MOV     R7,#06H  ;FOR CAPTURE OF 6 INCREASINGLY LARGER
0219 B908  = 500         MOV     R1,#08H  ;TAGS 012345 678912...................
021B BB0E  = 501         MOV     R3,#0EH  ;UNPACK DATA CONSTANT
021D F8    = 502 UNPK1:  MOV     A,R0
021E BA04  = 503         MOV     R2,#04H  ;UNPACK DATA CONSTANT
0220 A3    = 504         MOVP    A,@A
0221 AC    = 505         MOV     R4,A     ;TEMP STORE
0222 5301  = 506 UNPK2:  ANL     A,#01H   ;STRIP OUT ONE BIT
0224 E7    = 507         RL      A
0225 17    = 508         INC     A
0226 47    = 509         SWAP    A
0227 AD    = 510         MOV     R5,A
0228 FC    = 511         MOV     A,R4
0229 77    = 512         RR      A
022A AC    = 513         MOV     R4,A
022B 5301  = 514         ANL     A,#01H
022D E7    = 515         RL      A
022E 17    = 516         INC     A
022F 60    = 517         ADD     A,R5
0230 A1    = 518         MOV     @R1,A
0231 19    = 519         INC     R1
0232 FC    = 520         MOV     A,R4
0233 77    = 521         RR      A
0234 AC    = 522         MOV     R4,A
0235 EA22  = 523         DJNZ    R2,UNPK2
0237 18    = 524         INC     R0
0238 EB1D  = 525         DJNZ    R3,UNPK1
           = 526 ;
           = 527 ;   SETUP TEST BIT ON PORT 1
           = 528 ;
023A 2390  = 529         MOV     A,#ETEST+EP12+EP13+ELASDB+ETONE
023C 39    = 530         OUTL    P1,A
           = 531 ;
023D BB02  = 532         MOV     R3,#02H
023F BD06  = 533         MOV     R5,#06H
0241 BA38  = 534 TEST1:  MOV     R2,#38H  ;START TAG POINTER
0243 B83F  = 535         MOV     R0,#3FH
0245 FD    = 536 TEST2:  MOV     A,R5     ;START TAG OUTPUT
0246 6B    = 537         ADD     A,R3
0247 AC    = 538         MOV     R4,A
0248 EC48  = 539 TEST3:  DJNZ    R4,TEST3
024A F0    = 540         MOV     A,@R0
           = 541 ;
024B 3251  = 542         JB1     TST31    ;JUMP = SEND SPACE
024D 99FD  = 543         ANL     P1,#0FFH-ETMARK
024F 4455  = 544         JMP     TST32
0251 8902  = 545 TST31:  ORL     P1,#ETMARK
0253 00    = 546         NOP
0254 00    = 547         NOP
           = 548 ;
0255 FD    = 549 TST32:  MOV     A,R5
0256 6B    = 550         ADD     A,R3
0257 AC    = 551         MOV     R4,A
0258 EC58  = 552 TEST4:  DJNZ    R4,TEST4
025A F0    = 553         MOV     A,@R0
           = 554 ;
025B 47    = 555         SWAP    A
025C 3262  = 556         JB1     TST41    ;JUMP = SEND SPACE
025E 99FD  = 557         ANL     P1,#0FFH-ETMARK
0260 4466  = 558         JMP     TST42
0262 8902  = 559 TST41:  ORL     P1,#ETMARK
0264 00    = 560         NOP
0265 00    = 561         NOP
           = 562 ;
0266 C8    = 563 TST42:  DEC     R0
0267 EA45  = 564         DJNZ    R2,TEST2            ;END OF TAG
0269 ED41  = 565         DJNZ    R5,TEST1            ;END OF ALL TAGS
           = 566 ;
026B F5    = 567         SEL     MB1
026C 1400  = 568         CALL    CLR6SG              ;CLEAR 6 CHAR SEG BUFFS & COUNTERS
026E E5    = 569         SEL     MB0
           = 570 ;
026F BE18  = 571         MOV     R6,#24              ;SHOULD BE ONLY 12 SEGS, TRY FOR MORE
0271 FC    = 572         MOV     A,R4
0272 4301  = 573         ORL     A,#ESCNG            ;SET SCAN FLAG SO CKFCA WILL
0274 AC    = 574         MOV     R4,A                ;PUT SEGMENTS INTO THE SCAN BUFF
0275 F5    = 575 GETLUP: SEL     MB1
0276 14A4  = 576         CALL    CKFCA               ;GET SEG, IF ANY, FROM FCA
```

```
0278 5404    = 577          CALL    PROCSG       ;PUT SEG, IF ANY, INTO SEG BUFF
027A E5      = 578          SEL     MB0
027B EE75    = 579          DJNZ    R6,GETLUP    ;GO CHECK FOR MORE SEGMENTS
             = 580 ;
027D 85      = 581          CLR     F0           ;SETUP FOR RIGHT HALF LOOP
027E B82C    = 582          MOV     R0,#L6SCNT
0280 F0      = 583 TCKCNT:  MOV     A,@R0        ;GET L OR R COUNT
0281 18      = 584          INC     R0
0282 60      = 585          ADD     A,@R0
0283 03F4    = 586          ADD     A,#-12       ;GET L OR R TOTAL
0285 96A7    = 587          JNZ     TTA90        ;JUMP IF X6SCNT+X6STOT<>12
             = 588 ;
0287 B834    = 589          MOV     R0,#R6SCNT
0289 95      = 590          CPL     F0
028A B680    = 591          JF0     TCKCNT       ;JUMP TO DO RIGHT HALF
             = 592 ;
028C BA04    = 593          MOV     R2,#4        ;4 BYTES TO COMPARE
028E B824    = 594          MOV     R0,#L6S1
0290 B9A9    = 595          MOV     R1,#LOW TTACHK ;DATA CHECK TABLE
0292 F9      = 596 LOOPCK:  MOV     A,R1
0293 A3      = 597          MOVP    A,@A
0294 D0      = 598          XRL     A,@R0
0295 96A7    = 599          JNZ     TTA90        ;JMP IF BAD CHECK OF DATA
             = 600 ;
0297 18      = 601          INC     R0
0298 19      = 602          INC     R1
0299 EA92    = 603          DJNZ    R2,LOOPCK
             = 604 ;
029B B82E    = 605          MOV     R0,#R6S1
029D BA03    = 606          MOV     R2,#3        ;3 BYTES TO COMPARE
029F 95      = 607          CPL     F0
02A0 B692    = 608          JF0     LOOPCK       ;JUMP TO DO RIGHT HALF
             = 609 ;
02A2 B87F    = 610          MOV     R0,#7FH      ;LOOP COUNTER, RAM SIZE
02A4 A0      = 611 CLRRAM:  MOV     @R0,A        ;A=0 AT THIS POINT, TEST PASSED
02A5 E8A4    = 612          DJNZ    R0,CLRRAM    ;CLEAR ALL RAM AFTER TESTING
             = 613 ;
02A7 6412    = 614 TTA90:   JMP     TTARET       ;A=0 FOR SUCCESFUL COMPLETION
             = 615 ;
02A9 01      = 616 TTACHK:  DB      01H,23H,45H,0CH
02AA 23      =
02AB 45      =
02AC 0C      =
02AD 67      = 617          DB      67H,89H,12H
02AE 89      =
02AF 12      =
             = 618 ;***************************************
TROPG2: MOVP    A,@A
        RET
        ORG     300H
;       INCLUDE(:F1:TMOTOR.SRC)    ; 750SL ONLY      <----
$       INCLUDE(:F1:TP  02B0 A3       619 TROPG2: MOVP    A,@A
02B1 83            620          RET
0300               621          ORG     300H
                   622 ;        INCLUDE(:F1:TMOTOR.SRC)    ; 750SL ONLY   <----
                   623 $        INCLUDE(:F1:TPONF.SRC)
             = 624 ;*********************************************************
             = 625 ; FILE: TPONF.SRC  4-17-87   DREW TAUSSIG
             = 626 ; UPDATAD 6/30/88 RESET MESSAGE FROM 8039 TO SUPER8
             = 627 ; FUNCTION: PERFORM SELF-TESTS FOR 750F SCANNER
             = 628 ;
0300 2400    = 629 TPON:    JMP     TROMSM
0302 C608    = 630 TRORET:  JZ      TPON30       ;JUMP IF THE CHECKSUM PASSED
0304 2300    = 631          MOV     A,#0         ;NO BEEPS WITH THIS ERROR
0306 642F    = 632          JMP     TPON90
             = 633 ;
             = 634 ;
0308 2431    = 635 TPON30:  JMP     TOCIA
030A C610    = 636 TOCRET:  JZ      TPON40       ;JUMP IF THE OCIA TEST PASSED
030C 2314    = 637          MOV     A,#EBDTON    ;BAD TONE FOR THIS ERROR
030E 642F    = 638          JMP     TPON90
             = 639 ;
0310 440E    = 640 TPON40:  JMP     TTAG
0312 99FC    = 641 TTARET:  ANL     P1,#255-(ETEST+ETMARK) ;CLEAR TEST AND TEST MARK LINES
0314 C61A    = 642          JZ      TPON50       ;JUMP IF THE TTAG TEST PASSED
0316 2332    = 643          MOV     A,#E1000M    ;1 SEC TONE FOR THIS ERROR
0318 642F    = 644          JMP     TPON90
             = 645 ;
031A 2380    = 646 TPON50:  MOV     A,#80H       ;TELL SUPER8 WE ARE ABOUT TO ASK
031C B808    = 647          MOV     R0,#ESUP8    ;FOR CHECKSUM RESULT
031E 90      = 648          MOVX    @R0,A        ;ADDED 6/30/88
031F BC1E    = 649          MOV     R4,#30       ;TRY FOR IF CKSM 30 TIMES BEFORE ERROR
             = 650 ;
0321 F5      = 651 TPON55:  SEL     MB1
0322 3400    = 652          CALL    HCOMM        ;GET CHECKSUM BYTE FROM SUPER8
0324 E5      = 653          SEL     MB0
0325 C62D    = 654          JZ      TPON60       ;VALID CHKSUM SETS A TO 0
0327 EC21    = 655          DJNZ    R4,TPON55
0329 2364    = 656          MOV     A,#E2000M    ;2 SEC TONE FOR I/F ROM CHKSUM ERROR
032B 642F    = 657          JMP     TPON90
             = 658 ;
032D 6458    = 659 TPON60:  JMP     TPORET       ;RETURN FROM THE POWER UP TESTS
             = 660 ;
```

```
032F 7433    = 661 TPON90: CALL    TERRWT          ;ERRORS COME HERE
0331 0400    = 662         JMP     RSTTRP          ;RESTART THE PROGRAM
             = 663 ;***********************************************************************
             = 664 ; FUNCTION: SELFTEST ERROR ROUTINE
             = 665 ;           SET TONE LENGTH TO ACC CONTENTS AND WAIT 1 SECOND
             = 666 ; ENTRY: A = TONE LENGTH
             = 667 ; EXIT: USES R7
             = 668 ;
0333 99DF    = 669 TERRWT: ANL     P1,#255-EGDLT   ;GDLT OFF
0335 8940    = 670         ORL     P1,#EBDLT       ;BDLT ON
             = 671 ;
0337 55      = 672         STRT    T
0338 25      = 673         EN      TCNTI           ;ENABLE THE TIMER OPERATION
             = 674 ;
0339 D5      = 675         SEL     RB1
033A BD28    = 676         MOV     R5,#ETONCT      ;SET THE TONE CYCLE COUNTER
033C AE      = 677         MOV     R6,A            ;SET BEEP TIMER
033D C5      = 678         SEL     RB0
             = 679 ;
033E BF32    = 680 TERR10: MOV     R7,#E1000M      ;SET TIMER FOR 1 SECOND
0340 FF      = 681 TERR12: MOV     A,R7
0341 9640    = 682         JNZ     TERR12          ;WAIT FOR TIME OUT
             = 683 ;
0343 83      = 684         RET
               685 $       INCLUDE(:F1:FPOWUP.SRC)
;*************************************
TROPG3: MOVP   A,@A
        RET
        ORG    400H
$       INCLUDE(:F1:HORSE1.SRC)
$       INCLUDE(:F1:HORSE2.SRC)
;*************************************
TROPG4: MOVP   A,@A
        RET
        ORG    500H
                                    = 686 ;***********************************************************************
$       INCLUDE(:F
             = 687 ; FILE: FPOWUP.SRC  06-21-88 13:10  BOB ACTIS
             = 688 ; ROUTINE: POWUP
             = 689 ; FUNCTION: INITIALIZE SYSTEM
             = 690 ;
0344 93      = 691 POW00: RETR                     ;RESET THE IIP FLIP-FLOP
0345         = 692 POWUP  EQU      $
0345 15      = 693         DIS     I
0346 35      = 694         DIS     TCNTI
0347 27      = 695         CLR     A
0348 D7      = 696         MOV     PSW,A
0349 7444    = 697         CALL    POW00           ;RESET IIP BIT
             = 698 ;
             = 699 ; SETUP PORTS
034B 23BF    = 700         MOV     A,#255-EVLSIR   ;PWR RST THE VLSI (NO EFFECT ON 750F)
034D 3A      = 701         OUTL    P2,A
034E 8A40    = 702         ORL     P2,#EVLSIR      ;ENABLE VLSI TO RUN
0350 239C    = 703         MOV     A,#EP12+EP13+ETONE+ELASDB
0352 39      = 704         OUTL    P1,A
             = 705 ;
             = 706 ; RESET THE FRAME CONTROL ARRAY
0353 B803    = 707         MOV     R0,#EFCRST
0355 90      = 708         MOVX    @R0,A
             = 709 ;
             = 710 ; GO PERFORM THE POWER UP TESTS.
             = 711 ; STICK IN TPON LOOP IF ANY FAILURES.
0356 6400    = 712         JMP     TPON
0358         = 713 TPORET EQU      $
             = 714 ;
             = 715 ; TPON PASSED. START THE INTERNAL TIMER
0358 D5      = 716         SEL     RB1
0359 BD28    = 717         MOV     R5,#ETONCT      ;SET THE TONE CYCLE COUNTER
035B C5      = 718         SEL     RB0
035C 55      = 719         STRT    T
035D 25      = 720         EN      TCNTI
             = 721 ;
             = 722 ; GREEN LIGHT, GOOD POWER UP TONE, LASER ON AND WAIT 1 SEC.
             = 723 ; BLINK THE GREEN LIGHT FOR THE MODIFIED 2-SCAN VERSION.
035E D5      = 724         SEL     RB1
035F BE0A    = 725         MOV     R6,#10          ;200MSEC BEEP
0361 C5      = 726         SEL     RB0
0362 99EF    = 727         ANL     P1,#255-ELASDB  ;LASER ON, TIME TO START BEFORE RDTAG
0364 8920    = 728         ORL     P1,#EGDLT       ;GREEN LED ON
0366 BF19    = 729         MOV     R7,#E500M
0368 FF      = 730 TPON15: MOV     A,R7
0369 9668    = 731         JNZ     TPON15          ;WAIT WITH LED ON
036B 99DF    = 732         ANL     P1,#0FFH-EGDLT  ;GREEN LED OFF
036D BF0D    = 733         MOV     R7,#E260M
036F FF      = 734 TPON16: MOV     A,R7
0370 966F    = 735         JNZ     TPON16          ;WAIT WITH LED OFF
0372 8920    = 736         ORL     P1,#EGDLT       ;GREEN LED ON
0374 BF0D    = 737         MOV     R7,#E260M
0376 FF      = 738 TPON17: MOV     A,R7
0377 9676    = 739         JNZ     TPON17          ;WAIT WITH LED ON
             = 740 ;
             = 741 ; REINITIALIZE AFTER TEST SEQUENCE
0379 99CF    = 742 POW20: ANL      P1,#255-(EGDLT+ELASDB) ;GOOD LIGHT OFF & LASER ON
```

```
037B 8942      = 743            ORL     P1,#EBDLT+EMTREB        ;BAD LIGHT ON & MOTOR ON (NO MOTOR ON F)
               = 744 ;
037D B803      = 745            MOV     R0,#EFCRST
037F 90        = 746            MOVX    @R0,A                   ;RESET THE FCA
0380 BF02      = 747            MOV     R7,#2                   ;SET TIMER FOR 40 MSEC
0382 FF        = 748 POW25:     MOV     A,R7
0383 9682      = 749            JNZ     POW25                   ;WAIT FOR FCA TO SEE SEGS IF ANY
               = 750 ;
               = 751 ; CLEAR DATA MEMORY AND PSW
0385 27        = 752            CLR     A
0386 D7        = 753            MOV     PSW,A                   ;CLEAR THE PSW
0387 B87F      = 754            MOV     R0,#7FH
0389 A0        = 755 POW30:     MOV     @R0,A                   ;CLEAR MEMORY
038A E889      = 756            DJNZ    R0,POW30
               = 757 ;
038C D5        = 758            SEL     RB1
038D BD28      = 759            MOV     R5,#ETONCT              ;SET THE TONE CYCLE COUNTER
038F C5        = 760            SEL     RB0
               = 761 ;
0390 F5        = 762            SEL     MB1
0391 C400      = 763            JMP     RDTAG
               = 764 ;****************************************
0393 A3        = 765 TROPG3:    MOVP    A,@A
0394 83        = 766            RET
0400           = 767            ORG     400H
               = 768 $          INCLUDE(:F1:HORSE1.SRC)
               = 769 ;*************************************************************
               = 770 ; FILE: HORSE1.SRC   HORSE TEST PART 1 OF 3.
               = 771 ; 07-03-86 09:05 BOB ACTIS
               = 772 ;
               = 773 ; ROUTINE: THORSE
               = 774 ;
               = 775 ;   HORSE TEST (HOST ORIGINATED SEGMENT EVALUATION) WILL RECEIVE
               = 776 ;   TEST TAG DEFINITION FROM HOST, COUNT THE NUMBER OF TIMES IT
               = 777 ;   'SEES' EACH SEGMENT OF THE TAG AND THEN SEND THE COUNT
               = 778 ;   INFORMATION TO THE HOST....REMAINS IN HORSE TEST UNTIL
               = 779 ;   DSATA=0, OR POWER RESET.
               = 780 ;
               = 781 ; BYTE DEFINITION
               = 782 ;
               = 783 ; TEST CONTROL BYTE = D1H
               = 784 ; THHDR = COUNT HEADER BYTE = 15H (AFTER PARITY INSERT = 95H)
               = 785 ; THTRLR = COUNT TRAILER BYTE = 2AH (AFTER PARITY INSERT = 6AH)
               = 786 ;
0400 85        = 787 TH000:     CLR     F0      ;F0 INDICATES CONTROL BYTE RECEIVED IF ON
0401 A5        = 788            CLR     F1      ;F1 ON INDICATES ODD BYTE RECEIVED
0402 B830      = 789            MOV     R0,#TSEG1 ;R0=SEG TABLE POINTER
0404 BB10      = 790            MOV     R3,#16  ;R3=LOOP COUNTER TO RECEIVE 16 DATA CHAR'S
0406 999F      = 791            ANL     P1,#255-(EGDLT+EBDLT) ;LIGHTS OFF
0408 8910      = 792            ORL     P1,#ELASDB      ;LASER OFF
040A 860E      = 793 TH005:     JNI     TH010   ;JMP IF FCA HAS DATA
040C 840A      = 794            JMP     TH005
               = 795 ;
               = 796 ;   FETCH DATA FROM FCA, DO FRAME RESET TO FCA, FETCH COMM DATA
               = 797 ;   IF BIT 7 SET, JMP TO POWER UP RESET IF COMM DATA=0.
               = 798 ;
040E B901      = 799 TH010:     MOV     R1,#01H
0410 81        = 800            MOVX    A,@R1   ;READ FCA S.R.
0411 91        = 801            MOVX    @R1,A   ;DO FCA FRAME RESET
0412 37        = 802            CPL     A
0413 F20A      = 803            JB7     TH005   ;RETURN IF FCA DOES NOT HAVE COMMM DATA
               = 804 ;
               = 805 ;   OTHERWISE, FETCH COMM DATA
               = 806 ;
0415 19        = 807            INC     R1      ;TO 02H TO READ COMM REG
0416 81        = 808            MOVX    A,@R1   ;READ FCA COMM REG
0417 A9        = 809            MOV     R1,A    ;R1=COMM DATA
0418 961C      = 810            JNZ     TH014   ;JMP IF DATA NOT=0
041A 0400      = 811 TH012:     JMP     RSTTRP  ;JMP TO POWER UP RESET IF COMM DATA=0
               = 812 ;
041C B40E      = 813 TH014:     CALL    CPARTY  ;CPARTY WILL CHK FOR CORRECT PARITY
041E 17        = 814            INC     A
041F 9600      = 815            JNZ     TH000   ;JMP BACK TO START IF INCORRECT PARITY
0421 F9        = 816            MOV     A,R1    ;R1=COMM DATA
0422 B62D      = 817            JF0     TH015   ;JMP IF CONTROL BYTE ALREADY RECEIVED
               = 818                            ;OTHERWISE, CHECK FOR CONTROL BYTE=D1H
0424 D301      = 819            XRL     A,#0D1H
0426 9600      = 820            JNZ     TH000   ;JMP BACK TO START IF NOT CONTROL BYTE
0428 95        = 821            CPL     F0      ;SET F0=1 TO INDICATE CONTROL BYTE RCVD
0429 8940      = 822            ORL     P1,#EBDLT ;BD-LT ON SAYS CNTL BYTE RCVD
042B 840A      = 823            JMP     TH005   ;BACK TO TH005 TO GET 16 DATA BYTES
               = 824 ;
               = 825 ;   PUT EVEN BYTES IN HIGH NIBBLE & ODD BYTES IN LOW NIBBLE
               = 826 ;
042D F9        = 827 TH015:     MOV     A,R1    ;R1=COMM DATA
042E 7634      = 828            JF1     TH020   ;JMP IF THIS IS ODD BYTE
0430 47        = 829            SWAP    A
0431 A0        = 830            MOV     @R0,A   ;PUT EVEN BYTE IN HIGH NIBBLE
0432 8436      = 831            JMP     TH029
0434 30        = 832 TH020:     XCHD    A,@R0   ;PUT ODD BYTE IN LOW NIBBLE
0435 18        = 833            INC     R0      ;INC R0 TO NEXT SEG TABLE ADDRESS
               = 834 ;
```

```
                = 835 ; CHECK FOR LAST BYTE OF CONTROL BYTE
                = 836 ;
0436 B5         = 837 THO29:  CPL    F1
0437 F9         = 838         MOV    A,R1
0438 9200       = 839         JB4    THO00        ;JMP = CONTROL BYTE
043A B240       = 840         JB5    THO30        ;JMP = LAST BYTE RCVD
043C EB0A       = 841         DJNZ   R3,THO05     ;JMP = MORE TO COME
043E 8400       = 842         JMP    THO00
                = 843 ;
                = 844 ; IF 16 BYTES RECEIVED, PERFORM TEST
                = 845 ;
0440 EB00       = 846 THO30:  DJNZ   R3,THO00     ;JMP = NOT 16 BYTES
0442 9462       = 847         CALL   TSCNT        ;GO COLLECT SEGMENTS
                = 848 ;
                = 849 ; SEND HEADER, COUNTS AND LAST BYTE TO COMPUTER
                = 850 ;
0444 B915       = 851         MOV    R1,#15H      ;SEND COUNT HEADER BYTE TO HOST
0446 B400       = 852         CALL   THSND        ;SEND HEADER
                = 853 ;
0448 BB08       = 854         MOV    R3,#8
044A B838       = 855         MOV    R0,#TCNT1    ;R0=COUNT POINTER
044C FB         = 856 THO50:  MOV    A,R3
044D 1253       = 857         JB0    THO55        ;JMP = ODD BYTE
044F F0         = 858         MOV    A,@R0
0450 47         = 859         SWAP   A
0451 8455       = 860         JMP    THO59
0453 30         = 861 THO55:  XCHD   A,@R0
0454 18         = 862         INC    R0
0455 530F       = 863 THO59:  ANL    A,#0FH
0457 A9         = 864         MOV    R1,A
0458 B400       = 865         CALL   THSND
045A EB4C       = 866         DJNZ   R3,THO50
                = 867 ;
045C B92A       = 868         MOV    R1,#2AH      ;2AH = COUNT TRAILER BYTE
045E B400       = 869         CALL   THSND        ;SEND TRAILER BYTE
0460 8400       = 870         JMP    THO00        ;FINISHED WITH THIS REQUEST, START OVER.
                  871 $       INCLUDE(:F1:HORSE2.SRC)
                = 872 ;****************************************************************
                = 873 ; FILE: HORSE2.SRC  HORSE TEST PART 2 OF 3.
                = 874 ; 07-03-86 10:35 BOB ACTIS
                = 875 ;
                = 876 ; ROUTINE: TSCNT - COUNT TEST SEGMENTS
                = 877 ;
                = 878 ; FUNCTION: COUNT THE NUMBER OF TIMES EACH OF TWO SEGMENTS ARE DETECTED
                = 879 ;           OVER A ONE SECOND PERIOD. TURN THE LASER ON DURING THE TEST.
                = 880 ;           EXIT TO POWER ON ENTRY IF ANYTHING RECEIVED FROM HOST.
                = 881 ;           WILL COMPARE 1ST 2 CHAR'' OF SEGMENT CAPTURED WITH
                = 882 ;           TSEG1 & TSEG2 AND RESET FCA SHIFT REG IF NO COMPARE.
                = 883 ;           4 CHAR SEG'S MUST BE PRECEDED BY 00H IN THE SEG TABLE...
                = 884 ;
                = 885 ; ENTRY:
                = 886 ;           TSEG1 = SEGMENT 1 DEFINITION (4 BYTES)
                = 887 ;           TSEG2 = SEGMENT 2 DEFINITION (4 BYTES)
                = 888 ;
                = 889 ; EXIT:
                = 890 ;           TCNT1 = SEGMENT 1 COUNT (2 BYTES)
                = 891 ;           TCNT2 = SEGMENT 2 COUNT (2 BYTES)
                = 892 ;
                = 893 ; *( A)
                = 894 ; *(R0)
                = 895 ; *(R1)
                = 896 ; *(TSCBUF) TO (TSCBUF+3)
                = 897 ;  RB0 (R7) = SECOND TIMER = 0
                = 898 ;
                = 899 ; PARAMETERS:
                = 900 ;
                = 901 ;           SEGMENT DEFINITION TABLE
                = 902 ;
                = 903 ;           BYTE 0 - 1ST AND 2ND CHAR (AS DETECTED OR ZERO IF 4-CHAR)
                = 904 ;           BYTE 1 - 3RD AND 4TH CHAR (1ST & 2ND ON 4-CHAR)
                = 905 ;           BYTE 2 - 5TH AND 6TH CHAR (3RD & 4TH ON 4-CHAR)
                = 906 ;           BYTE 3 - DECODED PARITY WORD
                = 907 ;
0462 99EF       = 908 TSCNT:  ANL    P1,#0FFH-ELASDB ;LASER ON
0464 BF02       = 909         MOV    R7,#02H
0466 B43B       = 910         CALL   TMWAIT       ;WAIT FOR LASER TO TURN ON
0468 BF32       = 911         MOV    R7,#E1000M
046A 27         = 912         CLR    A
046B B838       = 913         MOV    R0,#TCNT1
046D B909       = 914         MOV    R1,#9
046F A0         = 915 TSC02:  MOV    @R0,A        ;CLEAR TCNT1 TO TCNT1+9
0470 18         = 916         INC    R0
0471 E96F       = 917         DJNZ   R1,TSC02
                = 918 ;
                = 919 ; RESET FCA TO CLEAR ANY SEGMENTS
                = 920 ;
0473 B803       = 921         MOV    R0,#EFCRST
0475 90         = 922         MOVX   @R0,A
                = 923 ;
                = 924 ; IF SYMCAP THEN READ THE SEGMENT; EXIT IF HOST BYTE RECEIVED.
                = 925 ;
0476 A5         = 926 TSC04:  CLR    F1           ;F1 REMEMBERS TO INC TCNT1 OR TCNT2
```

```
0477 B801     = 927            MOV     R0,#ESRRD
0479 868D     = 928 TSC05:     JNI     TSC08       ;JMP IF SYMCAP OR HOST COMM. OCCURED
047B FF       = 929 TSC06:     MOV     A,R7         ;CHECK FOR 1 SECOND TIMEOUT
047C 9676     = 930            JNZ     TSC04
              = 931 ;
              = 932 ;          TURN LASER OFF & RETURN TO CALLER
              = 933 ;
047E 8910     = 934 TSC20:     ORL     P1,#ELASDB
0480 83       = 935            RET
              = 936 ;
0481 90       = 937 TSC07:     MOVX    @R0,A        ;RESET FCA SHIFT REG
0482 847B     = 938            JMP     TSC06
              = 939 ;
0484 80       = 940 TSC12:     MOVX    A,@R0        ;SHIFT OUT 2ND CHAR FROM FCA
0485 27       = 941            CLR     A
0486 B950     = 942            MOV     R1,#TSCBUF
0488 A1       = 943            MOV     @R1,A        ;PUT 00 TO R4 FOR 1ST TWO CHAR'S
0489 8499     = 944            JMP     TSC09
048B 0400     = 945 TSC11:     JMP     RSTTRP
048D B950     = 946 TSC08:     MOV     R1,#TSCBUF   ;START OF DATA CAPTURE BUFFER
048F 80       = 947            MOVX    A,@R0        ;READ 1ST CHAR FROM FCA
0490 F28B     = 948            JB7     TSC11        ;JMP TO POWER UP SEQ IF COMM. FROM HOST
0492 9284     = 949            JB4     TSC12        ;JMP IF 4 CHAR SEG...1ST 2 CHARS=00
0494 47       = 950            SWAP    A
0495 A1       = 951            MOV     @R1,A
0496 80       = 952            MOVX    A,@R0        ;READ 2ND CHAR FROM FCA
0497 31       = 953            XCHD    A,@R1
0498 F1       = 954            MOV     A,@R1
0499 B930     = 955 TSC09:     MOV     R1,#TSEG1
049B D1       = 956            XRL     A,@R1        ;COMPARE 1ST 2 CHAR'S WITH TSEG1
049C C6A6     = 957            JZ      TSC10        ;JMP IF COMPARED
049E B934     = 958            MOV     R1,#TSEG2
04A0 F1       = 959            MOV     A,@R1
04A1 B950     = 960            MOV     R1,#TSCBUF
04A3 D1       = 961            XRL     A,@R1        ;COMPARE 1ST 2 CHAR'S WITH TSEG2
04A4 9681     = 962            JNZ     TSC07        ;JMP TO RESET FCA S.R. IF NO COMPARE
              = 963 ;
04A6 B951     = 964 TSC10:     MOV     R1,#TSCBUF+1 ;SET UP TO READ NEXT 4 CHAR'S
04A8 B416     = 965            CALL    NEXT4        ;READ 3RD-6TH CHAR'S
              = 966 ;
04AA B831     = 967            MOV     R0,#TSEG1+1  ;COMPARE COMPLETE SEG TO TSEG1 & 2
04AC B42A     = 968            CALL    SGMTCH       ;COMPARE LAST 4 CHAR'S OF CAPTURED SEG
              = 969                                 ;TO TSEG1
04AE C6B8     = 970            JZ      SEGONE       ;JMP IF SEG 1 COMPARED
04B0 B5       = 971            CPL     F1           ;F1=1 SAYS TSEG2 BEING COMPARED
04B1 B835     = 972            MOV     R0,#TSEG2+1
04B3 B42A     = 973            CALL    SGMTCH
04B5 967B     = 974            JNZ     TSC06        ;JMP IF NO MATCH
04B7 B83B     = 975            MOV     R0,#TCNT2+1
04B9 76BD     = 976            JF1     INCREM       ;JMP IF TSEG 2 MATCHED TO INCREMENT
04BB B839     = 977 SEGONE:    MOV     R0,#TCNT1+1  ;SET UP R0 TO INCREMENT TSEG 1 CNTR
04BD 17       = 978 INCREM:    INC     A            ;ACC NOW = 01
04BE 60       = 979            ADD     A,@R0        ;INC LOW BYTE
04BF A0       = 980            MOV     @R0,A
04C0 C8       = 981            DEC     R0
04C1 27       = 982            CLR     A
04C2 70       = 983            ADDC    A,@R0        ;INC HIGH BYTE IF CARRY
04C3 A0       = 984            MOV     @R0,A
04C4 847B     = 985            JMP     TSC06        ;JMP TO CHK FOR 1 SECOND TIMEOUT
              986 ;************************************
04C6 A3       987 TROPG4:      MOVP    A,@A
04C7 83       988               RET
0500          989               ORG     500H
              990 $            INCLUDE(:F1:HORSE3.SRC)
              = 991 ;******************************************************************
              = 992 ; FILE: HORSE3.SRC   HORSE TEST FILE 3 OF 3.
              = 993 ;   07-03-86 09:30 BOB ACTIS
              = 994 ;******************************************************************
              = 995 ; ROUTINE: THSND
              = 996 ;
              = 997 ; FUNCTION: SEND A BYTE TO HOST. WAITS FOR TRANSMITTER READY.
              = 998 ;
              = 999 ; ENTRY:
              =1000 ;          (R1) = BYTE TO SEND (NO PARITY)
              =1001 ;
              =1002 ; EXIT:
              =1003 ;          *(A)
              =1004 ;          *(R1)
              =1005 ;          *(R4)
              =1006 ;
0500 0A       =1007 THSND:     IN      A,P2
0501 9200     =1008            JB4     THSND        ;JMP = HOST COMM. REG. NOT READY
0503 F9       =1009            MOV     A,R1         ;(A) = BYTE
0504 B40E     =1010            CALL    CPARTY
0506 37       =1011            CPL     A            ;SET FOR ODD PARITY
0507 53C0     =1012            ANL     A,#0C0H
0509 49       =1013            ORL     A,R1         ;(A) = FINAL BYTE WITH PARITY
050A B902     =1014            MOV     R1,#EOCIA
050C 91       =1015            MOVX    @R1,A
050D 83       =1016            RET
              =1017 ;******************************************************************
              =1018 ; ROUTINE: CPARTY
```

```
                =1019 ;
                =1020 ; FUNCTION: COMPUTE PARITY OF ALTERNATE BITS OF BYTE
                =1021 ;
                =1022 ; ENTRY:
                =1023 ;         (A) = BYTE
                =1024 ;
                =1025 ; EXIT:
                =1026 ;         (A) = PARITY
                =1027 ;               B7 = B5 = B3 = B1 = PARITY OF ODD BITS
                =1028 ;               B6 = B4 = B2 = B0 = PARITY OF EVEN BITS
                =1029 ;         *(R4)
                =1030 ;
050E AC         =1031 CPARTY:  MOV     R4,A
050F 47         =1032          SWAP    A
0510 DC         =1033          XRL     A,R4
0511 AC         =1034          MOV     R4,A
0512 E7         =1035          RL      A
0513 E7         =1036          RL      A
0514 DC         =1037          XRL     A,R4
0515 83         =1038          RET
                =1039 ;****************************************************************
                =1040 ; NEXT4:   READ 3RD-6TH CHARACTERS
                =1041 ;
0516 80         =1042 NEXT4:   MOVX    A,@R0           ;READ 3RD CHAR FROM LSI3
0517 47         =1043          SWAP    A
0518 A1         =1044          MOV     @R1,A           ;PUT 3RD TO HI NIB. OF TSCBUF+1
0519 80         =1045          MOVX    A,@R0           ;READ 4TH CHAR
051A 31         =1046          XCHD    A,@R1           ;PUT 4TH TO LO TSCBUF+1
051B 19         =1047          INC     R1              ;POINTS TO TSCBUF+2 NOW
051C 80         =1048          MOVX    A,@R0           ;READ 5TH CHAR
051D 47         =1049          SWAP    A
051E A1         =1050          MOV     @R1,A           ;PUT 5TH TO HI TSCBUF+2
051F 80         =1051          MOVX    A,@R0           ;READ 6TH CHAR
0520 31         =1052          XCHD    A,@R1           ;PUT 6TH TO LO TSCBUF+2
0521 19         =1053          INC     R1
0522 B804       =1054          MOV     R0,#04H
0524 80         =1055          MOVX    A,@R0           ;R0=04H,@R0=PARITY DECODE READ OF LSI3
0525 A1         =1056          MOV     @R1,A           ;PUT PARITY DECODE TO TSCBUF+3
0526 B801       =1057          MOV     R0,#01H
0528 90         =1058          MOVX    @R0,A           ;FR.RST TO LSI 3
0529 83         =1059          RET
                =1060 ;****************************************************************
                =1061 ; ROUTINE: SGMTCH - MATCH SEGMENTS
                =1062 ;
                =1063 ; FUNCTION: DETERMINE IF TWO SEGMENTS HAVE IDENTICAL DATA AND PARITY
                =1064 ;           (LAST 4 CHARACTERS OF SEG AND PARITY)
                =1065 ;
                =1066 ; ENTRY:
                =1067 ;    (R0) = ADRS OF ONE SEGMENT - SAME FORMAT AS REG 4-7
                =1068 ;    (TSCBUF+1) = 3RD AND 4TH CHAR
                =1069 ;    (TSCBUF+2) = 5TH AND 6TH CHAR
                =1070 ;    (TSCBUF+3) = DECODED PARITY WORD
                =1071 ;
                =1072 ; EXIT:
                =1073 ;    (A) = 0 FOR MATCH
                =1074 ;    *(R0)
                =1075 ;
052A F0         =1076 SGMTCH:  MOV     A,@R0
052B B951       =1077          MOV     R1,#TSCBUF+1
052D D1         =1078          XRL     A,@R1
052E 963A       =1079          JNZ     SGM90           ;JMP = 2ND BYTE NO MATCH
0530 18         =1080          INC     R0
0531 19         =1081          INC     R1
0532 F0         =1082          MOV     A,@R0
0533 D1         =1083          XRL     A,@R1
0534 963A       =1084          JNZ     SGM90           ;JMP = 3RD BYTE NO MATCH
0536 18         =1085          INC     R0
0537 19         =1086          INC     R1
0538 F0         =1087          MOV     A,@R0
0539 D1         =1088          XRL     A,@R1
053A 83         =1089 SGM90:   RET
                =1090 ;****************************************************************
                =1091 ; ROUTINE: TMWAIT
                =1092 ;
                =1093 ; FUNCTION: WAIT FOR 20MSEC TIMER TO EXHAUST
                =1094 ;
                =1095 ; ENTRY:
                =1096 ;    RB0 (R7) = TIMER (20MSEC RES)
                =1097 ;
                =1098 ; EXIT:
                =1099 ;    RB0 (R7) = 0
                =1100 ;
053B 27         =1101 TMWAIT:  CLR     A
053C 62         =1102          MOV     T,A             ;CLEAR THE TIMER COUNTER
053D 25         =1103          EN      TCNTI           ;ENABLE TIMER INTERRUPT
053E 55         =1104          STRT    T               ;CLEAR TIMER PRESCALER
                =1105 ;
053F FF         =1106 TMWAI0:  MOV     A,R7
0540 963F       =1107          JNZ     TMWAI0
0542 83         =1108          RET
                 1109 ;****************************************
0543 A3          1110 TROPG5:  MOVP    A,@A
```

```
0544 83       1111          RET
0600          1112          ORG     600H
              1113 $        INCLUDE(:F1:FCKCTS.SRC)
             =1114 ;********************************************************************
             =1115 ; FILE: FCKCTS.SRC  10-08-86 15:45  BOB ACTIS
             =1116 ; ROUTINE: CKCNTS
             =1117 ; FUNCTION: CHECK SEGMENT BUFFER TOTAL COUNTS FOR ENOUGH SEGMENTS FOR
             =1118 ;           A POSSIBLE VALID VERSION.
             =1119 ; ENTRY: NO SETUP
             =1120 ; EXIT:  A = 0 IF ENOUGH SEGMENTS
             =1121 ;        A <> 0 IF NOT ENOUGH SEGMENTS OR (VERSION D IF IBM-OCR I/F)
             =1122 ;        USES R0,R1,F0
             =1123 ;
0600 B9FE    =1124 CKCNTS:  MOV     R1,#-2         ;SETUP MINIMUM SCANS REQUIRED VALUE
             =1125 ;
0602 85      =1126          CLR     F0
0603 0A      =1127          IN      A,P2
0604 37      =1128          CPL     A
0605 F208    =1129          JB7     CKCN05         ;JUMP IF FUJITSU I/F
0607 95      =1130          CPL     F0             ;SET F0 IF IBM-OCR I/F
             =1131 ;
0608 B835    =1132 CKCN05:  MOV     R0,#R6STOT
060A F0      =1133          MOV     A,@R0
060B 69      =1134          ADD     A,R1
060C F622    =1135          JC      CKCN20         ;POSSIBLE UPC-A, EAN-13 OR UPC-D-BLK2
             =1136 ;
060E B82D    =1137          MOV     R0,#L6STOT
0610 F0      =1138          MOV     A,@R0
0611 69      =1139          ADD     A,R1
0612 F62F    =1140          JC      CKCN30         ;POSSIBLE UPC-E OR UPC-D-BLK1
             =1141 ;
0614 B83B    =1142          MOV     R0,#L4STOT
0616 F0      =1143          MOV     A,@R0
0617 69      =1144          ADD     A,R1
0618 E695    =1145          JNC     CKCNNG
             =1146 ;
061A B841    =1147 CKCN10:  MOV     R0,#R4STOT
061C F0      =1148          MOV     A,@R0
061D 69      =1149          ADD     A,R1
061E F693    =1150          JC      CKCNOK         ;POSSIBLE EAN-8
0620 C495    =1151          JMP     CKCNNG
             =1152 ;
0622 B82D    =1153 CKCN20:  MOV     R0,#L6STOT
0624 F0      =1154          MOV     A,@R0
0625 69      =1155          ADD     A,R1
0626 E695    =1156          JNC     CKCNNG
             =1157 ;
0628 B827    =1158          MOV     R0,#L6S1+3
062A F0      =1159          MOV     A,@R0          ;GET THE PARITY DECODE BYTE
062B B24F    =1160          JB5     CKCN50         ;JUMP IF UPC-D SEGMENT
062D C493    =1161          JMP     CKCNOK         ;POSSIBLE UPC-A OR EAN-13
             =1162 ;
062F B827    =1163 CKCN30:  MOV     R0,#L6S1+3     ;CHECK L6 BUFFER 1
0631 F0      =1164          MOV     A,@R0
0632 B23F    =1165          JB5     CKCN40         ;JUMP IF UPC-D SEGMENT
0634 9293    =1166          JB4     CKCNOK         ;POSSIBLE UPC-E
             =1167 ;
0636 B82B    =1168          MOV     R0,#L6S2+3     ;CHECK L6 BUFFER 2
0638 F0      =1169          MOV     A,@R0
0639 B23F    =1170          JB5     CKCN40         ;JUMP IF UPC-D SEGMENT
063B 9293    =1171          JB4     CKCNOK         ;POSSIBLE UPC-E
063D C495    =1172          JMP     CKCNNG
             =1173 ;
063F B865    =1174 CKCN40:  MOV     R0,#N6STOT
0641 F0      =1175          MOV     A,@R0
0642 69      =1176          ADD     A,R1
0643 E695    =1177          JNC     CKCNNG
             =1178 ;
0645 B83B    =1179 CKCN45:  MOV     R0,#L4STOT
0647 F0      =1180          MOV     A,@R0
0648 69      =1181          ADD     A,R1
0649 B695    =1182          JF0     CKCNNG         ;JUMP IF IBM-OCR
064B F693    =1183          JC      CKCNOK         ;POSSIBLE UPC-D1
064D C495    =1184          JMP     CKCNNG
             =1185 ;
064F B841    =1186 CKCN50:  MOV     R0,#R4STOT
0651 F0      =1187          MOV     A,@R0
0652 69      =1188          ADD     A,R1
0653 E695    =1189          JNC     CKCNNG
             =1190 ;
0655 B859    =1191          MOV     R0,#N4STOT
0657 F0      =1192          MOV     A,@R0
0658 69      =1193          ADD     A,R1
0659 F675    =1194          JC      CKCN70         ;POSSIBLE UPC-D4 OR D5
             =1195 ;
065B B85F    =1196          MOV     R0,#N5STOT
065D F0      =1197          MOV     A,@R0
065E 69      =1198          ADD     A,R1
065F F66B    =1199          JC      CKCN60
             =1200 ;
0661 B84D    =1201          MOV     R0,#N2STOT
0663 F0      =1202          MOV     A,@R0
```

```
0664 69       =1203           ADD     A,R1
0665 B695     =1204           JFO     CKCNNG          ;JUMP IF IBM-OCR
0667 F693     =1205           JC      CKCNOK          ;POSSIBLE UPC-D2
0669 C495     =1206           JMP     CKCNNG
              =1207 ;
066B B853     =1208 CKCN60:   MOV     R0,#N3STOT
066D F0       =1209           MOV     A,@R0
066E 69       =1210           ADD     A,R1
066F B695     =1211           JFO     CKCNNG          ;JUMP IF IBM-OCR
0671 F693     =1212           JC      CKCNOK          ;POSSIBLE UPC-D3
0673 C495     =1213           JMP     CKCNNG
              =1214 ;
0675 B847     =1215 CKCN70:   MOV     R0,#N1STOT
0677 F0       =1216           MOV     A,@R0
0678 69       =1217           ADD     A,R1
0679 E695     =1218           JNC     CKCNNG
              =1219 ;
067B B865     =1220           MOV     R0,#N6STOT
067D F0       =1221           MOV     A,@R0
067E 69       =1222           ADD     A,R1
067F F68B     =1223           JC      CKCN80
              =1224 ;
0681 B85F     =1225           MOV     R0,#N5STOT
0683 F0       =1226           MOV     A,@R0
0684 69       =1227           ADD     A,R1
0685 B695     =1228           JFO     CKCNNG          ;JUMP IF IBM-OCR
0687 F693     =1229           JC      CKCNOK          ;POSSIBLE UPC-D4
0689 C495     =1230           JMP     CKCNNG
              =1231 ;
068B B853     =1232 CKCN80:   MOV     R0,#N3STOT
068D F0       =1233           MOV     A,@R0
068E 69       =1234           ADD     A,R1
068F B695     =1235           JFO     CKCNNG          ;JUMP IF IBM-OCR
0691 E695     =1236           JNC     CKCNNG          ;FALL THRU POSSIBLE UPC-D5
              =1237 ;
0693 27       =1238 CKCNOK:   CLR     A               ;ENOUGH SCANS FOR A POSSIBLE SEGMENT
0694 83       =1239           RET
              =1240 ;
0695 27       =1241 CKCNNG:   CLR     A               ;NO POSSIBLE VERSIONS YET
0696 37       =1242           CPL     A
0697 83       =1243           RET
              1244 $         INCLUDE(:F1:COPYRT.SRC)
              =1245 ;****************************************************************
              =1246 ;
0698 434F5059 =1247           DB      'COPYRIGHT (C)1987 '
069C 52494748
06A0 54202843
06A4 29313938
06A8 3720
06AA 53504543 =1248           DB      'SPECTRA-PHYSICS, INC. '
06AE 5452412D
06B2 50485953
06B6 4943532C
06BA 20494E43
06BE 2E20
06C0 414C4C20 =1249           DB      'ALL RIGHTS RESERVED'
06C4 52494748
06C8 54532052
06CC 45534552
06D0 564544
              =1250 ;
              =1251 ;****************************************************************
              1252 ;***************************************
06D3 A3       1253 TROPG6:   MOVP    A,@A
06D4 83       1254           RET
0700          1255           ORG     700H
              1256 $         INCLUDE(:F1:DRSUMT.SRC)
              =1257 ;****************************************************************
              =1258 ; FILE: DRSUMT  05-28-86 11:00  BOB ACTIS
              =1259 ;****************************************************************
              =1260 ; ROUTINE: SUM4BY, SUM3BY, SUM2BY
              =1261 ; FUNCTION: ADD 4,3 OR 2 BYTE SEGMENT DATA TO ACCUMULATOR
              =1262 ; ENTRY: R0 = START ADDRESS OF SEGMENT BUFFER TO SUM
              =1263 ; EXIT:  R0 = END ADDRESS OF SEGMENT BUFFER
              =1264 ;        A = RUNNING SUM (BASE 256) OF SEGMENT BUFFER DATA
              =1265 ;
0700 60       =1266 SUM4BY:   ADD     A,@R0
0701 18       =1267           INC     R0
0702 60       =1268 SUM3BY:   ADD     A,@R0
0703 18       =1269           INC     R0
0704 60       =1270 SUM2BY:   ADD     A,@R0
0705 18       =1271           INC     R0
0706 60       =1272           ADD     A,@R0
0707 83       =1273           RET
              =1274 ;****************************************************************
              =1275 ; ROUTINE: DRSUMT  DOUBLE READ SUM TEST
              =1276 ; FUNCTION: CALCULATE THE LABEL DATA SUM (BASE 256)
              =1277 ;           COMPARE IT TO THE PREVIOUS LABEL SUM
              =1278 ;           SAVE THE NEW SUM
              =1279 ; ENTRY: A VALID LABEL VERSION HAS BEEN FOUND
              =1280 ; EXIT: USES R0
              =1281 ;       LABEL DATA SUM STORED IN DRSUM
```

```
                    =1282 ;         A=0 IF OLD=NEW (CONSECUTIVE LABELS ARE THE SAME)
                    =1283 ;         A<>0 IF OLD<>NEW (CONSECUTIVE LABELS ARE DIFFERENT)
                    =1284 ;
0708 FE             =1285 DRSUMT: MOV    A,R6            ;GET VERSION FLAG
0709 530F           =1286         ANL    A,#0FH          ;MASK VERSION POINTER
070B 0300           =1287         ADD    A,#0            ;SETUP CARRY FOR DA
070D 57             =1288         DA     A
070E 926C           =1289         JB4    DRVRNG          ;JUMP IF POINTER > 9. ILLEGAL VERSION.
                    =1290 ;
0710 0313           =1291         ADD    A,#LOW  DRSTBL  ;ADD OFFSET TO TABEL ADDRESS
0712 B3             =1292         JMPP   @A              ;JUMP TO VERSION ROUTINE
0713 6C             =1293 DRSTBL: DB     LOW DRVRNG      ;NO VALID VERSION. POINTER=0.
0714 1D             =1294         DB     LOW DRSMA
0715 1D             =1295         DB     LOW DRSM13
0716 20             =1296         DB     LOW DRSME
0717 5E             =1297         DB     LOW DRSM8
0718 42             =1298         DB     LOW DRSMD1
0719 4B             =1299         DB     LOW DRSMD2
071A 39             =1300         DB     LOW DRSMD3
071B 2C             =1301         DB     LOW DRSMD4
071C 23             =1302         DB     LOW DRSMD5
                    =1303 ;
071D                =1304 DRSMA  EQU    $
071D 27             =1305 DRSM13: CLR    A
071E E454           =1306         JMP    DRSM7B          ;GO SUM 7 BYTES
                    =1307 ;
0720 27             =1308 DRSME: CLR    A
0721 E458           =1309         JMP    DRSM7C          ;GO SUM 7 CHARACTERS
                    =1310 ;
0723 27             =1311 DRSMD5: CLR    A
0724 B860           =1312         MOV    R0,#N6S1
0726 F404           =1313         CALL   SUM2BY
0728 B84E           =1314         MOV    R0,#N3S1
072A E42F           =1315         JMP    DRSM5X          ;GO FINISH THE D5 SUM
                    =1316 ;
072C 27             =1317 DRSMD4: CLR    A
072D B85A           =1318         MOV    R0,#N5S1
072F F404           =1319 DRSM5X: CALL   SUM2BY
0731 B854           =1320         MOV    R0,#N4S1
0733 F404           =1321         CALL   SUM2BY
0735 B842           =1322         MOV    R0,#N1S1
0737 E44E           =1323         JMP    DRSM4X          ;GO FINISH THE D4 OR D5 SUM
                    =1324 ;
0739 27             =1325 DRSMD3: CLR    A
073A B85A           =1326         MOV    R0,#N5S1
073C F404           =1327         CALL   SUM2BY
073E B84E           =1328         MOV    R0,#N3S1
0740 E44E           =1329         JMP    DRSM3X          ;GO FINISH THE D3 SUM
                    =1330 ;
0742 27             =1331 DRSMD1: CLR    A
0743 B860           =1332         MOV    R0,#N6S1
0745 F404           =1333         CALL   SUM2BY
0747 B836           =1334         MOV    R0,#L4S1
0749 E456           =1335         JMP    DRSM1X          ;GO FINISH THE D1 SUM
                    =1336 ;
074B 27             =1337 DRSMD2: CLR    A
074C B848           =1338         MOV    R0,#N2S1
074E                =1339 DRSM3X EQU    $
074E F404           =1340 DRSM4X: CALL   SUM2BY
0750 B83C           =1341         MOV    R0,#R4S1
0752 F404           =1342         CALL   SUM2BY
0754 B82E           =1343 DRSM7B: MOV    R0,#R6S1        ;SUM 7 BYTES
0756 F402           =1344 DRSM1X: CALL   SUM3BY
0758 B824           =1345 DRSM7C: MOV    R0,#L6S1        ;SUM 7 CHARACTERS
075A F400           =1346         CALL   SUM4BY
075C E467           =1347         JMP    DRSMDN          ;JUMP - THE SUM IS FINISHED
                    =1348 ;
075E 27             =1349 DRSM8: CLR    A
075F B836           =1350         MOV    R0,#L4S1
0761 F404           =1351         CALL   SUM2BY
0763 B83C           =1352         MOV    R0,#R4S1
0765 F404           =1353         CALL   SUM2BY
                    =1354 ;
0767 B87C           =1355 DRSMDN: MOV    R0,#DRSUM
0769 20             =1356         XCH    A,@R0           ;SAVE THE NEW SUM IN DRSUM
076A D0             =1357         XRL    A,@R0           ;COMPARE THE OLD AND NEW SUM
076B 83             =1358         RET
                    =1359 ;
076C 27             =1360 DRVRNG: CLR    A               ;DOUBLE READ VERSION N/G
076D 83             =1361         RET
                     1362 ;*************************************
076E A3              1363 TROPG7: MOVP   A,@A
076F 83              1364         RET
0800                 1365         ORG    800H            ;START OF MEMORY BANK 1
                     1366 $       INCLUDE(:F1:VERDLB.SRC)
                    =1367 ;******************************************************************
                    =1368 ; FILE: VERDLB.SRC  6-17-86 17:15  BOB ACTIS
                    =1369 ;       VERSION "D" FIRMWARE LIBRARY.
                    =1370 ;******************************************************************
                    =1371 ; ROUTINE: CLR6SG
                    =1372 ; FUNCTION: CLEAR 6-CHAR SEGMENTS AND COUNTERS.
                    =1373 ; ENTRY: START ADDRESS AND COUNT IN DEFS TABLE.
                    =1374 ; EXIT:  A = 0
```

```
                         =1375 ;          R0 = END OF 6-CHAR BUFFER/COUNTER SPACE PLUS 1.
                         =1376 ;          R2 = 0
                         =1377 ;          6-CHAR BUFFER/COUNTER SPACE = 0'S.
                         =1378 ;
0800 B824                =1379 CLR6SG: MOV    R0,#BF6CST      ;START OF 6-CHAR BUFFER AREA
0802 BA12                =1380         MOV    R2,#BF6CNT      ;NUMBER OF BYTES IN BUFFER
0804 0410                =1381         JMP    CLRT00          ;JUMP TO THE CLEAR LOOP
                         =1382 ;****************************************************************
                         =1383 ; ROUTINE: CLR4SG
                         =1384 ; FUNCTION: CLEAR 4-CHAR SEGMENTS AND COUNTERS.
                         =1385 ; ENTRY: START ADDRESS AND COUNT IN DEFS TABLE.
                         =1386 ; EXIT:  A = 0
                         =1387 ;          R0 = END OF 4-CHAR BUFFER/COUNTER SPACE PLUS 1.
                         =1388 ;          R2 = 0
                         =1389 ;          4-CHAR BUFFER/COUNTER SPACE = 0'S.
                         =1390 ;
0806 B836                =1391 CLR4SG: MOV    R0,#BF4CST      ;START OF 4-CHAR BUFFER AREA
0808 BA30                =1392         MOV    R2,#BF4CNT      ;NUMBER OF BYTES IN BUFFER
080A 0410                =1393         JMP    CLRT00          ;JUMP TO THE CLEAR LOOP
                         =1394 ;****************************************************************
                         =1395 ; ROUTINE: CLRSNB
                         =1396 ; FUNCTION: CLEAR THE SCAN BUFFER.
                         =1397 ; ENTRY: START ADDRESS IN DEFS TABLE.
                         =1398 ; EXIT:  A = 0
                         =1399 ;          R0 = END OF SCAN BUFFER SPACE PLUS 1.
                         =1400 ;          R2 = 0
                         =1401 ;          SCAN BUFFER SPACE = 0'S.
                         =1402 ;
080C B820                =1403 CLRSNB: MOV    R0,#SCNBUF      ;START OF SCAN BUFFER AREA
080E BA04                =1404         MOV    R2,#4           ;NUMBER OF BYTES IN BUFFER
0810 27                  =1405 CLRT00: CLR    A               ;CLEAR LOOP USED BY OTHER ROUTINES
0811 A0                  =1406 CLRSN1: MOV    @R0,A
0812 18                  =1407         INC    R0
0813 EA11                =1408         DJNZ   R2,CLRSN1
0815 83                  =1409         RET
                         =1410 ;****************************************************************
                         =1411 ; ROUTINE: CLRSBF
                         =1412 ; FUNCTION: CLEAR SEND BUFFER, POINTER AND FLAG.
                         =1413 ; ENTRY: START ADDRESS AND COUNT IN DEFS TABLE.
                         =1414 ;          RB0
                         =1415 ; EXIT:  A = 0
                         =1416 ;          R0 = END OF SEND BUFFER SPACE PLUS 1.
                         =1417 ;          R2 = 0
                         =1418 ;          SEND BUFFER SPACE = 0CCH'S. (TERMINATION BYTES)
                         =1419 ;          SEND BUFFER FULL FLAG CLEAR. RB0-R4-B3
                         =1420 ;          SEND BUFFER POINTER SET TO PACKED DATA START ADDRESS.
                         =1421 ;
0816 FC                  =1422 CLRSBF: MOV    A,R4
0817 53F7                =1423         ANL    A,#255-ESBFUL   ;CLEAR SEND BUFFER FULL FLAG
0819 AC                  =1424         MOV    R4,A
                         =1425 ;
081A B866                =1426         MOV    R0,#SBFPNT
081C B0CE                =1427         MOV    @R0,#SBSTRT     ;SET POINTER TO PACKED START ADDRESS
                         =1428 ;
081E B867                =1429         MOV    R0,#SBUF        ;START OF SEND BUFFER AREA
0820 BA12                =1430         MOV    R2,#SBUFSZ      ;NUMBER OF BYTES IN BUFFER
0822 23CC                =1431         MOV    A,#0CCH         ;LOAD TERMINATION BYTES
0824 0411                =1432         JMP    CLRSN1          ;JUMP TO THE CLEAR LOOP
                         =1433 ;****************************************************************
                         =1434 ; ROUTINE: MOV2BY, MOV3BY, MOV4BY
                         =1435 ; FUNCTION: MOVE BYTES FROM ONE BUFFER TO ANOTHER BUFFER.
                         =1436 ; ENTRY: R0 = FIRST BYTE ADDRESS OF SOURCE BUFFER.
                         =1437 ;          R1 = FIRST AVAILABLE BYTE ADDRESS OF DESTINATION BUFFER.
                         =1438 ; EXIT: DATA MOVED FROM SOURCE BUFFER TO DESTINATION BUFFER.
                         =1439 ;          R0 = END OF SOURCE BUFFER ADDRESS PLUS 1.
                         =1440 ;          R1 = NEXT AVAILABLE BYTE ADDRESS OF DESTINATION BUFFER.
                         =1441 ;          R2 = 0
                         =1442 ;          A = LAST BYTE TRANSFERED
                         =1443 ;
0826 BA02                =1444 MOV2BY: MOV    R2,#2
0828 0430                =1445         JMP    MOVXBY
082A BA03                =1446 MOV3BY: MOV    R2,#3
082C 0430                =1447         JMP    MOVXBY
082E BA04                =1448 MOV4BY: MOV    R2,#4
0830 F0                  =1449 MOVXBY: MOV    A,@R0
0831 A1                  =1450         MOV    @R1,A
0832 18                  =1451         INC    R0
0833 19                  =1452         INC    R1
0834 EA30                =1453         DJNZ   R2,MOVXBY
0836 83                  =1454         RET
                         =1455 ;****************************************************************
                         =1456 ; ROUTINE: SGSUM4, SGSUM6
                         =1457 ; FUNCTION: SUM THE DIGITS OF A SEGMENT FOR THE MOD-10 TEST.
                         =1458 ;          ALL ARITHMETIC IS ASSUMED BCD AND ONLY THE UNITS DIGIT
                         =1459 ;          IS VALID IN THE SUMS.
                         =1460 ; ENTRY: R0 = FIRST BYTE ADDRESS OF SEGMENT TO BE SUMMED.
                         =1461 ; EXIT: R0 = NOT CHANGED
                         =1462 ;          R2 = C1+C3+C5  [C1+C3]
                         =1463 ;          A  = C2+C4+C6  [C2+C4]
                         =1464 ;          F0 IS USED
                         =1465 ;
0837 85                  =1466 SGSUM4: CLR    F0
```

```
0838 95      =1467           CPL     F0              ;SET F0 FOR 4-CHAR SUM
0839 043C    =1468           JMP     SGSUMX
             =1469 ;
083B 85      =1470 SGSUM6:   CLR     F0              ;CLEAR F0 FOR 6-CHAR SUM
083C BAF0    =1471 SGSUMX:   MOV     R2,#0F0H        ;MASK FOR ODD DIGITS
083E F0      =1472           MOV     A,@R0           ;C1
083F 5A      =1473           ANL     A,R2
0840 18      =1474           INC     R0
0841 60      =1475           ADD     A,@R0           ;C1+C3
0842 57      =1476           DA      A
0843 5A      =1477           ANL     A,R2
0844 B649    =1478           JF0     SGSUMY          ;JUMP IF 4-CHAR SUM
             =1479 ;
0846 18      =1480           INC     R0
0847 60      =1481           ADD     A,@R0           ;C1+C3+C5
0848 57      =1482           DA      A
0849 47      =1483 SGSUMY:   SWAP    A               ;PUT SUM IN LOW BYTE
084A AA      =1484           MOV     R2,A            ;SAVE C1+C3+C5  [C1+C3]
             =1485 ;
084B F0      =1486           MOV     A,@R0           ;C6  [C4]
084C C8      =1487           DEC     R0
084D 60      =1488           ADD     A,@R0           ;C6+C4  [C4+C2]
084E 57      =1489           DA      A
084F B654    =1490           JF0     SGSUMR          ;JUMP IF 4-CHAR SUM
             =1491 ;
0851 C8      =1492           DEC     R0
0852 60      =1493           ADD     A,@R0           ;C6+C4+C2
0853 57      =1494           DA      A
0854 83      =1495 SGSUMR:   RET
             =1496 ;********************************************************************
             =1497 ; ROUTINE: APL3R2
             =1498 ; FUNCTION: ADD 3*R2 TO A.  (BCD)
             =1499 ; ENTRY:  NO SETUP
             =1500 ; EXIT:   A = A+(3*R2)
             =1501 ;         R2 = NOT CHANGED
             =1502 ;
0855 6A      =1503 APL3R2:   ADD     A,R2
0856 57      =1504           DA      A
0857 6A      =1505           ADD     A,R2
0858 57      =1506           DA      A
0859 6A      =1507           ADD     A,R2
085A 57      =1508           DA      A
085B 83      =1509           RET
             =1510 ;********************************************************************
             =1511 ; ROUTINE: MOD104  6-2-86  14:25  BOB ACTIS
             =1512 ; FUNCTION: CALCULATE 4 CHARACTER MODULO 10 CHECKSUM VALUE
             =1513 ; ENTRY:  R0 = FIRST BYTE ADDRESS OF SEGMENT TO BE PROCESSED
             =1514 ; EXIT:   A = CALCULATED VALUE
             =1515 ;
085C 1437    =1516 MOD104:   CALL    SGSUM4
085E 1455    =1517           CALL    APL3R2
0860 83      =1518           RET
             =1519 ;********************************************************************
             =1520 ; ROUTINE: MOD106  6-2-86  14:25  BOB ACTIS
             =1521 ; FUNCTION: CALCULATE 6 CHARACTER MODULO 10 CHECKSUM VALUE
             =1522 ; ENTRY:  R0 = FIRST BYTE ADDRESS OF SEGMENT TO BE PROCESSED
             =1523 ; EXIT:   A = CALCULATED VALUE
             =1524 ;
0861 143B    =1525 MOD106:   CALL    SGSUM6
0863 1455    =1526           CALL    APL3R2
0865 83      =1527           RET
              1528 $         INCLUDE(:F1:EMOD10.SRC)
             =1529 ;********************************************************************
             =1530 ; FILE: EMOD10.SRC  6-17-86  16:25  BOB ACTIS
             =1531 ; ROUTINE: EMOD10
             =1532 ; FUNCTION: VERIFY THE EMOD10 CHECK CHARACTER
             =1533 ; ENTRY:  SEGMENT IN SCAN BUFFER
             =1534 ; EXIT:   USES R0,R1,R2,A
             =1535 ;         A = 0 IF CHECK CHARACTER IS GOOD
             =1536 ;         A <> 0 IF CHECK CHARACTER IS BAD
             =1537 ;
0866 B820    =1538 EMOD10:   MOV     R0,#SCNBUF
0868 B979    =1539           MOV     R1,#WRKBUF
086A 142A    =1540           CALL    MOV3BY          ;MOVE SCAN BUFFER DATA TO WORK BUFFER
             =1541 ;
086C B822    =1542           MOV     R0,#SCNBUF+2
086E F0      =1543           MOV     A,@R0           ;GET CHARACTER C6
086F 530F    =1544           ANL     A,#0FH
0871 03FD    =1545           ADD     A,#-3
0873 F27C    =1546           JB7     ECASE1          ;JUMP IF C6=0,1,2
0875 C685    =1547           JZ      ECASE2          ;JUMP IF C6=3
0877 07      =1548           DEC     A
0878 C690    =1549           JZ      ECASE3          ;JUMP IF C6=4
087A 0496    =1550           JMP     ECASE4          ;JUMP IF C6=5,6,7,8,9
             =1551 ;
             =1552 ; FOR C6=0,1,2 COMPUTE 3*(C2+C3+C5)+C1+C4+C6
             =1553 ;
087C B879    =1554 ECASE1:   MOV     R0,#WRKBUF
087E F0      =1555           MOV     A,@R0
087F 47      =1556           SWAP    A               ;SWAP C1 AND C2
0880 A0      =1557           MOV     @R0,A
0881 143B    =1558           CALL    SGSUM6          ;C2,C1,C3,C4,C5,C6
```

```
0883 049B    =1559          JMP     EMODSM
             =1560 ;
             =1561 ; FOR C6=3  COMPUTE 3*(C2+0+C5)+C1+C3+C4
             =1562 ;
0885 B87A    =1563 ECASE2: MOV     R0,#WRKBUF+1
0887 27      =1564          CLR     A
0888 30      =1565          XCHD    A,@R0          ;C4=0
0889 18      =1566          INC     R0
088A 30      =1567          XCHD    A,@R0          ;C6=C4
088B F0      =1568          MOV     A,@R0          ;A=C5,C4
088C 47      =1569          SWAP    A              ;A=C4,C5
088D A0      =1570          MOV     @R0,A
088E 0496    =1571          JMP     ECASE4         ;C1,C2,C3,0,C4,C5
             =1572 ; FOR C6=4  COMPUTE 3*(C2+C4+C5)+C1+C3+0
             =1573 ;
0890 B87B    =1574 ECASE3: MOV     R0,#WRKBUF+2
0892 27      =1575          CLR     A
0893 20      =1576          XCH     A,@R0          ;C5=C6=0
0894 47      =1577          SWAP    A
0895 30      =1578          XCHD    A,@R0          ;C5=0, C6=C5
             =1579                                 ;C1,C2,C3,C4,0,C5
             =1580 ;
             =1581 ; FOR C6=5,6,7,8,9 COMPUTE 3*(C2+C4+C6)+C1+C3+C5
             =1582 ;
0896 B879    =1583 ECASE4: MOV     R0,#WRKBUF     ;C1,C2,C3,C4,C5,C6
0898 143B    =1584          CALL    SGSUM6
089A 2A      =1585          XCH     A,R2
             =1586 ;
             =1587 ; FINAL SUM
             =1588 ;
089B 1455    =1589 EMODSM: CALL    APL3R2
             =1590 ;
             =1591 ; CHECK AGAINST THE CHECK CHARACTER
             =1592 ;
089D B823    =1593 EMODCK: MOV     R0,#SCNBUF+3
089F 60      =1594          ADD     A,@R0
08A0 57      =1595          DA      A
08A1 530F    =1596          ANL     A,#0FH
08A3 83      =1597          RET
             =1598 $        INCLUDE(:F1:FCKFCA.SRC)
             =1599 ;****************************************************************
             =1600 ; FILE: FCKFCA.SRC  10-25-83 17:10  BOB ACTIS
             =1601 ; ROUTINE: CKFCA
             =1602 ; FUNCTION: CHECK IF FRAME CONTROL ARRAY HAS DATA.
             =1603 ;              IF SDATA, PROCESS BYTE.
             =1604 ;              IF SEGMENT CAPTURE AND SCANNING BIT IS SET, PUT SEGMENT
             =1605 ;                 INTO THE SCAN BUFFER.
             =1606 ;              IF SEGMENT CAPTURE AND NOT SCANNING, RESET THE FRAME.
             =1607 ;              IF A SEGMENT IS SEEN, SET R7.
             =1608 ; ENTRY: RB0
             =1609 ; EXIT: USES R0,R1,A
             =1610 ;              R7 IS SET IF A SEGMENT IS SEEN.
             =1611 ;
08A4 86A7    =1612 CKFCA:  JNI     CKFC10         ;JUMP IF FCA HAS DATA
08A6 83      =1613          RET
             =1614 ;
08A7 B801    =1615 CKFC10: MOV     R0,#ESRRD
08A9 FC      =1616          MOV     A,R4
08AA 12B3    =1617          JB0     CKFC20         ;JUMP IF SCANNING BIT IS SET
08AC 80      =1618          MOVX    A,@R0          ;READ BYTE
08AD F2DF    =1619          JB7     CKFC95         ;JUMP IF HOST DATA
08AF 90      =1620          MOVX    @R0,A          ;RESET FRAME CAPTURE
08B0 BF08    =1621          MOV     R7,#EWAIT      ;SET THE "SEG SEEN" TIMER
08B2 83      =1622          RET
             =1623 ;
08B3 80      =1624 CKFC20: MOVX    A,@R0          ;READ 1ST CHAR OF SEGMENT
08B4 F2DF    =1625          JB7     CKFC95         ;JUMP IF HOST DATA
08B6 D2DB    =1626          JB6     CKFC90         ;JUMP IF PERIODICAL CAPTURE
08B8 B920    =1627          MOV     R1,#SCNBUF
             =1628 ;
08BA 47      =1629          SWAP    A
08BB A1      =1630          MOV     @R1,A
08BC 80      =1631          MOVX    A,@R0          ;READ 2ND CHAR OF SEGMENT
08BD 31      =1632          XCHD    A,@R1          ;1ST AND 2ND STORED
08BE 19      =1633          INC     R1
08BF 80      =1634          MOVX    A,@R0          ;READ 3RD CHAR
             =1635 ;
08C0 47      =1636          SWAP    A
08C1 A1      =1637          MOV     @R1,A          ;STORE 3RD CHAR
08C2 80      =1638          MOVX    A,@R0          ;READ 4TH CHAR
08C3 31      =1639          XCHD    A,@R1          ;3RD AND 4TH STORED
08C4 19      =1640          INC     R1
08C5 80      =1641          MOVX    A,@R0          ;READ 5TH CHAR
             =1642 ;
08C6 47      =1643          SWAP    A
08C7 A1      =1644          MOV     @R1,A          ;STORE 5TH CHAR
08C8 80      =1645          MOVX    A,@R0
08C9 31      =1646          XCHD    A,@R1          ;5TH AND 6TH STORED
08CA 19      =1647          INC     R1
             =1648 ;
08CB B804    =1649          MOV     R0,#EPRDEC
08CD 80      =1650          MOVX    A,@R0          ;READ PARITY DECODE BYTE
```

```
08CE 537F    =1651           ANL     A,#07FH     ;MASK OFF THE UNUSED BIT
08D0 A1      =1652           MOV     @R1,A       ;STORE PARITY DECODE B0-B6
             =1653 ;
08D1 D37F    =1654           XRL     A,#07FH     ;TEST FOR NO DECODE. (BAD PARITY MAP)
08D3 96D9    =1655           JNZ     CKFC80      ;JUMP IF DECODE IS OK.
08D5 140C    =1656           CALL    CLRSNB      ;CLEAR THE SCAN BUFFER
08D7 04DB    =1657           JMP     CKFC90
             =1658 ;
08D9 BF08    =1659 CKFC80:   MOV     R7,#EWAIT   ;SET THE "SEG SEEN" TIMER
             =1660 ;
08DB B801    =1661 CKFC90:   MOV     R0,#EFRRST
08DD 90      =1662           MOVX    @R0,A       ;RESET THE FRAME
08DE 83      =1663           RET
             =1664 ;
08DF E5      =1665 CKFC95:   SEL     MB0
08E0 143F    =1666           CALL    SDATA
08E2 F5      =1667           SEL     MB1
08E3 83      =1668           RET
             1669 ;****************************************
08E4 A3      1670 TROPG8:    MOVP    A,@A
08E5 83      1671           RET
0900         1672           ORG     0900H
             1673 $         INCLUDE(:F1:HCOMMD.SRC)
             =1674 ;******************************************************************
             =1675 ; FILE: HCOMM.SRC  4-16-87 DREW TAUSSIG
             =1676 ;       MODIFIED   8-5-87 REMOVE P13 FROM HANDSHAKE
             =1677 ; ROUTINE: HCOMM -- FOR THE IBM 4683 SERIAL IO CHANNEL
             =1678 ;                   COMMUNICATES WITH ZILOG SUPER-8 CHANNEL CONTROLLER
             =1679 ; FUNCTION: SEND NEXT CHARACTER IN SEND BUFFER TO HOST
             =1680 ;           CHECK FOR AND RECEIVE COMMAND FROM HOST (SUPER-8).
             =1681 ; ENTRY: RB0 SELECTED
             =1682 ; EXIT:  USES R0,R1,R2,R3,A
             =1683 ;
0900         =1684 HCOMM    EQU      $
0900 0A      =1685           IN      A,P2
0901 F215    =1686           JB7     HCOM05      ;JUMP IF SUPER-8 DOES NOT HAVE DATA
             =1687 ;
             =1688 ; DATA AVAILABLE - READ AND SET HANDSHAKE
             =1689 ;
0903 B808    =1690           MOV     R0,#ESUP8   ;ADDRESS OF SUPER-8 DATA BYTE
0905 80      =1691           MOVX    A,@R0
0906 99FB    =1692           ANL     P1,#255-EP12 ;P12 LOW THEN HIGH THEN LOW
0908 8904    =1693           ORL     P1,#EP12    ;(ACKNOWLEDGE CMD BYTE FROM S8)
090A 99FB    =1694           ANL     P1,#255-EP12
090C A8      =1695           MOV     R0,A        ;SAVE BYTE
             =1696 ;
090D 0A      =1697 HCOM03:   IN      A,P2
090E 37      =1698           CPL     A
090F F20D    =1699           JB7     HCOM03      ;JUMP WAIT FOR SUPER-8 TO ACKNOWLEDGE
0911 8904    =1700           ORL     P1,#EP12    ;P12 HIGH TO ACKNOWLEDGE RECEIPT OF DATA
             =1701
             =1702 ;
             =1703 ;   CHECK RECEIVED COMMAND
             =1704 ;
0913 2462    =1705           JMP     CKRCV       ;GO EXECUTE COMMAND
             =1706 ;
             =1707 ;   SUPER-8 IN RECEIVE MODE - CHECK FOR DATA AVAILABLE AND SEND
             =1708 ;
0915 FC      =1709 HCOM05:   MOV     A,R4
0916 721E    =1710           JB3     HCOM10      ;JUMP IF SEND BUFFER HAS DATA
0918 37      =1711           CPL     A
0919 B261    =1712           JB5     HCOM90      ;JUMP IF BUFMAN REQUEST FLAG NOT SET
091B F409    =1713           CALL    BUFMAN      ;PUT MESSAGE INTO THE COMM BUFFER
091D 83      =1714           RET
             =1715 ;
091E 2661    =1716 HCOM10:   JNT0    HCOM90      ;JUMP IF HOST NOT READY
             =1717 ;
0920 B966    =1718           MOV     R1,#SBFPNT  ;GET POINTER ADDRESS
0922 F1      =1719           MOV     A,@R1       ;GET POINTER
0923 97      =1720           CLR     C
0924 67      =1721           RRC     A           ;PUT NIBBLE POINTER IN CARRY
0925 11      =1722           INC     @R1         ;INCREMENT POINTER
0926 A9      =1723           MOV     R1,A        ;BYTE ADDRESS
             =1724 ;
0927 F1      =1725           MOV     A,@R1       ;GET DATA
0928 53F0    =1726           ANL     A,#0F0H     ;MASK POSSIBLE TERMINATOR FLAG
092A D3F0    =1727           XRL     A,#0F0H     ;TEST FOR TERMINATOR FLAG, 0FXH
092C C641    =1728           JZ      HCOM50      ;JUMP IF TERMINATOR FLAG
             =1729 ;
092E F1      =1730           MOV     A,@R1       ;GET DATA AGAIN
092F D3CC    =1731           XRL     A,#ETRMBY
0931 C657    =1732           JZ      HCOM70      ;JUMP IF TERMINATION BYTE
             =1733 ;
0933 F1      =1734           MOV     A,@R1       ;GET DATA AGAIN
0934 F637    =1735           JC      HCOM20      ;JUMP IF LOW NIBBLE IS NEXT
             =1736 ;
0936 47      =1737           SWAP    A
0937 530F    =1738 HCOM20:   ANL     A,#0FH      ;MASK NIBBLE
0939 AB      =1739           MOV     R3,A        ;SAVE NIBBLE
093A D30C    =1740           XRL     A,#0CH
093C C661    =1741           JZ      HCOM90      ;JUMP IF FILLER CHARACTER (DON'T SEND)
             =1742 ;
```

```
                =1743 ; IBM-OCR CHARACTER FORMAT
093E FB         =1744 HCOM40: MOV    A,R3              ;GET CHARACTER
093F 2459       =1745         JMP    HCOM80
                =1746 ;
                =1747 ; PROCESS THE TERMINATOR FLAG BYTE
0941 B866       =1748 HCOM50: MOV    R0,#SBFPNT        ;COMM BUFFER POINTER ADDRESS
0943 10         =1749         INC    @R0               ;INCREMENT PAST TERMINATION FLAG BYTE
0944 BB4E       =1750         MOV    R3,#LOW HCTBLI    ;IBM-OCR TABLE ADDRESS
                =1751 ;
0946 F1         =1752 HCOM60: MOV    A,@R1             ;GET TERMINATION FLAG BYTE
0947 530F       =1753         ANL    A,#0FH            ;MASK VERSION POINTER, 1 TO 9
0949 07         =1754         DEC    A                 ;ADJUST POINTER, 0 TO 8
094A 6B         =1755         ADD    A,R3              ;VERSION POINTER + TABLE ADDRESS
094B A3         =1756         MOVP   A,@A              ;GET TERMINATION CHARACTER
094C 2459       =1757         JMP    HCOM80
                =1758 ;
                =1759 ; TERMINATION CHARACTERS FOR IBM-OCR
094E            =1760 HCTBLI  EQU    $                 ;TABLE START ADDRESS
094E 0D         =1761         DB     0DH               ; A
094F 16         =1762         DB     16H               ; 13
0950 0A         =1763         DB     0AH               ; E
0951 0C         =1764         DB     0CH               ; 8
0952 11         =1765         DB     11H               ; D1   VERSION D FLAGS
0953 12         =1766         DB     12H               ; D2   8/8/88 FROM IBM
0954 14         =1767         DB     14H               ; D3
0955 17         =1768         DB     17H               ; D4
0956 1D         =1769         DB     1DH               ; D5
                =1770 ;
                =1771 ; TERMINATION BYTE PROCESSING
0957 2380       =1772 HCOM70: MOV    A,#80H            ;EOT WITH DUMMY DATA (00H WITH B7 SET)
                =1773 ;
                =1774 ; SEND FORMATED CHARACTER TO SUPER-8
0959 B808       =1775 HCOM80: MOV    R0,#ESUP8
095B 90         =1776         MOVX   @R0,A             ;OUTPUT FORMATTED CHARACTER
095C 37         =1777         CPL    A
095D F261       =1778         JB7    HCOM90            ;JUMP IF NOT END OF DATA
095F 1416       =1779         CALL   CLRSBF            ;CLEAR SEND BUFFER, ETC.
0961 83         =1780 HCOM90: RET
                =1781 ;****************************************************************
                =1782 ;   ROUTINE: CKRCV
                =1783 ;   FUNCTION: CHECK RECEIVED BYTE COMMAND AND EXECUTE IT
                =1784 ;   ENTRY: R0 IS RECEIVED BYTE
                =1785 ;   EXIT:  COMMAND EXECUTED
                =1786 ;
0962            =1787 CKRCV   EQU    $
0962 F8         =1788         MOV    A,R0
                =1789 ;
0963 D311       =1790 CKRCV1: XRL    A,#ENSCAN
0965 966A       =1791         JNZ    CKRCV2            ;JUMP IF NOT ENABLE SCANNING COMMAND
0967 99EF       =1792         ANL    P1,#0FFH-ELASDB   ;TURN ON LASER
0969 83         =1793         RET
                =1794 ;
096A F8         =1795 CKRCV2: MOV    A,R0
096B D312       =1796         XRL    A,#DISCAN
096D 9672       =1797         JNZ    CKRCV3            ;JUMP IF NOT DISABLE SCANNING COMMAND
096F 8910       =1798         ORL    P1,#ELASDB        ;TURN OFF LASER
0971 83         =1799         RET
                =1800 ;
0972 F8         =1801 CKRCV3: MOV    A,R0
0973 D314       =1802         XRL    A,#ENBEEP
0975 967B       =1803         JNZ    CKRCV4            ;JUMP IF NOT ENABLE TONE COMMAND
0977 D5         =1804         SEL    RB1
0978 AB         =1805         MOV    R3,A              ;SET TONE ENABLE FLAG TO 0 (ENABLE TONE)
0979 C5         =1806         SEL    RB0
097A 83         =1807         RET
                =1808 ;
097B F8         =1809 CKRCV4: MOV    A,R0
097C D318       =1810         XRL    A,#DIBEEP
097E 9685       =1811         JNZ    CKRCV5            ;JUMP IF NOT DISABLE TONE COMMAND
0980 37         =1812         CPL    A                 ;A IS 0FFH NOW
0981 D5         =1813         SEL    RB1
0982 AB         =1814         MOV    R3,A              ;SET TONE ENABLE FLAG TO 1'S (DISABLE TONE)
0983 C5         =1815         SEL    RB0
0984 83         =1816         RET
                =1817 ;
0985 F8         =1818 CKRCV5: MOV    A,R0
0986 D332       =1819         XRL    A,#COMRST
0988 968D       =1820         JNZ    CKRCV6            ;JUMP IF NOT RESET COMMAND
098A E5         =1821         SEL    MB0
098B 0400       =1822         JMP    RSTTRP            ;RESET SCANNER
                =1823 ;
098D F8         =1824 CKRCV6: MOV    A,R0              ;                    (ADDED 1/21/88)
098E D379       =1825         XRL    A,#IFRSMG         ;INTERFACE ROM SUM GOOD (IF ROM CHKSUM)
                =1826 ;
0990 83         =1827 CKRCV9: RET                      ;INVALID COMMAND
                 1828 $       INCLU             =1829 ;****************************************************************
                =1830 ; FILE: PROCSG.SRC  07-03-86 15:15  BOB ACTIS
                =1831 ;****************************************************************
                =1832 ; ROUTINE: SWP4SN, SWP6SN
                =1833 ; FUNCTION: SWAP (REVERSE) ORDER OF PACKED CHARACTERS IN SCAN BUFFER.
                =1834 ;            SWP4SN SWAPS CHARACTERS IN SCNBUF+1 AND SCNBUF+2.
                =1835 ;            SWP6SN SWAPS CHARACTERS IN SCNBUF, SCNBUF+1 AND SCNBUF+2.
                =1836 ;            CLEARS BACKWARD BIT IN THE PARITY DECODE BYTE SCNBUF+3.
```

```
                      =1837 ; ENTRY: NO SETUP
                      =1838 ; EXIT: CHARACTERS SWAPED.
                      =1839 ;        R0 = SCNBUF+3 (PARITY DECODE BYTE ADDRESS)
                      =1840 ;             BACKWARD BIT IS CLEARED.
                      =1841 ;        A = PARITY DECODE BYTE
                      =1842 ;
0991 B822             =1843 SWP4SN: MOV   R0,#SCNBUF+2
0993 F0               =1844         MOV   A,@R0
0994 47               =1845         SWAP  A
0995 C8               =1846         DEC   R0
0996 20               =1847         XCH   A,@R0
0997 47               =1848         SWAP  A
0998 18               =1849         INC   R0
0999 A0               =1850         MOV   @R0,A
099A 24AA             =1851         JMP   SWPXEX
                      =1852 ;
099C B822             =1853 SWP6SN: MOV   R0,#SCNBUF+2
099E F0               =1854         MOV   A,@R0
099F 47               =1855         SWAP  A
09A0 C8               =1856         DEC   R0
09A1 20               =1857         XCH   A,@R0
09A2 47               =1858         SWAP  A
09A3 20               =1859         XCH   A,@R0
09A4 C8               =1860         DEC   R0
09A5 20               =1861         XCH   A,@R0
09A6 47               =1862         SWAP  A
09A7 18               =1863         INC   R0
09A8 18               =1864         INC   R0
09A9 A0               =1865         MOV   @R0,A
                      =1866 ;
09AA 18               =1867 SWPXEX: INC   R0
09AB F0               =1868         MOV   A,@R0
09AC 53BF             =1869         ANL   A,#255-EDECBK
09AE A0               =1870         MOV   @R0,A
09AF 4409             =1871         JMP   SWPXRT
                      =1872 ;********************************************************************
                      =1873 ; ROUTINE: INCHNB, INCLNB
                      =1874 ; FUNCTION: INCREMENT SEGMENT COUNTERS.
                      =1875 ;           LOW NIBBLE IS SEGMENT ONE COUNTER.
                      =1876 ;           HIGH NIBBLE IS SEGMENT TWO COUNTER.
                      =1877 ;           TERMINAL COUNT IS 15. (0FH)
                      =1878 ;           IF NOT ALREADY TERMINAL COUNT, INCREMENT THE SEGMENT
                      =1879 ;           COUNTER AND TOTAL COUNTER.
                      =1880 ; ENTRY: R0 = PACKED SEGMENT COUNTER ADDRESS
                      =1881 ;        R0+1 = SEGMENT TOTAL COUNTER ADDRESS
                      =1882 ; EXIT: IF NIBBLE WAS INCREMENTED:
                      =1883 ;           R0 = SEGMENT TOTAL COUNTER ADDRESS
                      =1884 ;           A = PACKED COUNTER
                      =1885 ;           CARRY = CLEAR
                      =1886 ;       IF NIBBLE WAS ALREADY 0FH:
                      =1887 ;           R0 = PACKED SEGMENT COUNTER ADDRESS
                      =1888 ;           A = NOT DEFINED
                      =1889 ;           CARRY = SET
                      =1890 ;
09B1 F0               =1891 INCHNB: MOV   A,@R0         ;GET PACKED COUNTER
09B2 97               =1892         CLR   C
09B3 0310             =1893         ADD   A,#10H        ;INCREMENT HIGH NIBBLE
09B5 F6C4             =1894         JC    INCXRT        ;JUMP IF ALREADY 0F0H
09B7 24C1             =1895         JMP   INCX90
                      =1896 ;
09B9 F0               =1897 INCLNB: MOV   A,@R0
09BA 47               =1898         SWAP  A
09BB 97               =1899         CLR   C
09BC 0310             =1900         ADD   A,#10H
09BE F6C4             =1901         JC    INCXRT        ;JUMP IF ALREADY 00FH
09C0 47               =1902         SWAP  A
                      =1903 ;
09C1 A0               =1904 INCX90: MOV   @R0,A         ;UPDATE THE PACKED COUNTER
09C2 18               =1905         INC   R0
09C3 10               =1906         INC   @R0           ;INCREMENT TOTAL COUNTER
                      =1907 ;
09C4 83               =1908 INCXRT: RET
                      =1909 ;********************************************************************
                      =1910 ; ROUTINE: MCH2BY, MCH3BY, MCH4BY
                      =1911 ; FUNCTION: COMPARE BYTES IN ONE BUFFER WITH A SECOND BUFFER.
                      =1912 ; ENTRY: R0 = FIRST BYTE ADDRESS OF FIRST BUFFER
                      =1913 ;        R1 = FIRST BYTE ADDRESS OF SECOND BUFFER
                      =1914 ; EXIT: IF BUFFER ONE EQUALS BUFFER TWO:
                      =1915 ;           R0 = END OF FIRST BUFFER ADDRESS PLUS 1.
                      =1916 ;           R1 = END OF SECOND BUFFER ADDRESS PLUS 1.
                      =1917 ;           R2 = 0
                      =1918 ;           A = 0
                      =1919 ;       IF BUFFER ONE DOESN'T EQUAL BUFFER TWO:
                      =1920 ;           R0 = BUFFER ONE "NOT EQUAL" BYTE ADDRESS
                      =1921 ;           R1 = BUFFER TWO "NOT EQUAL" BYTE ADDRESS
                      =1922 ;           R2 <> 0
                      =1923 ;           A <> 0
                      =1924 ;
09C5 BA02             =1925 MCH2BY: MOV   R2,#2
09C7 24CF             =1926         JMP   MCHXBY
09C9 BA03             =1927 MCH3BY: MOV   R2,#3
09CB 24CF             =1928         JMP   MCHXBY
```

```
09CD BA04    =1929 MCH4BY: MOV    R2,#4
09CF F0      =1930 MCHXBY: MOV    A,@R0
09D0 D1      =1931        XRL     A,@R1
09D1 9607    =1932        JNZ     MCHXRT        ;JUMP IF NOT EQUAL
09D3 18      =1933        INC     R0
09D4 19      =1934        INC     R1
09D5 EACF    =1935        DJNZ    R2,MCHXBY
09D7 83      =1936 MCHXRT: RET
             =1937 ;*********************************************
09D8 A3      =1938 TROPG9: MOVP   A,@A
09D9 83      =1939        RET
0A00         =1940        ORG     0A00H
             =1941 ;*********************************************
             =1942 ; ROUTINE: PROCSG
             =1943 ; FUNCTION: CHECK FOR SCAN BUFFER DATA.
             =1944 ;           SWAP SCAN BUFFER DATA IF BACKWARDS.
             =1945 ;           CHECK FOR MISMATCHES.
             =1946 ;           MOVE SCAN BUFFER TO PROPER SEGMENT BUFFER.
             =1947 ;           INCREMENT SEGMENT AND TOTAL COUNTERS.
             =1948 ; ENTRY: NO SETUP
             =1949 ; EXIT: USES R0,R1,R2,R3,A
             =1950 ;
0A00 2491    =1951 SWP4SJ: JMP    SWP4SN
0A02 249C    =1952 SWP6SJ: JMP    SWP6SN
             =1953 ;
0A04 B823    =1954 PROCSG: MOV    R0,#SCNBUF+3
0A06 F0      =1955        MOV     A,@R0         ;GET PARITY DECODE BYTE
0A07 C650    =1956        JZ      PROCRT        ;JUMP IF NO DATA
             =1957 ;
0A09 B228    =1958 SWPXRT: JB5    PROCDX        ;JUMP IF UPC-D BIT SET
0A0B 923D    =1959        JB4     PROCE         ;JUMP IF UPC-E BIT SET
0A0D 530F    =1960        ANL     A,#0FH
0A0F 0300    =1961        ADD     A,#0          ;SETS CARRY FLAGS FOR DA
0A11 57      =1962        DA      A
0A12 9219    =1963        JB4     PROC05        ;JUMP IF DECODE > 9
             =1964 ;
0A14         =1965 PROC3L  EQU    $             ;PROCESS AN EAN-13-L
0A14 F0      =1966 PROCD:  MOV    A,@R0         ;PROCESS A D-SEGMENT
0A15 D202    =1967        JB6     SWP6SJ        ;JUMP IF BACKWARDS
0A17 6400    =1968        JMP     PRO7CH
             =1969 ;
0A19 3245    =1970 PROC05: JB1    PROCA         ;JUMP IF UPC-A
0A1B F0      =1971 PROC8:  MOV    A,@R0         ;EAN-8 COMES HERE
0A1C D200    =1972        JB6     SWP4SJ        ;JUMP IF BACKWARDS
0A1E 1224    =1973        JB0     PROC8R        ;JUMP IF EAN-8-R
0A20 BB3A    =1974 PROC8L: MOV    R3,#L4SCNT
0A22 4451    =1975        JMP     PRO4CH        ;GO PROCESS A 4-CHAR SEG
0A24 BB40    =1976 PROC8R: MOV    R3,#R4SCNT
0A26 4451    =1977        JMP     PRO4CH
             =1978 ;
0A28 530F    =1979 PROCDX: ANL    A,#0FH
0A2A C614    =1980        JZ      PROCD         ;JUMP IF UPC-D SEG
0A2C F0      =1981 PROCDN: MOV    A,@R0
0A2D D200    =1982        JB6     SWP4SJ
0A2F 530F    =1983        ANL     A,#0FH        ;PROCESS N(1) TO N(6) SEGS
0A31 0336    =1984        ADD     A,#LOW PROCNT-1
0A33 A3      =1985        MOVP    A,@A          ;GET THE SEGMENT COUNTER ADDRESS
0A34 AB      =1986        MOV     R3,A
0A35 4451    =1987        JMP     PRO4CH
0A37 46      =1988 PROCNT: DB     LOW N1SCNT
0A38 4C      =1989        DB      LOW N2SCNT
0A39 52      =1990        DB      LOW N3SCNT
0A3A 58      =1991        DB      LOW N4SCNT
0A3B 5E      =1992        DB      LOW N5SCNT
0A3C 64      =1993        DB      LOW N6SCNT
             =1994 ;
0A3D D202    =1995 PROCE:  JB6    SWP6SJ
0A3F 1466    =1996        CALL    EMOD10
0A41 964E    =1997        JNZ     PROCEX        ;JUMP IF EMOD10 TEST FAILED
0A43 6400    =1998        JMP     PRO7CH
             =1999 ;
0A45 F0      =2000 PROCA:  MOV    A,@R0
0A46 D202    =2001        JB6     SWP6SJ
0A48 124C    =2002        JB0     PROCAR        ;JUMP IF UPC-A-R
0A4A 6400    =2003 PROCAL: JMP    PRO7CH
0A4C 4495    =2004 PROCAR: JMP    PRO6CH
             =2005 ;
0A4E 140C    =2006 PROCEX: CALL   CLRSNB        ;GO CLEAR THE SCAN BUFFER
0A50 83      =2007 PROCRT: RET                  ;RETURN FROM PROCESS SEGMENT ROUTINE
             =2008 ;*********************************************
             =2009 ; ROUTINE: PRO4CH
             =2010 ; FUNCTION: PROCESS 4-CHAR SEGMENTS (2 BYTES)
             =2011 ;           CHECKS FOR MISMATCHES.
             =2012 ;           MOVES SEGMENT FROM SCAN BUFFER TO SEGMENT BUFFER.
             =2013 ;           INCREMENTS SCAN AND TOTAL COUNTERS.
             =2014 ; ENTRY: R3 = PACKED SCAN COUNTER ADDRESS
             =2015 ;         R3-4 = SCAN 1 BUFFER ADDRESS
             =2016 ;         R3-2 = SCAN 2 BUFFER ADDRESS
             =2017 ;         R3+1 = TOTAL COUNTER ADDRESS
             =2018 ; EXIT: SEGMENT PROCESSED
             =2019 ;       SCAN BUFFER CLEARED
             =2020 ;       USES R0,R1,R2,R3,A
```

```
          =2021 ;
0A51 FB   =2022 PRO4CH: MOV   A,R3
0A52 A8   =2023         MOV   R0,A
0A53 F0   =2024         MOV   A,@R0         ;GET S2/S1 PACKED COUNTS
0A54 530F =2025         ANL   A,#0FH
0A56 B821 =2026         MOV   R0,#SCNBUF+1
0A58 9662 =2027         JNZ   PRO4C2        ;JUMP IF SCAN 1 COUNTER <> 0
          =2028 ;
0A5A FB   =2029         MOV   A,R3          ;SCAN 1 COUNTER = 0
0A5B 03FC =2030         ADD   A,#-4
0A5D A9   =2031         MOV   R1,A          ;SCAN 1 BUFFER ADDRESS
0A5E 1426 =2032         CALL  MOV2BY
0A60 446A =2033         JMP   PRO4C3
          =2034 ;
0A62 FB   =2035 PRO4C2: MOV   A,R3          ;SCAN 1 COUNTER <> 0
0A63 03FC =2036         ADD   A,#-4
0A65 A9   =2037         MOV   R1,A          ;SCAN 1 BUFFER ADDRESS
0A66 34C5 =2038         CALL  MCH2BY
0A68 9670 =2039         JNZ   PRO4C4        ;JUMP IF NO MATCH
          =2040 ;
0A6A FB   =2041 PRO4C3: MOV   A,R3
0A6B A8   =2042         MOV   R0,A
0A6C 3489 =2043         CALL  INCLNB        ;INCREMENT SCAN 1 COUNTER AND TOTAL
0A6E 444E =2044         JMP   PROCEX
          =2045 ;
0A70 FB   =2046 PRO4C4: MOV   A,R3          ;SCAN 1 BUFFER DOESN'T MATCH
0A71 A8   =2047         MOV   R0,A
0A72 F0   =2048         MOV   A,@R0
0A73 53F0 =2049         ANL   A,#0F0H
0A75 B821 =2050         MOV   R0,#SCNBUF+1
0A77 9681 =2051         JNZ   PRO4C6        ;JUMP IF SCAN 2 COUNTER <> 0
          =2052 ;
0A79 FB   =2053         MOV   A,R3
0A7A 03FE =2054         ADD   A,#-2
0A7C A9   =2055         MOV   R1,A          ;SCAN 2 BUFFER ADDRESS
0A7D 1426 =2056         CALL  MOV2BY
0A7F 4489 =2057         JMP   PRO4C7
          =2058 ;
0A81 FB   =2059 PRO4C6: MOV   A,R3          ;SCAN 2 COUNT <> 0
0A82 03FE =2060         ADD   A,#-2
0A84 A9   =2061         MOV   R1,A          ;SCAN 2 BUFFER ADDRESS
0A85 34C5 =2062         CALL  MCH2BY
0A87 968F =2063         JNZ   PRO4C8        ;JUMP IF NO MATCH
          =2064 ;
0A89 FB   =2065 PRO4C7: MOV   A,R3
0A8A A8   =2066         MOV   R0,A
0A8B 34B1 =2067         CALL  INCHNB        ;INCREMENT SCAN 2 COUNT AND TOTAL
0A8D 444E =2068         JMP   PROCEX
          =2069 ;
0A8F FB   =2070 PRO4C8: MOV   A,R3          ;NEITHER SCAN BUFFER MATCHED
0A90 17   =2071         INC   A
0A91 A8   =2072         MOV   R0,A          ;TOTAL COUNTER ADDRESS
0A92 10   =2073         INC   @R0           ;INCREMENT TOTAL COUNTER
0A93 444E =2074         JMP   PROCEX
          =2075 ;********************************************************************
          =2076 ; ROUTINE: PRO6CH
          =2077 ; FUNCTION: PROCESS 6-CHAR SEGMENTS (3 BYTES)
          =2078 ;           CHECKS FOR MISMATCHES.
          =2079 ;           MOVES SEGMENT FROM SCAN BUFFER TO SEGMENT BUFFER.
          =2080 ;           INCREMENTS SCAN AND TOTAL COUNTERS.
          =2081 ; ENTRY: NO SETUP
          =2082 ; EXIT:  SEGMENT IS PROCESSED
          =2083 ;        SCAN BUFFER CLEARED
          =2084 ;        USES R0,R1,R2,R3,A
          =2085 ;
0A95 B834 =2086 PRO6CH: MOV   R0,#R6SCNT
0A97 F0   =2087         MOV   A,@R0         ;GET S2/S1 PACKED COUNTS
0A98 530F =2088         ANL   A,#0FH
0A9A B92E =2089         MOV   R1,#R6S1
0A9C B820 =2090         MOV   R0,#SCNBUF
0A9E 96A4 =2091         JNZ   PRO6C2        ;JUMP IF SCAN 1 COUNTER <> 0
          =2092 ;
0AA0 142A =2093         CALL  MOV3BY        ;SCAN 1 COUNTER = 0
0AA2 44A8 =2094         JMP   PRO6C3
          =2095 ;
0AA4 34C9 =2096 PRO6C2: CALL  MCH3BY        ;SCAN 1 COUNTER <> 0
0AA6 96AE =2097         JNZ   PRO6C4        ;JUMP IF NO MATCH
          =2098 ;
0AA8 B834 =2099 PRO6C3: MOV   R0,#R6SCNT
0AAA 3489 =2100         CALL  INCLNB        ;INCREMENT SCAN 1 COUNTER AND TOTAL
0AAC 444E =2101         JMP   PROCEX
          =2102 ;
0AAE B834 =2103 PRO6C4: MOV   R0,#R6SCNT    ;SCAN 1 BUFFER DOESN'T MATCH
0AB0 F0   =2104         MOV   A,@R0
0AB1 53F0 =2105         ANL   A,#0F0H
0AB3 B931 =2106         MOV   R1,#R6S2
0AB5 B820 =2107         MOV   R0,#SCNBUF
0AB7 96BD =2108         JNZ   PRO6C6        ;JUMP IF SCAN 2 COUNTER <> 0
          =2109 ;
0AB9 142A =2110         CALL  MOV3BY
0ABB 44C1 =2111         JMP   PRO6C7
          =2112 ;
```

```
OABD 34C9      =2113 PRO6C6: CALL    MCH3BY         ;SCAN 2 COUNTER <> 0
OABF 96C7      =2114         JNZ     PRO6C8         ;JUMP IF NO MATCH
               =2115 ;
OAC1 8834      =2116 PRO6C7: MOV     R0,#R6SCNT
OAC3 34B1      =2117         CALL    INCHNB         ;INCREMENT SCAN 2 COUNT AND TOTAL
OAC5 444E      =2118         JMP     PROCEX
               =2119 ;
OAC7 8835      =2120 PRO6C8: MOV     R0,#R6STOT     ;NEITHER SCAN BUFFER MATCHED
OAC9 10        =2121         INC     @R0            ;INCREMENT TOTAL COUNTER
OACA 444E      =2122         JMP     PROCEX
               =2123 ;****************************************
OACC A3        =2124 TROPGA: MOVP    A,@A
OACD 83        =2125         RET
OB00           =2126         ORG     0B00H
               =2127 ;*********************************************************************
               =2128 ; ROUTINE: PRO7CH
               =2129 ; FUNCTION: PROCESS 7-CHAR SEGMENTS (4 BYTES)
               =2130 ;           CHECKS FOR MISMATCHES.
               =2131 ;           MOVES SEGMENT FROM SCAN BUFFER TO SEGMENT BUFFER.
               =2132 ;           INCREMENTS SCAN AND TOTAL COUNTERS.
               =2133 ; ENTRY: NO SETUP
               =2134 ; EXIT:  SEGMENT IS PROCESSED
               =2135 ;        SCAN BUFFER CLEARED
               =2136 ;        USES R0,R1,R2,R3,A
               =2137 ;
OB00 B82C      =2138 PRO7CH: MOV     R0,#L6SCNT
OB02 F0        =2139         MOV     A,@R0          ;GET S2/S1 PACKED COUNTS
OB03 530F      =2140         ANL     A,#0FH
OB05 B924      =2141         MOV     R1,#L6S1
OB07 B820      =2142         MOV     R0,#SCNBUF
OB09 960F      =2143         JNZ     PRO7C2         ;JUMP IF SCAN 1 COUNTER <> 0
               =2144 ;
OB0B 142E      =2145         CALL    MOV4BY         ;SCAN 1 COUNTER = 0
OB0D 6413      =2146         JMP     PRO7C3
               =2147 ;
OB0F 34CD      =2148 PRO7C2: CALL    MCH4BY         ;SCAN 1 COUNTER <> 0
OB11 9619      =2149         JNZ     PRO7C4         ;JUMP IF NO MATCH
               =2150 ;
OB13 B82C      =2151 PRO7C3: MOV     R0,#L6SCNT
OB15 3489      =2152         CALL    INCLNB         ;INCREMENT SCAN 1 COUNTER AND TOTAL
OB17 444E      =2153         JMP     PROCEX
               =2154 ;
OB19 B82C      =2155 PRO7C4: MOV     R0,#L6SCNT     ;SCAN 1 BUFFER DOESN'T MATCH
OB1B F0        =2156         MOV     A,@R0
OB1C 53F0      =2157         ANL     A,#0F0H
OB1E B928      =2158         MOV     R1,#L6S2
OB20 B820      =2159         MOV     R0,#SCNBUF
OB22 9628      =2160         JNZ     PRO7C6         ;JUMP IF SCAN 2 COUNTER <> 0
               =2161 ;
OB24 142E      =2162         CALL    MOV4BY
OB26 642C      =2163         JMP     PRO7C7
               =2164 ;
OB28 34CD      =2165 PRO7C6: CALL    MCH4BY         ;SCAN 2 COUNTER <> 0
OB2A 9632      =2166         JNZ     PRO7C8         ;JUMP IF NO MATCH
               =2167 ;
OB2C B82C      =2168 PRO7C7: MOV     R0,#L6SCNT
OB2E 34B1      =2169         CALL    INCHNB         ;INCREMENT SCAN 2 COUNT AND TOTAL
OB30 444E      =2170         JMP     PROCEX
               =2171 ;
OB32 B82D      =2172 PRO7C8: MOV     R0,#L6STOT     ;NEITHER SCAN BUFFER MATCHED
OB34 10        =2173         INC     @R0            ;INCREMENT TOTAL COUNTER
OB35 444E      =2174         JMP     PROCEX
                2175 $       INCLUDE(:F1:VRTAGD.SRC)
               =2176 ;*********************************************************************
               =2177 ; FILE: VERTAG.SRC  06-21-88 13:15  BOB ACTIS
               =2178 ;*********************************************************************
               =2179 ; ROUTINE: CKMAJ
               =2180 ; FUNCTION: DETERMINE MAJORITY SEGMENT COUNTER
               =2181 ; ENTRY: R0 = PACKED COUNTER ADDRESS
               =2182 ; EXIT:  R0 = NOT CHANGED
               =2183 ;        USES R2,A
               =2184 ;        CARRY SET IF LOW>=HIGH NIBBLE (S1CNT>=S2CNT)
               =2185 ;        CARRY CLEAR IF LOW<HIGH NIBBLE (S1CNT<S2CNT)
               =2186 ;
OB37 F0        =2187 CKMAJ:  MOV     A,@R0          ;GET PACKED COUNTER
OB38 530F      =2188         ANL     A,#0FH
OB3A AA        =2189         MOV     R2,A           ;S1CNT
OB3B F0        =2190         MOV     A,@R0
OB3C 47        =2191         SWAP    A
OB3D 530F      =2192         ANL     A,#0FH         ;MASK S2CNT
OB3F C645      =2193         JZ      CKMAJ9         ;JUMP IF S2CNT=0
OB41 37        =2194         CPL     A
OB42 17        =2195         INC     A              ;2'S COMP S2CNT
OB43 6A        =2196         ADD     A,R2           ;S1CNT-S2CNT
OB44 83        =2197         RET
               =2198 ;
OB45 97        =2199 CKMAJ9: CLR     C              ;S2CNT=0 IS A SPECIAL CASE
OB46 A7        =2200         CPL     C
OB47 83        =2201         RET
               =2202 ;*********************************************************************
               =2203 ; ROUTINE: CKMISM
               =2204 ; FUNCTION: CHECK FOR EXCESS MISMATCHED SEGMENTS.
```

```
                    =2205 ;           CLEAR COUNTERS IF EXCESS MISMATCHES.
                    =2206 ; ENTRY: SCAN 1 COUNTER HAS THE MAJORITY SEGMENT COUNT.
                    =2207 ;        R0 = PACKED SCAN2/SCAN1 SEGMENT COUNTER ADDRESS.
                    =2208 ;        R0+1 = TOTAL SEGMENT COUNTER ADDRESS.
                    =2209 ; EXIT:  USES R1,R2,A
                    =2210 ;        R0 = NOT CHANGED
                    =2211 ;        IF TOTAL=MAJORITY (0 MISMATCHES)
                    =2212 ;           OR TOTAL-1=MAJORITY (1 MISMATCH) AND MAJORITY>=3
                    =2213 ;           OR TOTAL-2=MAJORITY (2 MISMATCH) AND MAJORITY>=15
                    =2214 ;        THEN RETURN,
                    =2215 ;        ELSE COUNTERS ARE CLEARED.
                    =2216 ;
0B48 F0             =2217 CKMISM: MOV    A,@R0
0B49 C66F           =2218         JZ     CKMS90         ;JUMP IF S2/S1 COUNTERS=0
                    =2219 ;
0B4B F8             =2220         MOV    A,R0
0B4C 17             =2221         INC    A
0B4D A9             =2222         MOV    R1,A           ;SCAN TOTAL COUNTER ADDRESS
                    =2223 ;
0B4E F0             =2224         MOV    A,@R0
0B4F 530F           =2225         ANL    A,#0FH         ;MASK S1 COUNT
0B51 AA             =2226         MOV    R2,A           ;SAVE MAJORITY COUNT
0B52 D1             =2227         XRL    A,@R1
0B53 C66F           =2228         JZ     CKMS90         ;JUMP IF TOTAL=MAJORITY (0 MISMATCHES)
                    =2229 ;
0B55 F1             =2230         MOV    A,@R1
0B56 07             =2231         DEC    A
0B57 DA             =2232         XRL    A,R2
0B58 C666           =2233         JZ     CKMS30         ;JUMP IF TOTAL-1=MAJORITY (1 MISMATCH)
                    =2234 ;
0B5A F1             =2235         MOV    A,@R1
0B5B 07             =2236         DEC    A
0B5C 07             =2237         DEC    A
0B5D DA             =2238         XRL    A,R2
0B5E 966C           =2239         JNZ    CKMS80         ;JUMP IF >2 MISMATCHES
                    =2240 ;
                    =2241 ; TOTAL-2=MAJORITY (2 MISMATCHES). CHECK FOR MAJORITY>=15.
                    =2242 ;
0B60 FA             =2243         MOV    A,R2
0B61 03F1           =2244         ADD    A,#-15
0B63 E66C           =2245         JNC    CKMS80         ;JUMP IF <15
0B65 83             =2246         RET
                    =2247 ;
                    =2248 ; TOTAL-1=MAJORITY (1 MISMATCH). CHECK FOR MAJORITY>=3.
                    =2249 ;
0B66 FA             =2250 CKMS30: MOV    A,R2
0B67 03FD           =2251         ADD    A,#-3
0B69 E66C           =2252         JNC    CKMS80         ;JUMP IF <3
0B6B 83             =2253         RET
                    =2254 ;
                    =2255 ; FAILED TEST. CLEAR COUNTERS.
                    =2256 ;
0B6C 27             =2257 CKMS80: CLR    A
0B6D A0             =2258         MOV    @R0,A          ;CLEAR S2/S1 COUNTERS
0B6E A1             =2259         MOV    @R1,A          ;CLEAR TOTAL COUNTER
0B6F 83             =2260 CKMS90: RET
                    =2261 ;*************************************************************
                    =2262 ; ROUTINE: EXSBF2, EXSBF3, EXSBF4
                    =2263 ; FUNCTION: EXCHANGE SEGMENT BUFFERS AND COUNTERS. (2,3 OR 4 BYTES)
                    =2264 ;           (I.E. EXCHANGE BUFFER 1 DATA WITH BUFFER 2 DATA)
                    =2265 ; ENTRY: R0 = SCAN 1 BUFFER ADDRESS
                    =2266 ;        R0+2[3,4] = SCAN 2 BUFFER ADDRESS
                    =2267 ;        R0+3[4,5] = SCAN2/SCAN1 PACKED COUNTER ADDRESS
                    =2268 ; EXIT:  USES R1,R2
                    =2269 ;        SCAN 1 AND SCAN 2 DATA AND COUNTERS EXCHANGED.
                    =2270 ;        R0 = SCAN2/SCAN1 COUNTER ADDRESS.
                    =2271 ;        A = SCAN2/SCAN1 COUNTERS
                    =2272 ;
0B70 BA02           =2273 EXSBF2: MOV    R2,#2
0B72 647A           =2274         JMP    EXSBFX
0B74 BA03           =2275 EXSBF3: MOV    R2,#3
0B76 647A           =2276         JMP    EXSBFX
0B78 BA04           =2277 EXSBF4: MOV    R2,#4
0B7A F8             =2278 EXSBFX: MOV    A,R0           ;GET SCAN 1 BUFFER ADDRESS
0B7B A9             =2279         MOV    R1,A           ;SAVE IT
0B7C 6A             =2280         ADD    A,R2           ;CALCULATE SCAN 2 BUFFER ADDRESS
0B7D A8             =2281         MOV    R0,A           ;SAVE IT
                    =2282 ;
0B7E F0             =2283 EXSBFL: MOV    A,@R0          ;GET SCAN 2 DATA
0B7F 21             =2284         XCH    A,@R1          ;EXCHANGE DATA
0B80 A0             =2285         MOV    @R0,A          ;STORE SCAN 1 DATA
0B81 18             =2286         INC    R0
0B82 19             =2287         INC    R1
0B83 EA7E           =2288         DJNZ   R2,EXSBFL
                    =2289 ;
0B85 F0             =2290         MOV    A,@R0          ;GET S2/S1 COUNTERS
0B86 47             =2291         SWAP   A              ;EXCHANGE COUNTERS
0B87 A0             =2292         MOV    @R0,A          ;SAVE COUNTERS
0B88 83             =2293         RET
                    =2294 ;*************************************************************
                    =2295 ; ROUTINE: SUM12C
                    =2296 ; FUNCTION: CALCULATE L6S1 + R6S1 MOD-10 CHECKSUM.
                    =2297 ; ENTRY: L6S1 AND R6S1 HAVE DATA TO USE.
                    =2298 ; EXIT:  A = MOD-10 CHECKSUM CALCULATION FOR 12 CHARACTERS.
```

```
                    =2299 ;          USES R0,R2,R3
                    =2300 ;
0B89 B824           =2301 SUM12C: MOV    R0,#L6S1
0B8B 1461           =2302         CALL   MOD106
0B8D AB             =2303         MOV    R3,A              ;SAVE LEFT HALF SUM
                    =2304 ;
0B8E B82E           =2305         MOV    R0,#R6S1
0B90 1461           =2306         CALL   MOD106
0B92 6B             =2307         ADD    A,R3              ;RIGHT SUM + LEFT SUM
0B93 57             =2308         DA     A
0B94 530F           =2309         ANL    A,#0FH            ;MASK SUM DIGIT
0B96 83             =2310         RET
                    =2311 ;**********************************************************************
                    =2312 ; ROUTINE: CK6TOT
                    =2313 ; FUNCTION: CHECK L6STOT AND R6STOT FOR COUNTS.
                    =2314 ; ENTRY: R1 SETUP WITH MINUS THE MINIMUM NUMBER OF SCANS REQUIRED
                    =2315 ; EXIT:  A=0 IF EITHER COUNTER < MINIMUM REQUIRED.
                    =2316 ;        A<>0 IF BOTH COUNTERS >= MINIMUM REQUIRED.
                    =2317 ;        USES R0
                    =2318 ;
0B97 B82D           =2319 CK6TOT: MOV    R0,#L6STOT
0B99 F0             =2320         MOV    A,@R0             ;GET LEFT SEGMENT TOTAL
0B9A 69             =2321         ADD    A,R1
0B9B F69F           =2322         JC     CK6T20            ;JUMP IF L6STOT >= -R1
0B9D 27             =2323 CK6T10: CLR    A
0B9E 83             =2324         RET                      ;EITHER L6 OR R6 HAD < MINIMUM
                    =2325 ;
0B9F B835           =2326 CK6T20: MOV    R0,#R6STOT
0BA1 F0             =2327         MOV    A,@R0             ;GET RIGHT SEGMENT TOTAL
0BA2 69             =2328         ADD    A,R1
0BA3 E69D           =2329         JNC    CK6T10            ;JUMP R6STOT < -R1
0BA5 27             =2330         CLR    A
0BA6 37             =2331         CPL    A
0BA7 83             =2332         RET                      ;BOTH L6 AND R6 HAD >= MINIMUM
                    =2333 ;**********************************************************************
                    =2334 ; ROUTINE: MAJSGS
                    =2335 ; FUNCTION: DETERMINE MAJORITY SEGMENTS.
                    =2336 ;           MOVE MAJORITY SEGMENT TO BUFFER #1 IF NECESSARY.
                    =2337 ;           (I.E. EXCHANGE BUFFER 1 AND BUFFER 2 DATA AND COUNTERS.)
                    =2338 ;           CHECK FOR EXCESS MISMATCHES.
                    =2339 ;           IF EXCESS MISMATCHES, CLEAR COUNTERS.
                    =2340 ; ENTRY: NO SETUP
                    =2341 ; EXIT:  IF THE MISMATCH RATIO IS OK,
                    =2342 ;           SEGMENT BUFFER 1 AND COUNTER 1 HAS MAJORITY.
                    =2343 ;           SEGMENT BUFFER 2 AND COUNTER 2 HAS MINORITY.
                    =2344 ;        IF EXCESS MISMATCHES, SEGMENT COUNTERS ARE CLEARED.
                    =2345 ;
0BA8 B82C           =2346 MAJSGS: MOV    R0,#L6SCNT
0BAA 7437           =2347         CALL   CKMAJ
0BAC F6B2           =2348         JC     MAJSG0            ;JUMP IF S1 IS MAJORITY
0BAE B824           =2349         MOV    R0,#L6S1
0BB0 7478           =2350         CALL   EXSBF4            ;EXCHANGE S2/S1 DATA AND COUNTERS
0BB2 7448           =2351 MAJSG0: CALL   CKMISM
                    =2352 ;
0BB4 B834           =2353         MOV    R0,#R6SCNT
0BB6 7437           =2354         CALL   CKMAJ
0BB8 F6BE           =2355         JC     MAJSG1
0BBA B82E           =2356         MOV    R0,#R6S1
0BBC 7474           =2357         CALL   EXSBF3
0BBE 7448           =2358 MAJSG1: CALL   CKMISM
                    =2359 ;
0BC0 BB08           =2360         MOV    R3,#8             ;NUMBER OF 4-CHAR SEGMENT BUFFERS
0BC2 B83A           =2361         MOV    R0,#L4SCNT        ;FIRST S2/S1 COUNTER ADDRESS
                    =2362 ;
0BC4 7437           =2363 MAJSG4: CALL   CKMAJ
0BC6 F6CE           =2364         JC     MAJSG5            ;JUMP IF S1 IS THE MAJORITY
0BC8 F8             =2365         MOV    A,R0
0BC9 03FC           =2366         ADD    A,#-4             ;CALCULATE THE S1 DATA BUFFER ADDRESS
0BCB A8             =2367         MOV    R0,A
0BCC 7470           =2368         CALL   EXSBF2            ;EXCHANGE S2/S1 DATA AND COUNTS
                    =2369 ;
0BCE 7448           =2370 MAJSG5: CALL   CKMISM            ;CHECK MISMATCHES
0BD0 F8             =2371         MOV    A,R0
0BD1 0306           =2372         ADD    A,#6              ;CALCULATE NEXT S2/S1 COUNTER ADDRESS
0BD3 A8             =2373         MOV    R0,A
0BD4 EBC4           =2374         DJNZ   R3,MAJSG4
0BD6 83             =2375         RET
                    =2376 ;**********************************************************************
0BD7 A3             =2377 TROPGB: MOVP   A,@A
0BD8 83             =2378         RET
0C00                =2379         ORG    0C00H
                    =2380 ;**********************************************************************
                    =2381 ; ROUTINE: VERTAG
                    =2382 ; FUNCTION: PERFORM MISMATCH TEST AND GET MAJORITY SEGMENT AND COUNT
                    =2383 ;           INTO BUFFER AND COUNTER #1. (MAJSGS)
                    =2384 ;           TRY TO BUILD BLOCKS INTO VERSIONS. (TBLKXX)
                    =2385 ; ENTRY: NO SETUP
                    =2386 ; EXIT:  A=0 IF ENOUGH BLOCKS FOR A VERSION ARE FOUND.
                    =2387 ;        A<>0 IF NOT ENOUGH BLOCKS FOUND.
                    =2388 ;        R6 SET TO INDICATE VALID VERSION IF ONE WAS FOUND.
                    =2389 ;        R1 SETUP WITH MINUS THE MINIMUM NUMBER OF SCANS REQUIRED.
                    =2390 ;
```

```
              =2391 ; ROUTINE: VERTAG
              =2392 ; FUNCTION: PERFORM MISMATCH TEST AND GET MAJORITY SEGMENT AND COUNT
              =2393 ;                INTO BUFFER AND COUNTER #1. (MAJSGS)
              =2394 ;                TRY TO BUILD BLOCKS INTO VERSIONS. (TBLKXX)
              =2395 ; ENTRY: NO SETUP
              =2396 ; EXIT: A=0 IF ENOUGH BLOCKS FOR A VERSION ARE FOUND.
              =2397 ;       A<>0 IF NOT ENOUGH BLOCKS FOUND.
              =2398 ;       R6 SET TO INDICATE VALID VERSION IF ONE WAS FOUND.
              =2399 ;       R1 SETUP WITH MINUS THE MINIMUM NUMBER OF SCANS REQUIRED.
              =2400 ;
0C00 74A8     =2401 VERTAG: CALL    MAJSGS         ;MAJORITY/MISMATCH SEGMENT TEST
0C02 3400     =2402         CALL    HCOMM          ;CHECK COMM. MAJSGS TAKES A WHILE.
0C04 FE       =2403         MOV     A,R6
0C05 53F0     =2404         ANL     A,#0F0H        ;CLEAR THE VERSION POINTER/FLAG.
0C07 AE       =2405         MOV     R6,A
              =2406 ;
              =2407 ; TBLKA AND TBLK13 WILL SET R1 AS REQUIRED FOR THE MINIMUM NUMBER
              =2408 ; OF SCANS REQUIRED.
0C08 9443     =2409 TRYBLK: CALL    TBLKA
0C0A C641     =2410         JZ      VERA           ;JUMP IF A GOOD UPC-A BLOCK
              =2411 ;
0C0C 9460     =2412         CALL    TBLK13
0C0E C640     =2413         JZ      VER13          ;JUMP IF A GOOD EAN-13 BLOCK
              =2414 ;
0C10 B9FE     =2415         MOV     R1,#-2         ;REQUIRE 2 SCANS MINIMUM FOR THE REST
0C12 9497     =2416         CALL    TBLK2
0C14 C623     =2417         JZ      VERT10         ;JUMP IF A GOOD BLK-2
              =2418 ;
0C16 94A7     =2419         CALL    TBLKE
0C18 C63F     =2420         JZ      VERE           ;JUMP IF A GOOD UPC-E BLOCK
              =2421 ;
0C1A B42F     =2422 VERT05: CALL    TBLK1
0C1C C63D     =2423         JZ      VERD1          ;JUMP IF A GOOD BLK-1. (D-1)
              =2424 ;
0C1E 948A     =2425         CALL    TBLK8
0C20 C63E     =2426         JZ      VER8           ;JUMP IF A GOOD EAN-8 BLOCK
0C22 83       =2427         RET                    ;RETURN IF NOT ENOUGH BLOCKS
              =2428 ;
0C23 B49E     =2429 VERT10: CALL    TBLK5
0C25 C630     =2430         JZ      VERT20         ;JUMP IF A GOOD BLK-5
              =2431 ;
0C27 B406     =2432         CALL    TBLK6
0C29 C63B     =2433         JZ      VERD3          ;JUMP IF A GOOD BLK-6. (D-3)
              =2434 ;
0C2B B466     =2435         CALL    TBLK3
0C2D C63C     =2436         JZ      VERD2          ;JUMP IF A GOOD BLK-3. (D-2)
0C2F 83       =2437         RET                    ;RETURN IN NOT ENOUGH BLOCKS
              =2438 ;
0C30 B4BA     =2439 VERT20: CALL    TBLK7
0C32 C639     =2440         JZ      VERD5          ;JUMP IF A GOOD BLK-7. (D-5)
              =2441 ;
0C34 B482     =2442         CALL    TBLK4
0C36 C63A     =2443         JZ      VERD4          ;JUMP IF A GOOD BLK-4. (D-4)
0C38 83       =2444         RET                    ;RETURN IF NOT ENOUGH BLOCKS
              =2445 ;
0C39 1E       =2446 VERD5:  INC     R6             ;SET R6=9
0C3A 1E       =2447 VERD4:  INC     R6             ;SET R6=8
0C3B 1E       =2448 VERD3:  INC     R6             ;SET R6=7
0C3C 1E       =2449 VERD2:  INC     R6             ;SET R6=6
0C3D 1E       =2450 VERD1:  INC     R6             ;SET R6=5
              =2451 ;
              =2452 ;
              =2453 ;       MOV     A,#1           ;VERSION D ALLOWED 8/8/88
              =2454 ;
              =2455 ;VERT80: MOV    R6,#0          ;CLEAR THE VERSION FLAG
              =2456 ;        RET                   ;RETURN W/ A<>0, NO VERSIONS
              =2457 ;
0C3E 1E       =2458 VER8:   INC     R6             ;SET R6=4
0C3F 1E       =2459 VERE:   INC     R6             ;SET R6=3
0C40 1E       =2460 VER13:  INC     R6             ;SET R6=2
0C41 1E       =2461 VERA:   INC     R6             ;SET R6=1
              =2462 ;
0C42 83       =2463 VERT90: RET
               2464 $       INCLUDE(:F1:TBLKXX.SRC)
;*********************************           =2465 ;*****************************************************************
              =2466 ; FILE: TBLKXX.SRC  06-21-88 13:20  BOB ACTIS
              =2467 ;*************************************************************
              =2468 ; ROUTINE: TBLKA
              =2469 ; FUNCTION: TRY FOR A VALID UPC-A BLOCK.
              =2470 ;              CHECK THAT L6 IS AN A-L.
              =2471 ;              SET R1 FOR MINUS THE MINIMUM NUMBER OF SCANS REQUIRED
              =2472 ;              CHECK THAT L6 AND R6 HAVE ENOUGH SCANS.
              =2473 ;              IF OK SO FAR, CALCULATE MOD-10 CHECK CHARACTER.
              =2474 ;              IF STILL OK, RETURN WITH A=0.
              =2475 ;              IF MOD-10 ERROR, CLEAR 4&6-CHAR SEGMENT COUNTERS AND
              =2476 ;                  CLEAR VERSION POINTER/FLAG.
              =2477 ; ENTRY: SCAN 1 BUFFER IS MAJORITY SCAN.
              =2478 ; EXIT: USES R0,R2,R3,A
              =2479 ;       A=0 IF GOOD BLOCK
              =2480 ;       A<>0 IF NO BLOCK
              =2481 ;       R1=-1 OR -2 (MINUS MINIMUM NUMBER OF SCANS REQUIRED)
              =2482 ;
```

```
0C43 B827    =2483 TBLKA:  MOV   R0,#L6S1+3
0C45 F0      =2484         MOV   A,@R0        ;GET PARITY DECODE BYTE
0C46 530F    =2485         ANL   A,#0FH
0C48 D30C    =2486         XRL   A,#0CH
0C4A 966A    =2487         JNZ   TBNONE       ;JUMP IF NOT AN AL
             =2488 ;
0C4C B9FE    =2489         MOV   R1,#-2       ;2-SCAN MINIMUM
0C4E B824    =2490         MOV   R0,#L6S1
0C50 F0      =2491         MOV   A,@R0
0C51 53F0    =2492         ANL   A,#0F0H
0C53 D320    =2493         XRL   A,#020H
0C55 C659    =2494         JZ    TBLA1        ;JUMP IF N/S=2, IN-STORE LABEL
0C57 B9FF    =2495         MOV   R1,#-1       ;1-SCAN MINIMUM
             =2496 ;
0C59 7497    =2497 TBLA1:  CALL  CK6TOT
0C5B C66A    =2498         JZ    TBNONE       ;JUMP IF NOT ENOUGH LEFT OR RIGHT SEGS
             =2499 ;
0C5D 7489    =2500         CALL  SUM12C       ;GO CALCULATE LEFT + RIGHT CHECKSUM
0C5F 9662    =2501         JNZ   TBERR6       ;JUMP IF MOD-10 IS BAD
0C61 83      =2502         RET
             =2503 ;
             =2504 ; THE FOLLOWING IS USED BY OTHER TBLKXX ROUTINES, BUFMAN, & RDTAG
             =2505 ;
0C62         =2506 CLRVER EQU    $            ;ENTRY POINT TO CLEAR VERSION FLAGS & DATA
0C62 1400    =2507 TBERR6: CALL  CLR6SG       ;CLEAR 6-CHAR SEGMENTS AND COUNTERS
0C64 1406    =2508 TBERR4: CALL  CLR4SG       ;CLEAR 4-CHAR SEGMENTS AND COUNTERS
0C66 FE      =2509         MOV   A,R6
0C67 53F0    =2510         ANL   A,#0F0H      ;CLEAR VERSION POINTER/FLAG
0C69 AE      =2511         MOV   R6,A
0C6A 27      =2512 TBNONE: CLR   A
0C6B 37      =2513         CPL   A
0C6C 83      =2514         RET
             =2515 ;****************************************************************
             =2516 ; ROUTINE: TBLK13
             =2517 ; FUNCTION: TRY FOR A VALID EAN-13 BLOCK.
             =2518 ;           CHECK THAT L6 IS AN EAN-13-L.
             =2519 ;           SET R1 FOR MINUS THE MINIMUM NUMBER OF SCANS REQUIRED.
             =2520 ;           CHECK THAT L6 AND R6 HAVE ENOUGH SCANS.
             =2521 ;           IF OK SO FAR, CALCULATE MOD-10 CHECK CHARACTER.
             =2522 ;           IF STILL OK, RETURN WITH A=0.
             =2523 ;           IF MOD-10 FAILS, CLEAR 4&6-CHAR SEGMENT COUNTER AND
             =2524 ;                CLEAR VERSION POINTER/FLAG.
             =2525 ; ENTRY: SCAN 1 BUFFER IS MAJORITY SCAN.
             =2526 ; EXIT: USES R0,R2,R3,A
             =2527 ;        A=0 IF GOOD BLOCK.
             =2528 ;        A<>0 IF NO BLOCK FOUND.
             =2529 ;        R1=-1 OR -2 (MINUS MINIMUM NUMBER OF SCANS REQUIRED)
             =2530 ;
0C6D B827    =2531 TBLK13: MOV   R0,#L6S1+3
0C6F F0      =2532         MOV   A,@R0        ;GET PARITY DECODE BYTE
0C70 5330    =2533         ANL   A,#EDECE+EDECD ;MASK D AND E SEG BITS
0C72 966A    =2534         JNZ   TBNONE       ;JUMP IF D OR E SEGMENT
             =2535 ;
0C74 F0      =2536         MOV   A,@R0
0C75 530F    =2537         ANL   A,#0FH       ;MASK THE DECODED CHARACTER
0C77 03F6    =2538         ADD   A,#-10       ;A>9 IS AN A OR 8 SEGMENT
0C79 F66A    =2539         JC    TBNONE       ;JUMP IS A OR 8 SEGMENT
             =2540 ;
0C7B B9FE    =2541         MOV   R1,#-2       ;2-SCAN MINIMUM
0C7D F0      =2542         MOV   A,@R0
0C7E 530F    =2543         ANL   A,#0FH
0C80 D302    =2544         XRL   A,#02H;
0C82 C686    =2545         JZ    TBL131       ;JUMP IF F1=2, IN-STORE LABEL
0C84 B9FF    =2546         MOV   R1,#-1       ;1-SCAN MINIMUM
             =2547 ;
0C86 7497    =2548 TBL131: CALL CK6TOT
0C88 C66A    =2549         JZ    TBNONE       ;JUMP IF NOT ENOUGH LEFT OR RIGHT SEGS
             =2550 ;
0C8A 7489    =2551         CALL  SUM12C
0C8C AB      =2552         MOV   R3,A         ;SAVE 12 CHARACTER SUM
             =2553 ;
0C8D B827    =2554         MOV   R0,#L6S1+3
0C8F F0      =2555         MOV   A,@R0        ;GET PARITY DECODE CHARACTER
0C90 6B      =2556         ADD   A,R3         ;ADD 13TH CHARACTER
0C91 57      =2557         DA    A
0C92 530F    =2558         ANL   A,#0FH
0C94 9662    =2559         JNZ   TBERR6       ;JUMP IF MOD-10 IS BAD
0C96 83      =2560         RET
             =2561 ;****************************************************************
             =2562 ; ROUTINE: TBLK2
             =2563 ; FUNCTION: TRY FOR A VALID VERSION-D BLOCK-2.
             =2564 ;           CHECK THAT L6 AND R6 HAVE ENOUGH DATA.
             =2565 ;           CHECK THAT L6 IS A D-TAG.
             =2566 ;           IF OK SO FAR, CALCULATE MOD-10 CHECK CHARACTER.
             =2567 ;           IF STILL OK, RETURN WITH A=0.
             =2568 ;           IF MOD-10 ERROR, CLEAR 4&6-CHAR SEGMENT COUNTERS AND
             =2569 ;                CLEAR VERSION POINTER/FLAG.
             =2570 ; ENTRY: SCAN 1 BUFFER IS MAJORITY SCAN.
             =2571 ;        R1 SETUP WITH MINUS THE MINIMUM NUMBER OF SCANS REQUIRED
             =2572 ; EXIT: USER R0,R2,R3,A
             =2573 ;        A=0 IF GOOD BLOCK
             =2574 ;        A<>0 IF NO BLOCK
```

```
                =2575 ;
0C97 7497       =2576 TBLK2:  CALL   CK6TOT
0C99 C66A       =2577         JZ     TBNONE       ;JUMP IF NO LEFT OR NO RIGHT SEGMENTS
                =2578 ;
0C9B B827       =2579         MOV    R0,#L6S1+3
0C9D F0         =2580         MOV    A,@R0        ;GET PARITY DECODE BYTE
0C9E 5320       =2581         ANL    A,#EDECD
0CA0 C66A       =2582         JZ     TBNONE       ;JUMP IF NOT A D-TAG.
                =2583 ;
0CA2 7489       =2584         CALL   SUM12C
0CA4 9662       =2585         JNZ    TBERR6       ;JUMP IF MOD-10 TEST FAILED
0CA6 83         =2586         RET
                =2587 ;****************************************************************
                =2588 ; ROUTINE:  TBLKE
                =2589 ; FUNCTION: TRY FOR A VALID UPC-E BLOCK.
                =2590 ;              CHECK THAT L6 HAS ENOUGH DATA
                =2591 ;              CHECK THAT L6 IS AN E-TAG.
                =2592 ;              CHECK THAT R6 HAS NO DATA.
                =2593 ;           IF OK, RETURN WITH A=0.
                =2594 ;           ELSE, CLEAR 4&6-CHAR SEGMENT COUNTERS AND
                =2595 ;                 CLEAR THE VERSION POINTER/FLAG.
                =2596 ; ENTRY: SCAN 1 BUFFER IS THE MAJORITY SCAN.
                =2597 ;        R1 SETUP WITH MINUS THE MINIMUM NUMBER OF SCANS REQUIRED
                =2598 ; EXIT:  USES R0,A
                =2599 ;        A=0 IF GOOD BLOCK.
                =2600 ;        A<>0 IF NO BLOCK.
                =2601 ;
0CA7 B82D       =2602 TBLKE:  MOV    R0,#L6STOT
0CA9 F0         =2603         MOV    A,@R0
0CAA 69         =2604         ADD    A,R1
0CAB E66A       =2605         JNC    TBNONE       ;JUMP IF < -R1 LEFT SEGMENTS
                =2606 ;
0CAD B827       =2607         MOV    R0,#L6S1+3
0CAF F0         =2608         MOV    A,@R0        ;GET PARITY DECODE BYTE
0CB0 5310       =2609         ANL    A,#EDECE
0CB2 C66A       =2610         JZ     TBNONE       ;JUMP IF NOT AN E-SEG.
                =2611 ;
0CB4 B835       =2612         MOV    R0,#R6STOT
0CB6 F0         =2613         MOV    A,@R0
0CB7 9662       =2614         JNZ    TBERR6       ;JUMP IF R6 SEGMENTS ARE PRESENT
                =2615 ;
0CB9 83         =2616         RET
                =2617 ;****************************************************************
                =2618 ; ROUTINE:  TBLK8
                =2619 ; FUNCTION: TRY FOR A VALID EAN-8 BLOCK.
                =2620 ;              IF ANY 6-CHAR SEGMENTS ARE PRESENT, CLEAR 4-CHAR
                =2621 ;                 SEGMENT COUNTERS AND VERSION POINTER/FLAG.
                =2622 ;              CHECK THAT L4 AND R4 HAVE ENOUGH DATA.
                =2623 ;              IF OK SO FAR, CALCULATE THE MOD-10 CHECK CHARACTER.
                =2624 ;              IF STILL OK, RETURN WITH A=0.
                =2625 ;              IF MOD-10 ERROR, CLEAR 4-CHAR SEGMENT COUNTERS AND
                =2626 ;                 CLEAR VERSION POINTER/FLAG.
                =2627 ; ENTRY: SCAN 1 BUFFER IS THE MAJORITY SCAN.
                =2628 ;        R1 SETUP WITH MINUS THE MINIMUM NUMBER OF SCANS REQUIRED
                =2629 ; EXIT:  USES R0,R2,R3,A
                =2630 ;        A=0 IF GOOD BLOCK
                =2631 ;        A<>0 IF NO BLOCK
                =2632 ;
0CBA B82D       =2633 TBLK8:  MOV    R0,#L6STOT
0CBC F0         =2634         MOV    A,@R0
0CBD 9664       =2635         JNZ    TBERR4       ;JUMP IF ANY 6L SEGMENTS
                =2636 ;
0CBF B835       =2637         MOV    R0,#R6STOT
0CC1 F0         =2638         MOV    A,@R0
0CC2 9664       =2639         JNZ    TBERR4       ;JUMP IF ANY 6R SEGMENTS
                =2640 ;
0CC4 B83B       =2641         MOV    R0,#L4STOT
0CC6 F0         =2642         MOV    A,@R0
0CC7 69         =2643         ADD    A,R1
0CC8 E66A       =2644         JNC    TBNONE       ;JUMP IF < -R1 LEFT HALF SEGMENTS
                =2645 ;
0CCA 8841       =2646         MOV    R0,#R4STOT
0CCC F0         =2647         MOV    A,@R0
0CCD 69         =2648         ADD    A,R1
0CCE E66A       =2649         JNC    TBNONE       ;JUMP IF < -R1 RIGHT HALF SEGMENTS
                =2650 ;
0CD0 B836       =2651         MOV    R0,#L4S1
0CD2 145C       =2652         CALL   MOD104
0CD4 AB         =2653         MOV    R3,A         ;SAVE LEFT SUM
0CD5 883C       =2654         MOV    R0,#R4S1
0CD7 145C       =2655         CALL   MOD104
0CD9 6B         =2656         ADD    A,R3         ;RIGHT SUM + LEFT SUM
0CDA 57         =2657         DA     A
0CDB 530F       =2658         ANL    A,#0FH
0CDD 9664       =2659         JNZ    TBERR4       ;JUMP IF MOD-10 IS BAD
0CDF 83         =2660         RET
                =2661 ;*******************************************
0CE0 A3         =2662 TROPGC: MOVP   A,@A
0CE1 83         =2663         RET
0D00            =2664         ORG    0D00H
                =2665 ;****************************************************************
                =2666 ; ROUTINE:  TBLK6
```

```
                =2667 ; FUNCTION: TRY FOR A VALID VERSION-D BLOCK-6.
                =2668 ;           CHECK THAT N(3), N(5) AND 8(R) HAVE ENOUGH DATA.
                =2669 ;           IF THEY DO, CALCULATE MOD-10 CHECK CHARACTER.
                =2670 ;           IF OK, RETURN WITH A=0.
                =2671 ;           ELSE, CLEAR 4-CHAR SEGMENT COUNTERS AND
                =2672 ;               CLEAR THE VERSION POINTER/FLAG.
                =2673 ; ENTRY: SCAN 1 IS THE MAJORITY SCAN.
                =2674 ;        R1 SETUP WITH MINUS THE MINIMUM NUMBER OF SCANS REQUIRED
                =2675 ; EXIT: USES R0,R2,R3,A
                =2676 ;       A=0 IF GOOD BLOCK
                =2677 ;       A<>0 IF NO BLOCK
                =2678 ;
0000 8464       =2679 TBER4J: JMP    TBERR4
0002 8462       =2680 TBER6J: JMP    TBERR6
0004 846A       =2681 TBNONJ: JMP    TBNONE
                =2682 ;
0006 B853       =2683 TBLK6:  MOV    R0,#N3STOT
0008 F0         =2684         MOV    A,@R0
0009 69         =2685         ADD    A,R1
000A E604       =2686         JNC    TBNONJ          ;JUMP IF < -R1 N3 SEGMENTS
                =2687 ;
000C B85F       =2688         MOV    R0,#N5STOT
000E F0         =2689         MOV    A,@R0
000F 69         =2690         ADD    A,R1
0010 E604       =2691         JNC    TBNONJ          ;JUMP IF < -R1 N5 SEGMENTS
                =2692 ;
0012 B841       =2693         MOV    R0,#R4STOT
0014 F0         =2694         MOV    A,@R0
0015 69         =2695         ADD    A,R1
0016 E604       =2696         JNC    TBNONJ          ;JUMP IF < -R1 8R SEGMENTS
                =2697 ;
0018 B84E       =2698         MOV    R0,#N3S1
001A 145C       =2699         CALL   MOD104
001C AB         =2700         MOV    R3,A
                =2701 ;
001D B85A       =2702         MOV    R0,#N5S1
001F 145C       =2703         CALL   MOD104
0021 6B         =2704         ADD    A,R3
0022 57         =2705         DA     A
0023 AB         =2706         MOV    R3,A
                =2707 ;
0024 B83C       =2708         MOV    R0,#R4S1
0026 145C       =2709         CALL   MOD104
0028 6B         =2710         ADD    A,R3
0029 57         =2711         DA     A
002A 530F       =2712         ANL    A,#0FH
002C 9600       =2713         JNZ    TBER4J
002E 83         =2714         RET
                =2715 ;**********************************************************************
                =2716 ; ROUTINE: TBLK1
                =2717 ; FUNCTION: TRY FOR A VALID VERSION-D BLOCK-1.
                =2718 ;           CHECK THAT L6, N(6) AND 8(L) HAVE ENOUGH DATA.
                =2719 ;           CHECK THAT L6 IS A D-TAG
                =2720 ;           REVERSE 8L DATA
                =2721 ;           CALCULATE MOD-10 CHECK CHARACTER.
                =2722 ;           IF OK, RETURN WITH A=0.
                =2723 ;           ELSE, CLEAR 4&6-CHAR SEGMENT COUNTERS AND
                =2724 ;               CLEAR THE VERSION POINTER/FLAG.
                =2725 ; ENTRY: SCAN 1 IS THE MAJORITY SCAN.
                =2726 ;        R1 SETUP WITH MINUS THE MINIMUM NUMBER OF SCANS REQUIRED
                =2727 ; EXIT: USES R0,R2,R3,A
                =2728 ;       A=0 IF GOOD BLOCK
                =2729 ;       A<>0 IF NO BLOCK
                =2730 ;
002F B82D       =2731 TBLK1:  MOV    R0,#L6STOT
0031 F0         =2732         MOV    A,@R0
0032 69         =2733         ADD    A,R1
0033 E604       =2734         JNC    TBNONJ          ;JUMP IF < -R L6 SEGMENTS
                =2735 ;
0035 B827       =2736         MOV    R0,#L6S1+3
0037 F0         =2737         MOV    A,@R0
0038 5320       =2738         ANL    A,#EDECD
003A C604       =2739         JZ     TBNONJ          ;JUMP IF NOT A D-TAG
                =2740 ;
003C B865       =2741         MOV    R0,#N6STOT
003E F0         =2742         MOV    A,@R0
003F 69         =2743         ADD    A,R1
0040 E604       =2744         JNC    TBNONJ          ;JUMP IF < -R1 N6 SEGMENTS
                =2745 ;
0042 B83B       =2746         MOV    R0,#L4STOT
0044 F0         =2747         MOV    A,@R0
0045 69         =2748         ADD    A,R1
0046 E604       =2749         JNC    TBNONJ          ;JUMP IF < -R1 8L SEGMENTS
                =2750 ;
0048 B824       =2751         MOV    R0,#L6S1
004A 1461       =2752         CALL   MOD106
004C AB         =2753         MOV    R3,A
                =2754 ;
004D B860       =2755         MOV    R0,#N6S1
004F 145C       =2756         CALL   MOD104
0051 6B         =2757         ADD    A,R3
0052 57         =2758         DA     A
```

```
0053 AB        =2759          MOV    R3,A
               =2760 ;
0054 B836      =2761          MOV    R0,#L4S1       ;REVERSE 8L DATA
0056 F0        =2762          MOV    A,@R0          ;GET CHAR 1&2
0057 47        =2763          SWAP   A
0058 18        =2764          INC    R0
0059 20        =2765          XCH    A,@R0          ;GET CHAR 3&4, SAVE CHAR 2&1
005A 47        =2766          SWAP   A
005B C8        =2767          DEC    R0
005C A0        =2768          MOV    @R0,A          ;SAVE CHAR 4&3
               =2769 ;
005D 145C      =2770          CALL   MOD104
005F 6B        =2771          ADD    A,R3
0060 57        =2772          DA     A
0061 530F      =2773          ANL    A,#0FH
0063 9602      =2774          JNZ    TBER6J
0065 83        =2775          RET
               =2776 ;****************************************************************
               =2777 ; ROUTINE: TBLK3
               =2778 ; FUNCTION: TRY FOR A VALID VERSION-D BLOCK-3.
               =2779 ;           CHECK THAT N(2) AND 8(R) HAVE ENOUGH DATA.
               =2780 ;           IF THEY DO, CALCULATE MOD-10 CHECK CHARACTER.
               =2781 ;           IF OK, RETURN WITH A=0.
               =2782 ;           ELSE, CLEAR 4-CHAR SEGMENT COUNTERS AND
               =2783 ;           CLEAR THE VERSION POINTER/FLAG.
               =2784 ; ENTRY: SCAN 1 IS THE MAJORITY SCAN.
               =2785 ;        R1 SETUP WITH MINUS THE MINIMUM NUMBER OF SCANS REQUIRED
               =2786 ; EXIT: USES R0,R2,R3,A
               =2787 ;        A=0 IF GOOD BLOCK
               =2788 ;        A<>0 IF NO BLOCK
               =2789 ;
0066 B84D      =2790 TBLK3:   MOV    R0,#N2STOT
0068 F0        =2791          MOV    A,@R0
0069 69        =2792          ADD    A,R1
006A E604      =2793          JNC    TBNONJ         ;JUMP IF < -R1 N2 SEGMENTS
               =2794 ;
006C B841      =2795          MOV    R0,#R4STOT
006E F0        =2796          MOV    A,@R0
006F 69        =2797          ADD    A,R1
0070 E604      =2798          JNC    TBNONJ         ;JUMP IF < -R1 8R SEGMENTS
               =2799 ;
0072 B848      =2800          MOV    R0,#N2S1
0074 145C      =2801          CALL   MOD104
0076 AB        =2802          MOV    R3,A
               =2803 ;
0077 B83C      =2804          MOV    R0,#R4S1
0079 145C      =2805          CALL   MOD104
007B 6B        =2806          ADD    A,R3
007C 57        =2807          DA     A
007D 530F      =2808          ANL    A,#0FH
007F 9600      =2809          JNZ    TBER4J
0081 83        =2810          RET
               =2811 ;****************************************************************
               =2812 ; ROUTINE: TBLK4
               =2813 ; FUNCTION: TRY FOR A VALID VERSION-D BLOCK-4.
               =2814 ;           CHECK THAT N(5) AND N(1) HAVE ENOUGH DATA.
               =2815 ;           IF THEY DO, CALCULATE MOD-10 CHECK CHARACTER.
               =2816 ;           IF OK, RETURN WITH A=0.
               =2817 ;           ELSE, CLEAR 4-CHAR SEGMENT COUNTERS AND
               =2818 ;           CLEAR THE VERSION POINTER/FLAG.
               =2819 ; ENTRY: SCAN 1 IS THE MAJORITY SCAN.
               =2820 ;        R1 SETUP WITH MINUS THE MINIMUM NUMBER OF SCANS REQUIRED
               =2821 ; EXIT: USES R0,R2,R3,A
               =2822 ;        A=0 IF GOOD BLOCK
               =2823 ;        A<>0 IF NO BLOCK
               =2824 ;
0082 B85F      =2825 TBLK4:   MOV    R0,#N5STOT
0084 F0        =2826          MOV    A,@R0
0085 69        =2827          ADD    A,R1
0086 E604      =2828          JNC    TBNONJ         ;JUMP IF < -R1 N5 SEGMENTS
               =2829 ;
0088 B847      =2830          MOV    R0,#N1STOT
008A F0        =2831          MOV    A,@R0
008B 69        =2832          ADD    A,R1
008C E604      =2833          JNC    TBNONJ         ;JUMP IF < -R1 N1 SEGMENTS
               =2834 ;
008E B85A      =2835          MOV    R0,#N5S1
0090 145C      =2836          CALL   MOD104
0092 AB        =2837          MOV    R3,A
               =2838 ;
0093 B842      =2839          MOV    R0,#N1S1
0095 145C      =2840          CALL   MOD104
0097 6B        =2841          ADD    A,R3
0098 57        =2842          DA     A
0099 530F      =2843          ANL    A,#0FH
009B 9600      =2844          JNZ    TBER4J
009D 83        =2845          RET
               =2846 ;****************************************************************
               =2847 ; ROUTINE: TBLK5
               =2848 ; FUNCTION: TRY FOR A VALID VERSION-D BLOCK-5.
               =2849 ;           CHECK THAT N(4) AND 8(R) HAVE ENOUGH DATA.
               =2850 ;           IF THEY DO, CALCULATE MOD-10 CHECK CHARACTER.
```

```
              =2851 ;            IF OK, RETURN WITH A=0.
              =2852 ;            ELSE, CLEAR 4-CHAR SEGMENT COUNTERS AND
              =2853 ;                  CLEAR THE VERSION POINTER/FLAG.
              =2854 ; ENTRY: SCAN 1 IS THE MAJORITY SCAN.
              =2855 ;        R1 SETUP WITH MINUS THE MINIMUM NUMBER OF SCANS REQUIRED
              =2856 ; EXIT: USES R0,R2,R3,A
              =2857 ;        A=0 IF GOOD BLOCK
              =2858 ;        A<>0 IF NO BLOCK
              =2859 ;
009E 8859     =2860 TBLK5: MOV     R0,#N4STOT
00A0 F0       =2861        MOV     A,@R0
00A1 69       =2862        ADD     A,R1
00A2 E604     =2863        JNC     TBNONJ       ;JUMP IF < -R1 N4 SEGMENTS
              =2864 ;
00A4 B841     =2865        MOV     R0,#R4STOT
00A6 F0       =2866        MOV     A,@R0
00A7 69       =2867        ADD     A,R1
00A8 E604     =2868        JNC     TBNONJ       ;JUMP IF < -R1 8R SEGMENTS
              =2869 ;
00AA B854     =2870        MOV     R0,#N4S1
00AC 145C     =2871        CALL    MOD104
00AE AB       =2872        MOV     R3,A
              =2873 ;
00AF B83C     =2874        MOV     R0,#R4S1
00B1 145C     =2875        CALL    MOD104
00B3 6B       =2876        ADD     A,R3
00B4 57       =2877        DA      A
00B5 530F     =2878        ANL     A,#0FH
00B7 9600     =2879        JNZ     TBER4J
00B9 83       =2880        RET
              =2881 ;********************************************************************
              =2882 ; ROUTINE: TBLK7
              =2883 ; FUNCTION: TRY FOR A VALID VERSION-D BLOCK-7.
              =2884 ;           CHECK THAT N(3), N(6) AND N(1) HAVE ENOUGH DATA.
              =2885 ;           IF THEY DO, CALCULATE MOD-10 CHECK CHARACTER.
              =2886 ;           IF OK, RETURN WITH A=0.
              =2887 ;           ELSE, CLEAR 4-CHAR SEGMENT COUNTERS AND
              =2888 ;                 CLEAR THE VERSION POINTER/FLAG.
              =2889 ; ENTRY: SCAN 1 IS THE MAJORITY SCAN.
              =2890 ;        R1 SETUP WITH MINUS THE MINIMUM NUMBER OF SCANS REQUIRED
              =2891 ; EXIT: USES R0,R2,R3,A
              =2892 ;        A=0 IF GOOD BLOCK
              =2893 ;        A<>0 IF NO BLOCK
              =2894 ;
00BA 8853     =2895 TBLK7: MOV     R0,#N3STOT
00BC F0       =2896        MOV     A,@R0
00BD 69       =2897        ADD     A,R1
00BE E604     =2898        JNC     TBNONJ       ;JUMP IF < -R1 N3 SEGMENTS
              =2899 ;
00C0 B865     =2900        MOV     R0,#N6STOT
00C2 F0       =2901        MOV     A,@R0
00C3 69       =2902        ADD     A,R1
00C4 E604     =2903        JNC     TBNONJ       ;JUMP IF < -R1 N6 SEGMENTS
              =2904 ;
00C6 B847     =2905        MOV     R0,#N1STOT
00C8 F0       =2906        MOV     A,@R0
00C9 69       =2907        ADD     A,R1
00CA E604     =2908        JNC     TBNONJ       ;JUMP IF < -R1 N1 SEGMENTS
              =2909 ;
00CC B84E     =2910        MOV     R0,#N3S1
00CE 145C     =2911        CALL    MOD104
00D0 AB       =2912        MOV     R3,A
              =2913 ;
00D1 B860     =2914        MOV     R0,#N6S1
00D3 145C     =2915        CALL    MOD104
00D5 6B       =2916        ADD     A,R3
00D6 57       =2917        DA      A
00D7 AB       =2918        MOV     R3,A
              =2919 ;
00D8 B842     =2920        MOV     R0,#N1S1
00DA 145C     =2921        CALL    MOD104
00DC 6B       =2922        ADD     A,R3
00DD 57       =2923        DA      A
00DE 530F     =2924        ANL     A,#0FH
00E0 9600     =2925        JNZ     TBER4J
00E2 83       =2926        RET
               2927 ;**************************************
00E3 A3        2928 TROPGD: MOVP   A,@A
00E4 83        2929        RET
0E00           2930        ORG     0E00H
               2931 $      INCLUDE(:F1:FTRDTG.SRC)
              =2932 ;********************************************************************
              =2933 ; FILE: FTRDTG.SRC  10-08-86 15:55  BOB ACTIS
              =2934 ; ROUTINE: RDTAG  THIS IS THE MAIN PROGRAM
              =2935 ;
0E00 FC       =2936 RDTAG: MOV     A,R4                  ;CLEAR THE SCAN FLAGS EXCEPT FOR
0E01 5328     =2937        ANL     A,#ESBFUL+EBFREQ      ;SEND BUFFER FULL AND
0E03 AC       =2938        MOV     R4,A                  ;BUFMAN REQUEST
0E04 B208     =2939        JB5     RDT05                 ;JUMP IF THE BUFMAN REQUEST FLAG IS SET
              =2940 ;
0E06 9462     =2941        CALL    CLRVER                ;CLEAR THE VERSION POINTER/FLAG & DATA
0E08 140C     =2942 RDT05: CALL    CLRSNB                ;CLEAR THE SCAN BUFFER
```

```
                    =2943 ;
                    =2944 ; WAIT FOR THE LABEL TO GO AWAY.
                    =2945 ;
OE0A 3400           =2946 RDT10:  CALL   HCOMM            ;SERVICE THE I/F AND BUFMAN
OE0C 8617           =2947          JNI    RDT20            ;JUMP IF SYNCAP (SEGMENT OR SDATA)
                    =2948 ;
OE0E FF             =2949          MOV    A,R7             ;GET THE "SEG SEEN" TIMER
OE0F 960A           =2950          JNZ    RDT10            ;JUMP IF A SEG RECENTLY SEEN
                    =2951 ;
OE11 BD16           =2952          MOV    R5,#EDRDLY       ;SET THE DOUBLE READ TIMER
                    =2953 ;
OE13 BF2A           =2954 RDT15:  MOV    R7,#EGDLTW       ;SET THE GO-LT ON TIMER
OE15 C41D           =2955          JMP    RDT30            ;GO WAIT FOR A LABEL TO READ
                    =2956 ;
                    =2957 ; RESET THE SYNCAP OR SERVICE SDATA
                    =2958 ;
OE17 14A4           =2959 RDT20:  CALL   CKFCA            ;RESET THE SEG, ALSO CHECK FOR SDATA
OE19 3400           =2960          CALL   HCOMM            ;SERVICE THE I/F AND BUFMAN. ALSO
OE1B C40A           =2961          JMP    RDT10            ;DELAY FOR FCA TO RESET
                    =2962 ;
                    =2963 ; WAIT FOR A LABEL TO READ. CHECK GO-LT ON TIME
                    =2964 ;
OE1D FC             =2965 RDT30:  MOV    A,R4
OE1E 4301           =2966          ORL    A,#ESCNG         ;SET THE SCAN FLAG SO CKFCA WILL
OE20 AC             =2967          MOV    R4,A             ;PUT THE SEGMENT INTO THE SCAN BUFFER
                    =2968 ;
OE21 3400           =2969 RDT35:  CALL   HCOMM
OE23 14A4           =2970          CALL   CKFCA            ;SERVICE FCA. POSSIBLE SEG OR SDATA.
OE25 B823           =2971          MOV    R0,#SCNBUF+3
OE27 F0             =2972          MOV    A,@R0            ;GET THE SCAN BUF PARITY DECOTE BYTE
OE28 9633           =2973          JNZ    RDT40            ;JUMP IF SCAN BUFFER HAS DATA
OE2A FF             =2974          MOV    A,R7
OE2B 9621           =2975          JNZ    RDT35            ;JUMP IF GO-LT TIMER <> 0
OE2D 99DF           =2976          ANL    P1,#255-EGDLT    ;GD-LT OFF
OE2F 8940           =2977          ORL    P1,#EBDLT        ;BD-LT ON
OE31 C421           =2978          JMP    RDT35            ;STILL WAITING FOR A LABEL
                    =2979 ;
                    =2980 ; START READING THE LABEL
                    =2981 ;
OE33 3400           =2982 RDT40:  CALL   HCOMM
OE35 99DF           =2983          ANL    P1,#255-EGDLT    ;GREEN LIGHT OFF
OE37 8940           =2984          ORL    P1,#EBDLT        ;RED LIGHT ON
OE39 FC             =2985          MOV    A,R4
OE3A B200           =2986          JB5    RDTAG            ;JUMP IF THE BUFMAN REQUEST FLAG IS SET
OE3C C442           =2987          JMP    RDT60            ;GO PROCESS THE FIRST SEGMENT
                    =2988 ;
                    =2989 ; COLLECT AND PROCESS SEGMENTS.
                    =2990 ;
OE3E 3400           =2991 RDT50:  CALL   HCOMM
OE40 14A4           =2992          CALL   CKFCA            ;GET SEGMENTS IF ANY
OE42 5404           =2993 RDT60:  CALL   PROCSG           ;PROCESS SEGMENTS IF ANY
OE44 E5             =2994          SEL    MB0
OE45 D400           =2995          CALL   CKCNTS           ;CHK FOR ENOUGH SEGS FOR PSBL VERSION
OE47 F5             =2996          SEL    MB1
OE48 C64D           =2997          JZ     RDT70            ;JUMP IF ENOUGH SEGMENTS
                    =2998 ;
OE4A FF             =2999          MOV    A,R7
OE4B 963E           =3000          JNZ    RDT50            ;JUMP IF SEGMENTS RECENTLY SEEN
                    =3001 ;
                    =3002 ; TRY FOR A VALID LABEL
                    =3003 ;
OE4D 3400           =3004 RDT70:  CALL   HCOMM
OE4F 9400           =3005          CALL   VERTAG
OE51 C65A           =3006          JZ     GOODRD           ;JUMP IF A GOOD VERSION WAS FOUND
                    =3007 ;
OE53 FF             =3008          MOV    A,R7
OE54 963E           =3009          JNZ    RDT50            ;JUMP IF SEGMENTS RECENTLY SEEN
                    =3010 ;
OE56 3400           =3011 BADRD:  CALL   HCOMM
OE58 C400           =3012          JMP    RDTAG            ;GO START OVER. NO BUFMAN REQUEST.
                    =3013 ;
OE5A 3400           =3014 GOODRD: CALL   HCOMM
OE5C FD             =3015          MOV    A,R5             ;GET THE DOUBLE READ TIMER
OE5D C667           =3016          JZ     GOOD10           ;JUMP IF DR TIMER=0 (OK TO DOUBLE READ)
                    =3017 ;
OE5F E5             =3018          SEL    MB0
OE60 F408           =3019          CALL   DRSUMT           ;CALCULATE AND TEST THE DOUBLE READ SUM
OE62 F5             =3020          SEL    MB1
OE63 966B           =3021          JNZ    GOOD20           ;JUMP IF OLD<>NEW (NO DOUBLE READ)
OE65 C400           =3022          JMP    RDTAG            ;JUMP IF DOUBLE READ TOO SOON
                    =3023 ;
OE67 E5             =3024 GOOD10: SEL    MB0
OE68 F408           =3025          CALL   DRSUMT           ;CALCULATE AND SAVE THE LABEL SUM
OE6A F5             =3026          SEL    MB1
OE6B 99BF           =3027 GOOD20: ANL    P1,#255-EBDLT    ;BD-LT OFF
OE6D 8920           =3028          ORL    P1,#EGDLT        ;GD-LT ON
OE6F D5             =3029          SEL    RB1
OE70 FB             =3030          MOV    A,R3             ;TONE ENABLE FLAG
OE71 9675           =3031          JNZ    GOOD30           ;JUMP IF TONE DISABLED
OE73 BE04           =3032          MOV    R6,#EGDTON       ;GOOD TONE LENGTH (IF ENABLED)
OE75 C5             =3033 GOOD30: SEL    RB0
                    =3034 ;
```

```
0E76 FC       =3035 RDT90:  MOV    A,R4
0E77 4320     =3036         ORL    A,#EBFREQ      ;SET THE BUFMAN REQUEST FLAG
0E79 AC       =3037         MOV    R4,A
0E7A F409     =3038         CALL   BUFMAN
0E7C C400     =3039         JMP    RDTAG
              =3040 ;****************************************
0E7E A3       =3041 TROPGE: MOVP   A,@A
0E7F 83       =3042         RET
0F00          =3043         ORG    0F00H
              =3044 $       INCLUDE(:F1:BUFMAN.SRC)
              =3045 ;****************************************************************
              =3046 ; FILE: BUFMAN.SRC  10-08-86 16:15  BOB ACTIS
              =3047 ;****************************************************************
              =3048 ; ROUTINE: BUF12C
              =3049 ; FUNCTION: LOAD 12 CHARACTERS INTO THE COMMUNICATIONS BUFFER.
              =3050 ;           (LOAD L6 AND R6 DATA)
              =3051 ; ENTRY: R1 = NEXT AVAILABLE COMM BUFFER BYTE.
              =3052 ; EXIT:  R1 = NEXT AVAILABLE COMM BUFFER BYTE.
              =3053 ;        L6 AND R6 DATA MOVED TO COMM BUFFER.
              =3054 ;
0F00 B824     =3055 BUF12C: MOV    R0,#L6S1
0F02 142A     =3056         CALL   MOV3BY
0F04 B82E     =3057         MOV    R0,#R6S1
0F06 142A     =3058         CALL   MOV3BY
0F08 83       =3059         RET
              =3060 ;****************************************************************
              =3061 ; ROUTINE: BUFMAN
              =3062 ; FUNCTION: IF BUFMAN REQUEST FLAG IS NOT SET,
              =3063 ;                   THEN RETURN,
              =3064 ;                   ELSE IF COMM BUF IS BUSY
              =3065 ;                           THEN IF NO VALID VERSIONS, CLR REQ FLAG. RETURN
              =3066 ;                           ELSE PROCESS MESSAGE BUFFER REQUEST.
              =3067 ; ENTRY: RB0
              =3068 ;        R6 VERSION FLAGS SETUP
              =3069 ; EXIT:  USES R0,R1,A
              =3070 ;
              =3071 ; SPECIAL CHARACTERS:
              =3072 ;            DATA "C" = FILLER CHARACTER
              =3073 ;            BYTE 0FXH = LABEL TYPE TERMINATOR FLAG
              =3074 ;            BYTE 0CCH = TERMINATION (ETRMBY)
              =3075 ;
0F09 FC       =3076 BUFMAN: MOV    A,R4
0F0A B20D     =3077         JB5    BUFM10         ;JUMP IF BUFMAN REQUEST FLAG IS SET
0F0C 83       =3078         RET
0F0D 72A3     =3079 BUFM10: JB3    BUFM93         ;JUMP IF COMM BUFFER IS BUSY
              =3080 ;
0F0F B967     =3081 BUFM20: MOV    R1,#SBUF       ;SEND BUFFER START ADDRESS
0F11 FE       =3082         MOV    A,R6           ;GET VERSION FLAGS
0F12 530F     =3083         ANL    A,#0FH         ;MASK VERSION POINTER
0F14 0300     =3084         ADD    A,#0           ;SETUP CARRY FOR DA
0F16 57       =3085         DA     A
0F17 92A8     =3086         JB4    BUFM94         ;JUMP IF POINTER > 9. ILLEGAL VERSION.
              =3087 ;
0F19 031C     =3088         ADD    A,#LOW BUFTBL
0F1B 83       =3089         JMPP   @A
0F1C A8       =3090 BUFTBL: DB     LOW BUFM94     ;ILLEGAL VERSION. THIS WAS MISSCN
0F1D 26       =3091         DB     LOW BUFMA
0F1E 2A       =3092         DB     LOW BUFM13
0F1F 33       =3093         DB     LOW BUFME
0F20 43       =3094         DB     LOW BUFM8
0F21 47       =3095         DB     LOW BUFMD1
0F22 55       =3096         DB     LOW BUFMD2
0F23 5B       =3097         DB     LOW BUFMD3
0F24 65       =3098         DB     LOW BUFMD4
0F25 79       =3099         DB     LOW BUFMD5
              =3100 ;
0F26          =3101 BUFMA   EQU    $
0F26 F400     =3102 BUFM12: CALL   BUF12C
0F28 E48F     =3103         JMP    BUFM90
              =3104 ;
0F2A 23C0     =3105 BUFM13: MOV    A,#0C0H        ;FILLER CHARACTER
0F2C B827     =3106         MOV    R0,#L6S1+3     ;PARITY DECODE CHARACTER ADDRESS
0F2E 30       =3107         XCHD   A,@R0   ;PUT PARITY DECODE CHAR INTO A WITH FILLER
0F2F A1       =3108         MOV    @R1,A          ;PUT FILLER & CHAR INTO SEND BUFFER
0F30 19       =3109         INC    R1             ;NEXT AVAILABLE BUFFER LOCATION
0F31 E426     =3110         JMP    BUFM12         ;GO DO THE NEXT 12 CHARS
              =3111 ;
0F33 B1C0     =3112 BUFME:  MOV    @R1,#0C0H      ;FILLER W/ E-N/S-0 DIGIT
0F35 19       =3113         INC    R1
0F36 B824     =3114         MOV    R0,#L6S1
0F38 142A     =3115         CALL   MOV3BY
0F3A 23C0     =3116         MOV    A,#0C0H        ;FILLER CHARACTER
0F3C B827     =3117         MOV    R0,#L6S1+3     ;PARITY DECODE CHARACTER ADDRESS
0F3E 30       =3118         XCHD   A,@R0   ;PUT PARITY DECODE CHAR INTO A WITH FILLER
0F3F A1       =3119         MOV    @R1,A          ;PUT FILLER & CHAR INTO SEND BUFFER
0F40 19       =3120         INC    R1
0F41 E48F     =3121         JMP    BUFM90
              =3122 ;
0F43          =3123 BUFM8   EQU    $
0F43 B836     =3124 BUFM8L: MOV    R0,#L4S1
0F45 E471     =3125         JMP    BUFM8R
              =3126 ;
```

```
0F47 B824    =3127 BUFMD1: MOV    R0,#L6S1
0F49 142A    =3128         CALL   MOV3BY
0F4B B860    =3129         MOV    R0,#N6S1
0F4D 1426    =3130         CALL   MOV2BY
0F4F B836    =3131         MOV    R0,#L4S1    ;ALREADY SWAPPED
0F51 1426    =3132         CALL   MOV2BY
0F53 E48F    =3133         JMP    BUFM90
             =3134 ;
0F55 F400    =3135 BUFMD2: CALL   BUF12C
0F57 B848    =3136         MOV    R0,#N2S1
0F59 E471    =3137         JMP    BUFM8R
             =3138 ;
0F5B F400    =3139 BUFMD3: CALL   BUF12C
0F5D B84E    =3140         MOV    R0,#N3S1
0F5F 1426    =3141         CALL   MOV2BY
0F61 B85A    =3142         MOV    R0,#N5S1
0F63 E471    =3143         JMP    BUFM8R
             =3144 ;
0F65 F400    =3145 BUFMD4: CALL   BUF12C
0F67 B85A    =3146         MOV    R0,#N5S1
0F69 1426    =3147         CALL   MOV2BY
0F6B B842    =3148         MOV    R0,#N1S1
0F6D 1426    =3149         CALL   MOV2BY
0F6F B854    =3150         MOV    R0,#N4S1
0F71 1426    =3151 BUFM8R: CALL   MOV2BY
0F73 B83C    =3152         MOV    R0,#R4S1
0F75 1426    =3153         CALL   MOV2BY
0F77 E48F    =3154         JMP    BUFM90
             =3155 ;
0F79 F400    =3156 BUFMD5: CALL   BUF12C
0F7B B854    =3157         MOV    R0,#N4S1
0F7D 1426    =3158         CALL   MOV2BY
0F7F B83C    =3159         MOV    R0,#R4S1
0F81 1426    =3160         CALL   MOV2BY
0F83 B84E    =3161         MOV    R0,#N3S1
0F85 1426    =3162         CALL   MOV2BY
0F87 B860    =3163         MOV    R0,#N6S1
0F89 1426    =3164         CALL   MOV2BY
0F8B B842    =3165         MOV    R0,#N1S1
0F8D 1426    =3166         CALL   MOV2BY
             =3167 ;
0F8F FE      =3168 BUFM90: MOV    A,R6         ;GET VERSION FLAG
0F90 43F0    =3169         ORL    A,#0F0H      ;PUT IN TERMINATION FLAG NIBBLE
0F92 A1      =3170         MOV    @R1,A        ;PUT TERMINATION FLAG BYTE IN BUFFER
0F93 19      =3171         INC    R1
             =3172 ;
0F94 B1CC    =3173         MOV    @R1,#ETRMBY  ;LOAD THE DATA TERMINATION CHARACTER
0F96 B966    =3174         MOV    R1,#SBFPNT   ;SEND BUFFER POINTER ADDRESS
0F98 B1CE    =3175         MOV    @R1,#SBSTRT  ;PUT PACKED DATA START ADRS IN POINTER
0F9A 9462    =3176         CALL   CLRVER       ;CLEAR THE VERSION POINTER/FLAG & DATA
             =3177 ;
0F9C FC      =3178         MOV    A,R4
0F9D 53DF    =3179         ANL    A,#255-EBFREQ ;CLEAR THE BUFMAN REQUEST FLAG
0F9F 4308    =3180         ORL    A,#ESBFUL    ;SET THE SEND BUFFER FULL BIT
0FA1 AC      =3181         MOV    R4,A
0FA2 83      =3182         RET
             =3183 ;
0FA3 FE      =3184 BUFM93: MOV    A,R6
0FA4 530F    =3185         ANL    A,#0FH       ;MASK THE VERSION POINTER/FLAG
0FA6 96AC    =3186         JNZ    BUFM95       ;JUMP IF A VALID VERSION
             =3187 ;
0FA8 FC      =3188 BUFM94: MOV    A,R4
0FA9 53DF    =3189         ANL    A,#255-EBFREQ ;CLEAR THE BUFMAN REQUEST FLAG
0FAB AC      =3190         MOV    R4,A
             =3191 ;
0FAC 83      =3192 BUFM95: RET
              3193 ;************************************
0FAD A3       3194 TROPGF: MOVP   A,@A
0FAE 83       3195         RET
              3196 ;************************************
0FF7          3197         ORG    0FF7H
              3198 ;
              3199 ; CHECKSUM BYTE
              3200 ;
0FF7 4E       3201         DB     4EH         ;12-2-88 BLI
              3202 ;
              3203 ; DATE
              3204 ;
0FF8 10       3205         DB     10H,27H,88H
0FF9 27
0FFA 88
              3206 ;
              3207 ; PART NUMBER
              3208 ;
0FFB 52       3209         DB     'R',96H,02H,65H
0FFC 96
0FFD 02
0FFE 65
              3210 ;
              3211 ; REVISION
              3212 ;
0FFF 30       3213         DB     '0'
              3214 ;************************************
              3215         END
```

USER SYMBOLS

| | | | | | | | | |
|---|---|---|---|---|---|---|---|---|
| APL3R2 0855 | BADRD 0E56 | BF4CNT 0030 | BF4CST 0036 | BF6CNT 0012 | BF6CST 0024 | BUF12C 0F00 | BUFM10 0F0D | |
| BUFM12 0F26 | BUFM13 0F2A | BUFM20 0F0F | BUFM8 0F43 | BUFM8L 0F43 | BUFM8R 0F71 | BUFM90 0F8F | BUFM93 0FA3 | |
| BUFM94 0FA8 | BUFM95 0FAC | BUFMA 0F09 | BUFMAN 0F09 | BUFMD1 0F47 | BUFMD2 0F55 | BUFMD3 0F5B | BUFMD4 0F65 | |
| BUFMD5 0F79 | BUFME 0F33 | BUFTBL 0F1C | CK6T10 0B90 | CK6T20 0B9F | CK6TOT 0B97 | CKCN05 0608 | CKCN10 061A | |
| CKCN20 0622 | CKCN30 062F | CKCN40 063F | CKCN45 0645 | CKCN50 064F | CKCN60 066B | CKCN70 0675 | CKCN80 0688 | |
| CKCNNG 0695 | CKCNOK 0693 | CKCNTS 0600 | CKFC10 08A7 | CKFC20 0883 | CKFC80 08D9 | CKFC90 08DB | CKFC95 08DF | |
| CKFCA 08A4 | CKMAJ 0837 | CKMAJ9 0B45 | CKMISM 0848 | CKMS30 0866 | CKMS80 086C | CKMS90 086F | CKRCV 0962 | |
| CKRCV1 0963 | CKRCV2 096A | CKRCV3 0972 | CKRCV4 097B | CKRCV5 0985 | CKRCV6 098D | CKRCV9 0990 | CLR4SG 0806 | |
| CLR6SG 0800 | CLRRAM 02A4 | CLRSBF 0816 | CLRSN1 0811 | CLRSNB 080C | CLRTOO 0810 | CLRVER 0C62 | COMRST 0032 | |
| CPARTY 050E | DIBEEP 0018 | DISCAN 0012 | DRSM13 071D | DRSM1X 0756 | DRSM3X 074E | DRSM4X 074E | DRSM5X 072F | |
| DRSM7B 0754 | DRSM7C 0758 | DRSM8 075E | DRSMA 071D | DRSMD1 0742 | DRSMD2 074B | DRSMD3 0739 | DRSMD4 072C | |
| DRSMD5 0723 | DRSMDN 0767 | DRSME 0720 | DRSTBL 0713 | DRSUM 007C | DRSUMT 0708 | DRTIMR 0005 | DRVRNG 076C | |
| E1000M 0032 | E2000M 0064 | E200MS 000A | E480MS 0018 | E500M 0019 | E80MS 0004 | EBDLT 0040 | | |
| EBDTON 0014 | EBFREQ 0020 | ECASE1 087C | ECASE2 0885 | ECASE3 0890 | ECASE4 0896 | EDEC8L 000A | EDEC8R 000B | |
| EDECAL 000C | EDECAR 000D | EDECB7 0080 | EDECBE 000E | EDECBF 000F | EDECBK 0040 | EDECD 0020 | EDECE 0010 | |
| EDECOD 000F | EDISMS 0080 | EDRDLF 002A | EDRDLY 0016 | EFCRST 0003 | EFRRST 0001 | EGDLT 0020 | EGDLTW 002A | |
| EGDTON 0004 | EHCNTL 00D1 | ELASDB 0010 | EMOD10 0866 | EMODCK 0809 | EMODSM 089B | EMSNBY 00BB | EMTREB 0002 | |
| ENBEEP 0014 | ENSCAN 0011 | EOCIA 0002 | EP12 0004 | EP13 0008 | EPARRD 0000 | EPRDEC 0004 | ER4B1 0002 | |
| ER4B2 0004 | ER4B4 0010 | ER4B6 0040 | ER4B7 0080 | ER6B4 0010 | ER6B5 0020 | ER6B6 0040 | ER6B7 0080 | |
| ESBFUL 0008 | ESCNG 0001 | ESENT 0010 | ESR4CH 0010 | ESRCHR 000F | ESRF13 0020 | ESRPER 0040 | ESRRD 0001 | |
| ESRSDT 0080 | ESUP8 0008 | ETEST 0001 | ETMARK 0002 | ETONCT 0028 | ETONE 0080 | ETONFQ FFFA | ETRMBY 00CC | |
| EUP2SP 0020 | EVER00 0000 | EVER13 0002 | EVER8 0004 | EVERA 0001 | EVERD1 0005 | EVERD2 0006 | EVERD3 0007 | |
| EVERD4 0008 | EVERD5 0009 | EVERE 0003 | EVLSIR 0040 | EWAIT 0000 | EXSBF2 0874 | EXSBF3 0874 | EXSBF4 0878 | |
| EXSBFL 0B7E | EXSBFX 0B7A | GETLUP 0275 | GOOD10 0E67 | GOOD20 0E6B | GOOD30 0E75 | GOODRD 0E5A | HCOM03 09CD | |
| HCOM05 0915 | HCOM10 091E | HCOM20 0937 | HCOM40 093E | HCOM50 0941 | HCOM60 0946 | HCOM70 0957 | HCOM80 0959 | |
| HCOM90 0961 | HCOMM 0900 | HCTBL1 094E | IFRSMG 0079 | INCHNB 0981 | INCLNB 0989 | INCREM 04BD | INCX90 09C1 | |
| INCXRT 09C4 | INTTRP 0003 | L4S1 0036 | L4S2 0038 | L4SCNT 003A | L4STOT 003B | L6S1 0024 | L6S2 0028 | |
| L6SCNT 002C | L6STOT 002D | LOOPCK 0292 | LSTUSD 007C | MAJSG0 0BB2 | MAJSG1 0BBE | MAJSG4 0BC4 | MAJSG5 0BCE | |
| MAJSGS 0BA8 | MCH2BY 09C5 | MCH3BY 09C9 | MCH4BY 09CD | MCHXBY 09CF | MCHXRT 0907 | MOD104 085C | MOD106 0861 | |
| MOV2BY 0826 | MOV3BY 082A | MOVXBY 0830 | MRBO 0000 | MRB1 0018 | MRB1R3 001B | MRB1R4 001C | | |
| N1S1 0042 | N1S2 0044 | N1SCNT 0046 | N1STOT 0047 | N2S1 0048 | N2S2 004A | N2SCNT 004C | N2STOT 004D | |
| N3S1 004E | N3S2 0050 | N3SCNT 0052 | N3STOT 0053 | N4S1 0054 | N4S2 0056 | N4SCNT 0058 | N4STOT 0059 | |
| N5S1 005A | N5S2 005C | N5SCNT 005F | N6S1 0060 | N6S2 0062 | N6SCNT 0064 | N6STOT 0065 | | |
| NEXT4 0516 | POW00 0344 | POW20 0379 | POW25 0382 | POW30 0389 | POWUP 0345 | PRO4C2 0A62 | PRO4C3 0A6A | |
| PRO4C4 0A70 | PRO4C6 0A81 | PRO4C7 0A89 | PRO4C8 0A8F | PRO4CH 0A51 | PRO6C2 0AA4 | PRO6C3 0AA8 | PRO6C4 0AAE | |
| PRO6C6 0ABD | PRO6C7 0AC1 | PRO6C8 0AC7 | PRO6CH 0A95 | PROC05 0A19 | PROC3L 0A14 | PROC8 0A1B | PROC8L 0A20 | PROC8R 0A24 |
| PRO7C7 0B2C | PRO7C8 0B32 | PRO7CH 0B00 | PROCD 0A14 | PROCDN 0A2C | PROCDX 0A28 | PROCE 0A3D | PROCEX 0A4E | |
| PROCA 0A45 | PROCAL 0A4A | PROCAR 0A4C | PROCD 0A14 | PROCDN 0A2C | PROCDX 0A28 | PROCE 0A3D | PROCEX 0A4E | |
| PROCNT 0A37 | PROCRT 0A50 | PROCSG 0A04 | R4S1 003C | R4S2 003E | R4SCNT 0040 | R4STOT 0041 | R6S1 002E | |
| R6S2 0031 | R6SCNT 0034 | R6STOT 0035 | RDT05 0E08 | RDT10 0E0A | RDT15 0E13 | RDT20 0E17 | RDT30 0E1D | |
| RDT35 0E21 | RDT40 0E33 | RDT50 0E3E | RDT60 0E42 | RDT70 0E4D | RDT90 0E76 | RDTAG 0E00 | RSTTRP 0000 | |
| SBFEND 0078 | SBFPNT 0066 | SBSTRT 00CE | SBUF 0067 | SBUFAD 0067 | SBUFS2 0012 | SCNBUF 0020 | SCNFLG 0004 | |
| SDATA 003F | SDATA4 0042 | SDATA9 0056 | SEGBUF 0020 | SEGONE 04BB | SGM90 053A | SGMTCH 052A | | |
| SGSUM4 0837 | SGSUM6 083B | SGSUMR 0854 | SGSUMX 083C | SGSUMY 0849 | STACK 0008 | SUM12C 0889 | SUM2BY 0704 | |
| SUM3BY 0702 | SUM4BY 0700 | SWP4SJ 0A00 | SWP4SN 0991 | SWP6SJ 0A02 | SWP6SN 099C | SWPEX 09AA | SWPXRT 0A09 | |
| TASAVE 001F | TBER4J 0D00 | TBER6J 0D02 | TBERR6 0C64 | TBL131 0C86 | TBL6 0D06 | TBLA1 0C59 | TBLK1 0C2F | |
| TBLK13 0C6D | TBLK2 0C97 | TBLK3 0D66 | TBLK4 0D82 | TBLK5 0D9E | TBLK6 0D06 | TBLK7 0DBA | TBLK8 0C8A | |
| TBLKA 0C43 | TBLKE 0CA7 | TBNONE 0C6A | TBNONJ 0DD4 | TCKCNT 0280 | TCNT1 0038 | TCNT2 003A | TERR10 033E | |
| TERR12 0340 | TERRWT 0333 | TEST1 0241 | TEST2 0245 | TEST3 0248 | TEST4 0258 | THO00 0400 | THO05 040A | |
| THO10 040E | THO12 041A | THO14 041C | THO15 042D | THO20 0434 | THO29 0436 | THO30 0440 | THO50 044C | |
| THO55 0453 | THO59 0455 | THSND 0500 | TIME02 0010 | TIME05 0015 | TIME10 0019 | TIME20 0018 | TIME30 001F | |
| TIME40 0026 | TIME45 002F | TIME50 0034 | TIME60 003B | TIMER 0007 | TIMREG 0007 | TINTRP 0007 | TMWAI0 053F | |
| TMWAIT 053B | TOC10 0140 | TOC20 0145 | TOC50 0147 | TOCIA 0131 | TOCRET 030A | TONCNT 0010 | TONLTH 001E | |
| TPON 0300 | TPON15 0368 | TPON16 036F | TPON17 0376 | TPON30 0308 | TPON40 0310 | TPON50 031A | TPON55 0321 | |
| TPON60 032D | TPON90 032F | TPORET 0358 | TRO10 0109 | TRO20 0110 | TRO50 011C | TROMSM 0100 | TROPG0 0057 | |
| TROPG1 014B | TROPG2 0280 | TROPG3 0393 | TROPG4 04C6 | TROPG5 0603 | TROPG6 076E | TROPG7 0A8F | TROPG8 08E4 | |
| TROPG9 09D8 | TROPGA 0ACC | TROPGB 0BD7 | TROPGC 0CE0 | TROPGD 0DE3 | TROPGE 0E7E | TROPGF 0FAD | TRORET 0302 | |
| TROTAB 0121 | TRYBLK 0C08 | TSC02 046F | TSC04 0476 | TSC05 0479 | TSC06 047B | TSC07 0481 | TSC08 048D | |
| TSC09 0499 | TSC10 04A6 | TSC11 0488 | TSC12 0484 | TSC20 047E | TSCBUF 0050 | TSCNT 0462 | TSEG1 0030 | |
| TSEG2 0034 | TST31 0251 | TST32 0255 | TST41 0262 | TST42 0266 | TTA90 02A7 | TTACHK 02A9 | TTAG 020E | |
| TTARET 0312 | TTATAB 0200 | UNPK1 021D | UNPK2 0222 | VER13 0C40 | VER8 0C3E | VERA 0C41 | VERD1 0C3D | |
| VERD2 0C3C | VERD3 0C3B | VERD4 0C3A | VERD5 0C39 | VERE 0C3F | VERFLG 0006 | VERT05 0C1A | VERT10 0C23 | |
| VERT20 0C30 | VERT90 0C42 | VERTAG 0C00 | WRKBUF 0079 | | | | | |

ASSEMBLY COMPLETE,   NO ERRORS

ISIS-II ASSEMBLER SYMBOL CROSS REFERENCE, V2.,

```
APL3R2  1503#  1517   1526   1589
BADRD   3011#
BF4CNT   258#  1392
BF4CST   218#   258   1391
BF6CNT   216#  1380
BF6CST   206#   216   1379
BUF12C  3055#  3102   3135   3139   3145   3156
BUFM10  3077  3079#
BUFM12  3102#  3110
BUFM13  3092  3105#
BUFM20  3081#
BUFM8   3094  3123#
BUFM8L  3124#
BUFM8R  3125   3137   3143   3151#
BUFM90  3103   3121   3133   3154   3168#
BUFM93  3079   3184#
BUFM94  3086   3090   3188#
BUFM95  3186   3192#
BUFMA   3091   3101#
BUFMAN  1713   3038   3076#
BUFMD1  3095   3127#
BUFMD2  3096   3135#
BUFMD3  3097   3139#
```

| Symbol | | | | | | | | | | | | | | | | |
|---|---|---|---|---|---|---|---|---|---|---|---|---|---|---|---|---|
| BUFMD4 | 3098 | 3145# | | | | | | | | | | | | | | |
| BUFMD5 | 3099 | 3156# | | | | | | | | | | | | | | |
| BUFME | 3093 | 3112# | | | | | | | | | | | | | | |
| BUFTBL | 3088 | 3090# | | | | | | | | | | | | | | |
| CK6T10 | 2323# | 2329 | | | | | | | | | | | | | | |
| CK6T20 | 2322 | 2326# | | | | | | | | | | | | | | |
| CK6TOT | 2319# | 2497 | 2548 | 2576 | | | | | | | | | | | | |
| CKCN05 | 1129 | 1132# | | | | | | | | | | | | | | |
| CKCN10 | 1147# | | | | | | | | | | | | | | | |
| CKCN20 | 1135 | 1153# | | | | | | | | | | | | | | |
| CKCN30 | 1140 | 1163# | | | | | | | | | | | | | | |
| CKCN40 | 1165 | 1170 | 1174# | | | | | | | | | | | | | |
| CKCN45 | 1179# | | | | | | | | | | | | | | | |
| CKCN50 | 1160 | 1186# | | | | | | | | | | | | | | |
| CKCN60 | 1199 | 1208# | | | | | | | | | | | | | | |
| CKCN70 | 1194 | 1215# | | | | | | | | | | | | | | |
| CKCN80 | 1223 | 1232# | | | | | | | | | | | | | | |
| CKCNNG | 1145 | 1151 | 1156 | 1172 | 1177 | 1182 | 1184 | 1189 | 1204 | 1206 | 1211 | 1213 | 1218 | 1228 | 1230 | 1235 | 1236 | 1241= |
| CKCNOK | 1150 | 1161 | 1166 | 1171 | 1183 | 1205 | 1212 | 1229 | 1238# | | | | | | | |
| CKCNTS | 1124# | 2995 | | | | | | | | | | | | | | |
| CKFC10 | 1612 | 1615# | | | | | | | | | | | | | | |
| CKFC20 | 1617 | 1624# | | | | | | | | | | | | | | |
| CKFC80 | 1655 | 1659# | | | | | | | | | | | | | | |
| CKFC90 | 1626 | 1657 | 1661# | | | | | | | | | | | | | |
| CKFC95 | 1619 | 1625 | 1665# | | | | | | | | | | | | | |
| CKFCA | 576 | 1612# | 2959 | 2970 | 2992 | | | | | | | | | | | |
| CKMAJ | 2187# | 2347 | 2354 | 2363 | | | | | | | | | | | | |
| CKMAJ9 | 2193 | 2199# | | | | | | | | | | | | | | |
| CKMISM | 2217# | 2351 | 2358 | 2370 | | | | | | | | | | | | |
| CKMS30 | 2233 | 2250# | | | | | | | | | | | | | | |
| CKMS80 | 2239 | 2245 | 2252 | 2257# | | | | | | | | | | | | |
| CKMS90 | 2218 | 2228 | 2260# | | | | | | | | | | | | | |
| CKRCV | 1705 | 1787# | | | | | | | | | | | | | | |
| CKRCV1 | 1790# | | | | | | | | | | | | | | | |
| CKRCV2 | 1791 | 1795# | | | | | | | | | | | | | | |
| CKRCV3 | 1797 | 1801# | | | | | | | | | | | | | | |
| CKRCV4 | 1803 | 1809# | | | | | | | | | | | | | | |
| CKRCV5 | 1811 | 1818# | | | | | | | | | | | | | | |
| CKRCV6 | 1820 | 1824# | | | | | | | | | | | | | | |
| CKRCV9 | 1827# | | | | | | | | | | | | | | | |
| CLR4SG | 1391# | 2508 | | | | | | | | | | | | | | |
| CLR6SG | 568 | 1379# | 2507 | | | | | | | | | | | | | |
| CLRRAM | 611# | 612 | | | | | | | | | | | | | | |
| CLRSBF | 1422# | 1779 | | | | | | | | | | | | | | |
| CLRSN1 | 1406# | 1408 | 1432 | | | | | | | | | | | | | |
| CLRSNB | 1403# | 1656 | 2006 | 2942 | | | | | | | | | | | | |
| CLRTOO | 1381 | 1393 | 1405# | | | | | | | | | | | | | |
| CLRVER | 2506# | 2941 | 3176 | | | | | | | | | | | | | |
| COMRST | 162# | 1819 | | | | | | | | | | | | | | |
| CPARTY | 813 | 1010 | 1031# | | | | | | | | | | | | | |
| DIBEEP | 161# | 1810 | | | | | | | | | | | | | | |
| DISCAN | 159# | 1796 | | | | | | | | | | | | | | |
| DRSM13 | 1295 | 1305# | | | | | | | | | | | | | | |
| DRSM1X | 1335 | 1344# | | | | | | | | | | | | | | |
| DRSM3X | 1329 | 1339# | | | | | | | | | | | | | | |
| DRSM4X | 1323 | 1340# | | | | | | | | | | | | | | |
| DRSM5X | 1315 | 1319# | | | | | | | | | | | | | | |
| DRSM7B | 1306 | 1343# | | | | | | | | | | | | | | |
| DRSM7C | 1309 | 1345# | | | | | | | | | | | | | | |
| DRSM8 | 1297 | 1349# | | | | | | | | | | | | | | |
| DRSMA | 1294 | 1304# | | | | | | | | | | | | | | |
| DRSMD1 | 1298 | 1331# | | | | | | | | | | | | | | |
| DRSMD2 | 1299 | 1337# | | | | | | | | | | | | | | |
| DRSMD3 | 1300 | 1325# | | | | | | | | | | | | | | |
| DRSMD4 | 1301 | 1317# | | | | | | | | | | | | | | |
| DRSMD5 | 1302 | 1311# | | | | | | | | | | | | | | |
| DRSMDN | 1347 | 1355# | | | | | | | | | | | | | | |
| DRSME | 1296 | 1308# | | | | | | | | | | | | | | |
| DRSTBL | 1291 | 1293# | | | | | | | | | | | | | | |
| DRSUM | 273# | 1355 | | | | | | | | | | | | | | |
| DRSUMT | 1285# | 3019 | 3025 | | | | | | | | | | | | | |
| DRTIMR | 185# | | | | | | | | | | | | | | | |
| DRVRNG | 1289 | 1293 | 1360# | | | | | | | | | | | | | |
| E1000M | 139# | 643 | 680 | 911 | | | | | | | | | | | | |
| E2000M | 140# | 656 | | | | | | | | | | | | | | |
| E200MS | 137# | | | | | | | | | | | | | | | |
| E260M | 141# | 733 | 737 | | | | | | | | | | | | | |
| E480MS | 138# | | | | | | | | | | | | | | | |
| E500M | 142# | 729 | | | | | | | | | | | | | | |
| E80MS | 136# | | | | | | | | | | | | | | | |
| EBDLT | 56# | 381 | 670 | 743 | 791 | 822 | 2977 | 2984 | 3027 | | | | | | | |
| EBDTON | 145# | 637 | | | | | | | | | | | | | | |
| EBFREQ | 112# | 2937 | 3036 | 3179 | 3189 | | | | | | | | | | | |
| ECASE1 | 1546 | 1554# | | | | | | | | | | | | | | |
| ECASE2 | 1547 | 1563# | | | | | | | | | | | | | | |
| ECASE3 | 1549 | 1574# | | | | | | | | | | | | | | |
| ECASE4 | 1550 | 1571 | 1583# | | | | | | | | | | | | | |
| EDEC8L | 84# | | | | | | | | | | | | | | | |
| EDEC8R | 85# | | | | | | | | | | | | | | | |
| EDECAL | 86# | | | | | | | | | | | | | | | |
| EDECAR | 87# | | | | | | | | | | | | | | | |
| EDECB7 | 93# | | | | | | | | | | | | | | | |

| | | | | | | | | | | |
|---|---|---|---|---|---|---|---|---|---|---|
| EDECBE | 88# | | | | | | | | | |
| EDECBF | 89# | | | | | | | | | |
| EDECBK | 92# | 1869 | | | | | | | | |
| EDECD | 91# | 2533 | 2581 | 2738 | | | | | | |
| EDECE | 90# | 2533 | 2609 | | | | | | | |
| EDECOD | 83# | | | | | | | | | |
| EDISMS | 65# | | | | | | | | | |
| EDRDLF | 169# | | | | | | | | | |
| EDRDLY | 168# | 2952 | | | | | | | | |
| EFCRST | 78# | 461 | 494 | 707 | 745 | 921 | | | | |
| EFRRST | 76# | 1661 | | | | | | | | |
| EGDLT | 55# | 380 | 669 | 728 | 732 | 736 | 742 | 791 | 2976 | 2983 | 3028 |
| EGDLTW | 167# | 2954 | | | | | | | | |
| EGDTON | 144# | 3032 | | | | | | | | |
| EHCNTL | 177# | 370 | | | | | | | | |
| ELASDB | 54# | 381 | 529 | 703 | 727 | 742 | 792 | 908 | 934 | 1792 | 1798 |
| EMOD10 | 1538# | 1996 | | | | | | | | |
| EMODCK | 1593# | | | | | | | | | |
| EMODSM | 1559 | 1589# | | | | | | | | |
| EMSNBY | 154# | | | | | | | | | |
| EMTREB | 51# | 381 | 743 | | | | | | | |
| ENBEEP | 160# | 1802 | | | | | | | | |
| ENSCAN | 158# | 1790 | | | | | | | | |
| EOCIA | 77# | 367 | 464 | 1014 | | | | | | |
| EP12 | 52# | 529 | 703 | 1692 | 1693 | 1694 | 1700 | | | |
| EP13 | 53# | 529 | 703 | | | | | | | |
| EPARRD | 74# | | | | | | | | | |
| EPRDEC | 79# | 1649 | | | | | | | | |
| ER4B1 | 108# | | | | | | | | | |
| ER4B2 | 109# | | | | | | | | | |
| ER4B4 | 111# | | | | | | | | | |
| ER4B6 | 113# | | | | | | | | | |
| ER4B7 | 114# | | | | | | | | | |
| ER6B4 | 129# | | | | | | | | | |
| ER6B5 | 130# | | | | | | | | | |
| ER6B6 | 131# | | | | | | | | | |
| ER6B7 | 132# | | | | | | | | | |
| ESBFUL | 110# | 1423 | 2937 | 3180 | | | | | | |
| ESCNG | 107# | 573 | 2966 | | | | | | | |
| ESENT | 62# | | | | | | | | | |
| ESR4CH | 98# | | | | | | | | | |
| ESRCHR | 97# | | | | | | | | | |
| ESRF13 | 99# | | | | | | | | | |
| ESRPER | 100# | | | | | | | | | |
| ESRRD | 75# | 927 | 1615 | | | | | | | |
| ESRSDT | 101# | | | | | | | | | |
| ESUP8 | 151# | 647 | 1690 | 1775 | | | | | | |
| ETEST | 48# | 460 | 496 | 529 | 641 | | | | | |
| ETMARK | 50# | 543 | 545 | 557 | 559 | 641 | | | | |
| ETONCT | 147# | 338 | 676 | 717 | 759 | | | | | |
| ETONE | 57# | 332 | 334 | 351 | 529 | 703 | | | | |
| ETONFQ | 148# | 354 | | | | | | | | |
| ETRMBY | 155# | 1731 | 3173 | | | | | | | |
| EUP2SP | 63# | | | | | | | | | |
| EVER00 | 118# | | | | | | | | | |
| EVER13 | 120# | | | | | | | | | |
| EVER8 | 122# | | | | | | | | | |
| EVERA | 119# | | | | | | | | | |
| EVERD1 | 123# | | | | | | | | | |
| EVERD2 | 124# | | | | | | | | | |
| EVERD3 | 125# | | | | | | | | | |
| EVERD4 | 126# | | | | | | | | | |
| EVERD5 | 127# | | | | | | | | | |
| EVERE | 121# | | | | | | | | | |
| EVLSIR | 64# | 700 | 702 | | | | | | | |
| EWAIT | 166# | 167 | 168 | 169 | 1621 | 1659 | | | | |
| EXSBF2 | 2273# | 2368 | | | | | | | | |
| EXSBF3 | 2275# | 2357 | | | | | | | | |
| EXSBF4 | 2277# | 2350 | | | | | | | | |
| EXSBFL | 2283# | 2288 | | | | | | | | |
| EXSBFX | 2274 | 2276 | 2278# | | | | | | | |
| GETLUP | 575# | 579 | | | | | | | | |
| GOOD10 | 3016 | 3024# | | | | | | | | |
| GOOD20 | 3021 | 3027# | | | | | | | | |
| GOOD30 | 3031 | 3033# | | | | | | | | |
| GOODRD | 3006 | 3014# | | | | | | | | |
| HCOM03 | 1697# | 1699 | | | | | | | | |
| HCOM05 | 1686 | 1709# | | | | | | | | |
| HCOM10 | 1710 | 1716# | | | | | | | | |
| HCOM20 | 1735 | 1738# | | | | | | | | |
| HCOM40 | 1744# | | | | | | | | | |
| HCOM50 | 1728 | 1748# | | | | | | | | |
| HCOM60 | 1752# | | | | | | | | | |
| HCOM70 | 1732 | 1772# | | | | | | | | |
| HCOM80 | 1745 | 1757 | 1775# | | | | | | | |
| HCOM90 | 1712 | 1716 | 1741 | 1778 | 1780# | | | | | |
| HCOMM | 652 | 1684# | 2402 | 2946 | 2960 | 2969 | 2982 | 2991 | 3004 | 3011 | 3014 |
| HCTBLI | 1750 | 1760# | | | | | | | | |
| IFRSMG | 163# | 1825 | | | | | | | | |
| INCHNB | 1891# | 2067 | 2117 | 2169 | | | | | | |
| INCLNB | 1897# | 2043 | 2100 | 2152 | | | | | | |
| INCREM | 976 | 978# | | | | | | | | |

| Symbol | | | | | | | | | | | | | | | | | | | |
|---|---|---|---|---|---|---|---|---|---|---|---|---|---|---|---|---|---|---|---|
| INCX90 | 1895 | 1904# | | | | | | | | | | | | | | | | | |
| INCXRT | 1894 | 1901 | 1908# | | | | | | | | | | | | | | | | |
| INTTRP | 288# | | | | | | | | | | | | | | | | | | |
| L4S1 | 219# | 1334 | 1350 | 2651 | 2761 | 3124 | 3131 | | | | | | | | | | | | |
| L4S2 | 220# | | | | | | | | | | | | | | | | | | |
| L4SCNT | 221# | 1974 | 2361 | | | | | | | | | | | | | | | | |
| L4STOT | 222# | 1142 | 1179 | 2641 | 2746 | | | | | | | | | | | | | | |
| L6S1 | 207# | 594 | 1158 | 1163 | 1345 | 2141 | 2301 | 2349 | 2483 | 2490 | 2531 | 2554 | 2579 | 2607 | 2736 | 2751 | 3055 | 3106 | |
| | 3114 | 3117 | 3127 | | | | | | | | | | | | | | | | |
| L6S2 | 208# | 1168 | 2158 | | | | | | | | | | | | | | | | |
| L6SCNT | 209# | 582 | 2138 | 2151 | 2155 | 2168 | 2346 | | | | | | | | | | | | |
| L6STOT | 210# | 1137 | 1153 | 2172 | 2319 | 2602 | 2633 | 2731 | | | | | | | | | | | |
| LOOPCK | 596# | 603 | 608 | | | | | | | | | | | | | | | | |
| LSTUSD | 275# | | | | | | | | | | | | | | | | | | |
| MAJSG0 | 2348 | 2351# | | | | | | | | | | | | | | | | | |
| MAJSG1 | 2355 | 2358# | | | | | | | | | | | | | | | | | |
| MAJSG4 | 2363# | 2374 | | | | | | | | | | | | | | | | | |
| MAJSG5 | 2364 | 2370# | | | | | | | | | | | | | | | | | |
| MAJSGS | 2346# | 2401 | | | | | | | | | | | | | | | | | |
| MCH2BY | 1925# | 2038 | 2062 | | | | | | | | | | | | | | | | |
| MCH3BY | 1927# | 2096 | 2113 | | | | | | | | | | | | | | | | |
| MCH4BY | 1929# | 2148 | 2165 | | | | | | | | | | | | | | | | |
| MCHXBY | 1926 | 1928 | 1930# | 1935 | | | | | | | | | | | | | | | |
| MCHXRT | 1932 | 1936# | | | | | | | | | | | | | | | | | |
| MOD104 | 1516# | 2652 | 2655 | 2699 | 2703 | 2709 | 2756 | 2770 | 2801 | 2805 | 2836 | 2840 | 2871 | 2875 | 2911 | 2915 | 2921 | | |
| MOD106 | 1525# | 2302 | 2306 | 2752 | | | | | | | | | | | | | | | |
| MOV2BY | 1444# | 2032 | 2056 | 3130 | 3132 | 3141 | 3147 | 3149 | 3151 | 3153 | 3158 | 3160 | 3162 | 3164 | 3166 | | | | |
| MOV3BY | 1446# | 1540 | 2093 | 2110 | 3056 | 3058 | 3115 | 3128 | | | | | | | | | | | |
| MOV4BY | 1448# | 2145 | 2162 | | | | | | | | | | | | | | | | |
| MOVXBY | 1445 | 1447 | 1449# | 1453 | | | | | | | | | | | | | | | |
| MRB0 | 183# | | | | | | | | | | | | | | | | | | |
| MRB1 | 193# | | | | | | | | | | | | | | | | | | |
| MRB1R3 | 194# | | | | | | | | | | | | | | | | | | |
| MRB1R4 | 195# | | | | | | | | | | | | | | | | | | |
| N1S1 | 229# | 1322 | 2839 | 2920 | 3148 | 3165 | | | | | | | | | | | | | |
| N1S2 | 230# | | | | | | | | | | | | | | | | | | |
| N1SCNT | 231# | 1988 | | | | | | | | | | | | | | | | | |
| N1STOT | 232# | 1215 | 2830 | 2905 | | | | | | | | | | | | | | | |
| N2S1 | 234# | 1338 | 2800 | 3136 | | | | | | | | | | | | | | | |
| N2S2 | 235# | | | | | | | | | | | | | | | | | | |
| N2SCNT | 236# | 1989 | | | | | | | | | | | | | | | | | |
| N2STOT | 237# | 1201 | 2790 | | | | | | | | | | | | | | | | |
| N3S1 | 239# | 1314 | 1328 | 2698 | 2910 | 3140 | 3161 | | | | | | | | | | | | |
| N3S2 | 240# | | | | | | | | | | | | | | | | | | |
| N3SCNT | 241# | 1990 | | | | | | | | | | | | | | | | | |
| N3STOT | 242# | 1208 | 1232 | 2683 | 2895 | | | | | | | | | | | | | | |
| N4S1 | 244# | 1320 | 2870 | 3150 | 3157 | | | | | | | | | | | | | | |
| N4S2 | 245# | | | | | | | | | | | | | | | | | | |
| N4SCNT | 246# | 1991 | | | | | | | | | | | | | | | | | |
| N4STOT | 247# | 1191 | 2860 | | | | | | | | | | | | | | | | |
| N5S1 | 249# | 1318 | 1326 | 2702 | 2835 | 3142 | 3146 | | | | | | | | | | | | |
| N5S2 | 250# | | | | | | | | | | | | | | | | | | |
| N5SCNT | 251# | 1992 | | | | | | | | | | | | | | | | | |
| N5STOT | 252# | 1196 | 1225 | 2688 | 2825 | | | | | | | | | | | | | | |
| N6S1 | 254# | 1312 | 1332 | 2755 | 2914 | 3129 | 3163 | | | | | | | | | | | | |
| N6S2 | 255# | | | | | | | | | | | | | | | | | | |
| N6SCNT | 256# | 1993 | | | | | | | | | | | | | | | | | |
| N6STOT | 257# | 1174 | 1220 | 2741 | 2900 | | | | | | | | | | | | | | |
| NEXT4 | 965 | 1042# | | | | | | | | | | | | | | | | | |
| POW00 | 691# | 697 | | | | | | | | | | | | | | | | | |
| POW20 | 742# | | | | | | | | | | | | | | | | | | |
| POW25 | 748# | 749 | | | | | | | | | | | | | | | | | |
| POW30 | 755# | 756 | | | | | | | | | | | | | | | | | |
| POWUP | 285 | 692# | | | | | | | | | | | | | | | | | |
| PRO4C2 | 2027 | 2035# | | | | | | | | | | | | | | | | | |
| PRO4C3 | 2033 | 2041# | | | | | | | | | | | | | | | | | |
| PRO4C4 | 2039 | 2046# | | | | | | | | | | | | | | | | | |
| PRO4C6 | 2051 | 2059# | | | | | | | | | | | | | | | | | |
| PRO4C7 | 2057 | 2065# | | | | | | | | | | | | | | | | | |
| PRO4C8 | 2063 | 2070# | | | | | | | | | | | | | | | | | |
| PRO4CH | 1975 | 1977 | 1987 | 2022# | | | | | | | | | | | | | | | |
| PRO6C2 | 2091 | 2096# | | | | | | | | | | | | | | | | | |
| PRO6C3 | 2094 | 2099# | | | | | | | | | | | | | | | | | |
| PRO6C4 | 2097 | 2103# | | | | | | | | | | | | | | | | | |
| PRO6C6 | 2108 | 2113# | | | | | | | | | | | | | | | | | |
| PRO6C7 | 2111 | 2116# | | | | | | | | | | | | | | | | | |
| PRO6C8 | 2114 | 2120# | | | | | | | | | | | | | | | | | |
| PRO6CH | 2004 | 2086# | | | | | | | | | | | | | | | | | |
| PRO7C2 | 2143 | 2148# | | | | | | | | | | | | | | | | | |
| PRO7C3 | 2146 | 2151# | | | | | | | | | | | | | | | | | |
| PRO7C4 | 2149 | 2155# | | | | | | | | | | | | | | | | | |
| PRO7C6 | 2160 | 2165# | | | | | | | | | | | | | | | | | |
| PRO7C7 | 2163 | 2168# | | | | | | | | | | | | | | | | | |
| PRO7C8 | 2166 | 2172# | | | | | | | | | | | | | | | | | |
| PRO7CH | 1968 | 1998 | 2003 | 2138# | | | | | | | | | | | | | | | |
| PROC05 | 1963 | 1970# | | | | | | | | | | | | | | | | | |
| PROC3L | 1965# | | | | | | | | | | | | | | | | | | |
| PROC8 | 1971# | | | | | | | | | | | | | | | | | | |
| PROC8L | 1974# | | | | | | | | | | | | | | | | | | |
| PROC8R | 1973 | 1976# | | | | | | | | | | | | | | | | | |
| PROCA | 1970 | 2000# | | | | | | | | | | | | | | | | | |
| PROCAL | 2003# | | | | | | | | | | | | | | | | | | |

```
PROCAR  2002   2004#
PROCD   1966#  1980
PROCDN  1981#
PROCDX  1958   1979#
PROCE   1959   1995#
PROCEX  1997   2006#  2044  2068  2074  2101  2118  2122  2153  2170  2174
PROCNT  1984   1988#
PROCRT  1956   2007#
PROCSG  577    1954#  2993
R4S1    224#   1341   1352  2654  2708  2804  2874  3152  3159
R4S2    225#
R4SCNT  226#   1976
R4STOT  227#   1147   1186  2646  2693  2795  2865
R6S1    212#   605    1343  2089  2305  2356  3057
R6S2    213#   2106
R6SCNT  214#   589    2086  2099  2103  2116  2353
R6STOT  215#   1132   2120  2326  2612  2637
RDT05   2939   2942#
RDT10   2946#  2950   2961
RDT15   2954#
RDT20   2947   2959#
RDT30   2955   2965#
RDT35   2969#  2975   2978
RDT40   2973   2982#
RDT50   2991#  3000   3009
RDT60   2987   2993#
RDT70   2997   3004#
RDT90   3035#
RDTAG   763    2936#  2986  3012  3022  3039
RSTTRP  284#   662    811   945   1822
SBFEND  267#
SBFPNT  261#   1426   1718  1748  3174
SBSTRT  265#   1427   3175
SBUF    264#   265    266   1429  3081
SBUFAD  263#
SBUFSZ  266#   1430
SCNBUF  204#   1403   1538  1542  1593  1627  1843  1853  1954  2026  2050  2090  2107  2142  2159  2971
SCNFLG  184#
SDATA   367#   1666
SDATA4  370#
SDATA9  371    384#
SDATAH  372#
SEGBUF  203#
SEGONE  970    977#
SGM90   1079   1084   1089#
SGMTCH  968    973    1076#
SGSUM4  1466#  1516
SGSUM6  1470#  1525   1558  1584
SGSUMR  1490   1495#
SGSUMX  1468   1471#
SGSUMY  1478   1483#
STACK   190#   397
SUM12C  2301#  2500   2551  2584
SUM2BY  1270#  1313   1319  1321  1327  1333  1340  1342  1351  1353
SUM3BY  1268#  1344
SUM4BY  1266#  1346
SWP4SJ  1951#  1972   1982
SWP4SN  1843#  1951
SWP6SJ  1952#  1967   1995  2001
SWP6SN  1853#  1952
SWPXEX  1851   1867#
SWPXRT  1871   1958#
TASAVE  198#
TBER4J  2679#  2713   2809  2844  2879  2925
TBER6J  2680#  2774
TBERR4  2508#  2635   2639  2659  2679
TBERR6  2501   2507#  2559  2585  2614  2680
TBL131  2545   2548#
TBLA1   2494   2497#
TBLK1   2422   2731#
TBLK13  2412   2531#
TBLK2   2416   2576#
TBLK3   2435   2790#
TBLK4   2442   2825#
TBLK5   2429   2860#
TBLK6   2432   2683#
TBLK7   2439   2895#
TBLK8   2425   2633#
TBLKA   2409   2483#
TBLKE   2419   2602#
TBNONE  2487   2498   2512# 2534  2539  2549  2577  2582  2605  2610  2644  2649  2681
TBNONJ  2681#  2686   2691  2696  2734  2739  2744  2749  2793  2798  2828  2833  2863  2868  2898  2903  2908
TCKCNT  583#   591
TCNT1   174#   855    913   977
TCNT2   175#   975
TERR10  680#
TERR12  681#   682
TERRWT  661    669#
TEST1   534#   565
TEST2   536#   564
TEST3   539#   539
TEST4   552#   552
```

| | | | | | | |
|---|---|---|---|---|---|---|
| THO00 | 787# | 815 | 820 | 839 | 842 | 846 | 870 |
| THO05 | 382 | 793# | 794 | 803 | 823 | 841 |
| THO10 | 793 | 799# |
| THO12 | 811# |
| THO14 | 810 | 813# |
| THO15 | 817 | 827# |
| THO20 | 828 | 832# |
| THO29 | 831 | 837# |
| THO30 | 840 | 846# |
| THO50 | 856# | 866 |
| THO55 | 857 | 861# |
| THO59 | 860 | 863# |
| THSND | 852 | 865 | 869 | 1007# | 1008 |
| TIME02 | 313 | 316# |
| TIME05 | 318 | 321# |
| TIME10 | 322 | 325# | 352 |
| TIME20 | 326# | 355 |
| TIME30 | 310 | 331# |
| TIME40 | 333 | 336# |
| TIME45 | 341 | 344# |
| TIME50 | 346 | 349# |
| TIME60 | 337 | 350 | 354# |
| TIMER | 307# |
| TIMREG | 187# |
| TIMTRP | 291# |
| TMWAIO | 1106# | 1107 |
| TMWAIT | 910 | 1101# |
| TOC10 | 472# | 476 |
| TOC20 | 474 | 476# |
| TOC50 | 470 | 478# |
| TOCIA | 460# | 635 |
| TOCRET | 479 | 636# |
| TONCNT | 196# |
| TONLTH | 197# |
| TPON | 629# | 712 |
| TPON15 | 730# | 731 |
| TPON16 | 734# | 735 |
| TPON17 | 738# | 739 |
| TPON30 | 630 | 635# |
| TPON40 | 636 | 640# |
| TPON50 | 642 | 646# |
| TPON55 | 651# | 655 |
| TPON60 | 654 | 659# |
| TPON90 | 632 | 638 | 644 | 657 | 661# |
| TPORET | 659 | 713# |
| TRO10 | 410# | 424 |
| TRO20 | 419# | 422 |
| TRO50 | 419 | 430# |
| TROMSM | 397# | 629 |
| TROPG0 | 386# | 437 |
| TROPG1 | 438 | 481# |
| TROPG2 | 439 | 619# |
| TROPG3 | 440 | 765# |
| TROPG4 | 441 | 987# |
| TROPG5 | 442 | 1110# |
| TROPG6 | 443 | 1253# |
| TROPG7 | 444 | 1363# |
| TROPG8 | 445 | 1670# |
| TROPG9 | 446 | 1938# |
| TROPGA | 447 | 2124# |
| TROPGB | 448 | 2377# |
| TROPGC | 449 | 2662# |
| TROPGD | 450 | 2928# |
| TROPGE | 451 | 3041# |
| TROPGF | 452 | 3194# |
| TRORET | 426 | 630# |
| TROTAB | 411 | 437# |
| TRYBLK | 2409# |
| TSC02 | 915# | 917 |
| TSC04 | 926# | 930 |
| TSC05 | 928# |
| TSC06 | 929# | 938 | 974 | 985 |
| TSC07 | 937# | 962 |
| TSC08 | 928 | 946# |
| TSC09 | 944 | 955# |
| TSC10 | 957 | 964# |
| TSC11 | 945# | 948 |
| TSC12 | 940# | 949 |
| TSC20 | 934# |
| TSCBUF | 176# | 942 | 946 | 960 | 964 | 1077 |
| TSCNT | 847 | 908# |
| TSEG1 | 172# | 378 | 789 | 955 | 967 |
| TSEG2 | 173# | 958 | 972 |
| TST31 | 542 | 545# |
| TST32 | 544 | 549# |
| TST41 | 556 | 559# |
| TST42 | 558 | 563# |
| TTA90 | 587 | 599 | 614# |
| TTACHK | 595 | 616# |
| TTAG | 494# | 640 |
| TTARET | 614 | 641# |
| TTATAB | 492# | 497 |

```
UNPK1    502#   525
UNPK2    506#   523
VER13    2413   2460#
VER8     2426   2458#
VERA     2410   2461#
VERD1    2423   2450#
VERD2    2436   2449#
VERD3    2433   2448#
VERD4    2443   2447#
VERD5    2440   2446#
VERE     2420   2459#
VERFLG   186#
VERT05   2422#
VERT10   2417   2429#
VERT20   2430   2439#
VERT90   2463#
VERTAG   2401#  3005
WRKBUF   270#   1539   1554   1563   1574   1583
```

CROSS REFERENCE COMPLETE

The control software stored in interface memory means 220 may be exemplified by the following listing.

```
IBM 4683 INTERFACE SOFTWARE FOR SUPER8

2500 A.D. Super 8 Macro Assembler - Version 4.01e
          -------------------------------------------------

Input  Filename : s84683df.asm
                    Output Filename : s84683df.obj 1                              ; Super 8 Software for the IBM 4683 interface.  The .Hex file produced
2                              ; is called S84683DF.HEX.
3                              ; Spectra-Physics Program Number R96-0274
4                              ; Spectra-Physics Programmed IC Number 0438-7379
5                              ;
6                              ; Default laser off, beeper on for IBM Venture diagnostics support
7                              ;
8                              ; Compiled by Blake Isaacs
9                              ; Date: 1-13-1989
10                             ;
11                             ; Changed EC byte from 24 to 14, 10 series for model F    1/13/89
12
13                             ; Interrupt vectors:
14
15        0000                 dummy    equ     0
16
17  0000  0574 0576 0578                 dw      vec_0,vec_2,vec_4,vec_6
    0006  057A
18  0008  04C3 0524 057C                 dw      int_p23,int_p33,vec_c,vec_e
    000E  057E
19  0010  0580 0582 0584                 dw      vec_10,vec_12,vec_14,vec_16
    0016  0586
20  0018  0588 058A 058C                 dw      vec_18,vec_1a,vec_1c,vec_1e
    001E  058E
21
22  0020                       start:
23  0020  9F                             ei              ; Zilog suggestion
24  0021  8F                             di
25
26                             ; initialize PORT registers:
27                             ; Initialize ports before setting to outputs:
28
29  0022  B0 D0                          clr     P0
30  0024  B0 D2                          clr     P2
31  0026  B0 D3                          clr     P3
32  0028  B0 D4                          clr     P4
33
```

```
34   002A   E6 F8 88            ld      P2AM,#%88       ; P31 is output (TxD)
35   002D   E6 F9 66            ld      P2BM,#%66
36   0030   E6 FA 09            ld      P2CM,#%09
37   0033   E6 FB 80            ld      P2DM,#%80
38
39                      ;            88 P2AM 10 00 10 00  P31 is TxD output, P30 is RxD input
40                      ; Modes         31 30 21 20       P20 and 21 wired together for uart ck
41                      ;
42                      ;                                 P33 is interupt on end of data
43                      ; for        62 P2BM 01 10 00 10  P32 is Data ready to 8039, P22 is low if
44                      ;               33 32 23 22       S8 has data, and P23 is nmi from emulator
45                      ; Ports
46                      ;            08 P2CM 00 00 10 01
47                      ;               35 34 25 24       HKO on P24/25 conf for fast int?
48                      ;
49                      ;            80 P2DM 10 00 00 00  P37 enables 3695.Tx
50                      ;               37 36 27 26       P27 is /ack from 8039 when in command
51                      ;                                 mode
52
53                      ; 241/0/PM defaults to good stuff.
54
55   0036   E6 F1 30            ld      PM,#%30
56
57                      ; 240/0/POM default is OK, too.
58
59   0039   E6 F0 FF            ld      POM,#%ff
60
61                      ; 252 & 253/0/P2xIP defaults OK
62                      ; 246/0/P4D defaults to all inputs, which we want.
63                      ; 247/0/P4OO defaults to totem-pole, which we want.
64
65                      ; 244/0/H0C : Handshake 0 used for Port 4, DMA to regs 0001 1101
66
67   003C   E6 F4 00            ld      H0C,#%0
68
69                      ; 245/0/H1C ...not used
70
71   003F   E6 F0 FF            ld      POM,#%FF        ; programs rest of P0 as address lines
72   0042   E6 00 00            ld      %0,#%0
73   0045   E6 D8 FF            ld      SPH,#%ff        ; the high part of the stack pointer
74   0048   E6 DD 01            ld      IMR,#%1         ; interrupt mask reg, level 0 only
75                                                      ; ok for 23 and 33
76   004B   E6 FF 10            ld      IPR,#%10        ; interupt priority register a>b>c
77                                                      ; (port 23 mode set above as interupt)
78
79                      ; Counters
80
81                      ; 224/0/C0CT and 225/0/C1CT : idle
82                      ; 224/1/C0M and 225/1/C1M : simple timers
83
84   004E   5F                  sb1
85   004F   E6 E0 04            ld      C0M,#4
86   0052   E6 E1 04            ld      C1M,#4
87   0055   4F                  sb0
88
89                      ; initialize interrupt system
90
91                      ; 255/0/IPR : default priorities OK.
92                      ; 222/SYM : Fast interrupts on IRQ4:
93
94   0056   E6 DE 10            ld      SYM,#%10        ;not needed yet, used dma
95
96                      ; 221/IMR : enable IRQ4 for Handshake 0 later...
97
98                      ; 254/0/EMT : defaults to stack in registers
99                      ; ..so put it at top of RAM (in registers)
100
101  0059   B0 FE               clr     EMT             ; fast memory; stack in registers
102  005B   B0 D8               clr     SPH
```

```
103  005D  E6 D9 FF            ld      SPL,#%FF
104
105                    ; Program the UART:
106                    ; /1/UMA : clock *32 rcv flag = 1 (16 desired by SP)
107                    ; /1/UMB : use system clock xtal/2 to P2,
108
109  0060  5F                  SB1
110  0061  E6 FE 00            ld      WUMCH,#%0   ; don't use user wake up mask
111  0064  E6 FF 00            ld      WUMSK,#%0
112  0067  E6 FA 73            ld      UMA,#%73    ;0111 0011    ; div by 16 for 6 Mhz xtal,
113                                                              ; no parity, wake up bits are
114                                                              ; expected high for rec and sent
115                                                              ; high on xmit.
116  006A  E6 FB 44            ld      UMB,#%44    ;0100 0100
117  006D  4F                  SB0
118
119                    ; /0/UTC : set up and enable transmitter:
120
121  006E  E6 EB BE            ld      UTC,#%BE    ; 10111110  12-bit chars, etc.
122                                                ; use P31 for xmit data, don't send
123                                                ; break, 2 stop bits, wake up enable!,
124                                                ; trans enable, zero count (not used),
125                                                ; TBE, and Trans DMA (off)
126
127                    ; /0/UIE : no interrupts for now
128
129  0071  80 ED               clr     UIE
130  0073  E6 EC 7C            ld      URC,#%7C    ; 01111100  reset, but disabled
131
132                    ; When ready to start, ld URC with #2 to enable receiver.
133  0076                      title   IBM 4683 INTERFACE SOFTWARE FOR SUPER8
134
135  0000                      RSECT
136                    ; Output buffer format:
137                    ;   dev_addr/SDLC/stat1/stat2/stat3/message
138                    ; Device addr and status will remain here permanently.
139
140  0000              out_buff  ds    40    ; output buffer, starts at reg loc 0
141  0028              out_len   ds    1     ;
142  0029              in_len    ds    1     ; input message length
143  002A              in_buff   ds    9     ; input buffer
144  0033              our_stat  ds    1     ; status byte:
145  0034              LblBuff1  ds    1     ; first label byte temp storage for
146                                          ; EC message sent out
147
148        0000       online    equ   0     ; bit 0 = online
149        0001       RR_pend   equ   1     ; bit 1 = RR pending
150        0002       SNRMed    equ   2     ; bit 2 = SNRMed; owe him NSA
151        0003       t8039done equ   3     ; tell 8039 handshake done
152        0004       cksm2     equ   4     ; 2nd cksm msg to 8039 done?
153        0005       lblsent   equ   5     ; label sent flag
154        0006       lsrdsbl   equ   6     ; send laser disable to 8039 flag
155
156  0035              stat_req  ds    1     ; 1 = send status on next cycle
157  0036              EC_req    ds    1     ; 1 = send EC on next cycle
158  0037              set_RR    ds    1
159  0038              int23cnt  ds    1     ; intp23 counter
160  0039              scnroncnt ds    1     ; number of times 4683 is serviced
161                                          ; after scanner 8039 PON line high
162                                          ; before interrupts enabled
163
164        0002       Sta_byte1 equ   2     ; offset from 0 for status bytes
165        0003       Sta_byte2 equ   3     ; (adr is 0, 1 is SDLC byte)
166        0004       Sta_byte3 equ   4     ; not used
167        0014       EC        equ   %14   ; EC level byte MODEL F ONLY 1/13/89
168        8000       ls374     equ   %8000 ; s8 to 8039 buffer address
169                                          ; anything beyond rom will do
170  003A              sv11      ds    1     ; temporary storage for outbound crc
171                                          ;**********************
```

```
172  0051                                  org     %51
173                                                        ;*      NOTE!
174                                                        ;*   DON'T USE r1
175                                        ends            ;*    (used by DMA)
176                                                        ;*********************
177  0076                                  CODE
178
179                              ; Setup low register file:
180
181  0076  1C 50                            ld      r1,#%50
182  0078  D6 C1 00              $lup   ld      @r1,#%00
183  007B  1A FB                            djnz    r1,$lup
184  007D  B0 00                            clr     0
185
186                              ;ROM checksum routine
187
188  007F  9C 00                 chksm0: ld     r9,#0
189  0081  C6 CC 00 00                   ldw    rr12,#0
190  0085  E3 8C                 chksm1: ldci   r8,@rr12          ; load next byte into reg
191                                                                ; from program memory
192  0087  02 98                            add    r9,r8           ; r9 to hold sum
193  0089  A6 CD 00                         cp     r13,#0          ; Address of last byte in EPROM
194                                                                ; (low address byte)
195  008C  68 02                            jr     eq,chksm2       ; done adding ?
196  008E  8B F5                            jr     chksm1          ; no, loop back
197  0090  A6 CC 10              chksm2:.cp      r12,#%10          ; Address of last byte in EPROM
198  0093  EB F0                            jr     ne,chksm1       ; no, loop back
199  0095  A6 C9 FF                         cp     r9,#%FF         ; is checksum FF ?
200  0098  68 02                            jr     eq,chksm3       ; yes, jump
201  009A  8B E3                            jr     chksm0          ; repeat checksum until passed
202                              chksm3:                           ; good checksum
203
204  009C  46 D3 04                         or     p3,#%04         ; init handshake to 8039
205  009F  E6 03 00                         ld     Sta_byte2,#0    ; mark scanner not alive status
206                                                                ; for init
207  00A2  E6 02 10                         ld     Sta_byte1,#%10  ; beeper enabled default
208  00A5  E6 38 00                         ld     int23cnt,#0     ; init intp23 counter
209  00A8  1C 05                            ld     r1,#5           ; setup to enable reset msg from 8039
210  00AA  E6 33 00                         ld     our_stat,#0
211  00AD  E6 39 14                         ld     scnroncnt,#20
212  00B0
213                              ; END OF INITIALIZTION
214
215  00B0                        uart_main:
216  00B0  46 EC FE                         or     URC,#%FE        ; Rx on
217  00B3  E8 EF                            ld     r14,UIO         ; trash random input
218  00B5  EC 2A                            ld     r14,#in_buff    ; point to buffer
219  00B7  B0 CC                            clr    r12             ; count = 0
220  00B9                        poll2
221  00B9  08 D2                            ld     r0,p2           ; test 8039 PON line
222  00BB  37 0F 0E                         btjrt  scnr_on,r0,#7   ; is the scanner on?
223  00BE  38 03                            ld     r3,Sta_byte2    ; no
224  00C0  37 30 19                         btjrf  pon_ovr,r3,#0   ; is scanner already marked off?
225  00C3  56 03 FE                         and    Sta_byte2,#%fe  ; no, mark scanner off bit
226  00C6  E6 35 01                         ld     stat_req,#1     ; queue an unrequested status
227  00C9  8F                               di                     ; disable interrupts
228  00CA  8B 10                            jr     pon_ovr
229
230  00CC                        scnr_on:
231  00CC  A6 39 63                         cp     scnroncnt,#99
232  00CF  68 0B                            jr     eq,pon_ovr
233  00D1  00 39                            dec    scnroncnt
234  00D3  A6 39 00                         cp     scnroncnt,#0
235  00D6  EB 04                            jr     nz,pon_ovr
236
237  00D8  9F                               ei                     ; enable interrupts only after delay
238  00D9  E6 39 63                         ld     scnroncnt,#99   ; of 20 services to 4683
239  00DC
240                              ; SERVICE 4683
```

```
241
242  00DC                    pon_ovr
243  00DC    38 33                   ld      r3,our_stat      ; check for 2nd cksm already sent
244  00DE    37 38 0D                btjrf   poll2a,r3,#cksm2 ; skip if already sent
245  00E1    37 30 0A                btjrf   poll2a,r3,#online ; skip if not yet on line
246  00E4    77 38                   bitr    r3,#cksm2        ; set cksm2 done
247  00E6    39 33                   ld      our_stat,r3
248  00E8    F6 02 C3                call    dilsr            ; send disable laser command
249  00EB    E6 35 01                ld      stat_req,#1
250
251  00EE    88 EC       poll2a      ld      R8,URC
252  00F0    37 80 C6                btjrf   poll2,r8,#0      ; loop until RDA
253  00F3
254  00F3    98 EF       poll3       ld      R9,UIO           ; get input
255  00F5    E6 EC FE                ld      URC,#%FE         ; reset UART recvr
256  00F8    37 8E BE                btjrf   poll2,r8,#7      ; loop until WJD
257
258  00FB    37 9E 08    poll4       btjrf   addred,r9,#7     ; go if an address
259  00FE    A6 C9 CA                cp      r9,#%CA          ; 1010 1010 4a + 80
260  0101    EB B6                   jr      ne,poll2         ; not my poll
261  0103    8D 02 CC                jp      polled           ; ..else, polled
262  0106                addred:
263  0106    A6 C9 4A                cp      r9,#%4A          ; for me?
264  0109    6B 05                   jr      eq,me            ; ..yes
265  010B    A6 C9 7A                cp      r9,#%7A          ; broadcast?
266  010E    EB A9                   jr      ne,poll2         ; ..no - try again
267
268                      me:                                  ; A message for me!
269  0110    76 C8 18                tm      R8,#%18          ; any UART errors?
270  0113    ED 00 80                jp      nz,uart_main     ; ..yes
271
272  0116    C6 CA FF FF             ldw     RR10,#%FFFF      ; init. CRC
273  011A    D7 E9       p_4_a       ld      @r14,R9          ; save input
274  011C    A6 CC 08                cp      r12,#%08         ; limit in_buff to 9 bytes
275  011.    6B 02                   jr      z,poll5
276  0121    EE                      inc     r14
277  0122    CE                      inc     r12              ; bump count
278
279  0123    08 EC       poll5       ld      R0,URC
280  0125    37 00 FB                btjrf   poll5,r0,#0      ; loop for RDA
281
282  0128    98 EF       poll6       ld      R9,UIO           ; get input
283  012A    A6 C9 7E                cp      R9,#%7E          ; flag (EOM)?
284  012D    EB 03                   jr      ne,poll7         ; ..no
285  012F    37 0F 06                btjrt   crc0,R0,#7       ; go if 9th bit
286  0132    37 0E E5    poll7       btjrf   p_4_a,R0,#7      ; error if 9th bit and not EOM
287  0135    8D 00 80                jp      uart_main        ; (needs a long jump)
288
289                      ;=========== EOM received =====================
290
291                      ; check CRC's
292
293  0138                crc0
294  0138    C9 29                   ld      in_len,r12       ; stash count in buffer
295  013A    C6 CA FF FF             ldw     rr10,#%FFFF      ; init CRC
296  013E    EC 2A                   ld      r14,#in_buff
297  0140    C7 9E       crc1        ld      r9,@r14
298  0142    F6 04 80                call    chksum           ; do CRC check on byte
299  0145    EE                      inc     r14              ; set to next byte
300  0146    CA F8                   djnz    r12,crc1         ; length of message in r12
301
302  0148    A6 CA B8                cp      r10,#%B8
303  014B    ED 00 80                jp      ne,uart_main
304  014E    A6 CB F0                cp      r11,#%F0
305  0151    ED 00 80                jp      ne,uart_main     ; bad CRC
306
307                      ; Have a good input message, determine which SDLC checks are needed...
308
309  0154
```

| Line | Addr | Bytes | | Label | Mnemonic | Operands | Comment |
|---|---|---|---|---|---|---|---|
| 310 | 0154 | 88 2B | | | ld | R8,in_buff+1 | |
| 311 | 0156 | 76 C8 11 | | | tm | r8,#%11 | ; is it RRROSSSO ? |
| 312 | 0159 | 6B 0C | | | jr | z,poll9 | ; ..yes - msg |
| 313 | 015B | 98 C8 | | | ld | r9,r8 | |
| 314 | 015D | 56 C9 1F | | | and | r9,#%1F | |
| 315 | 0160 | A6 C9 01 | | | cp | r9,#%01 | |
| 316 | 0163 | 6B 0C | | | jr | eq,poll10 | ; RR |
| 317 | 0165 | 8B 18 | | | jr | poll11 | ; other SDLC protocol bytes |
| 318 | | | | | | | |
| 319 | | | | ; check SDLC counts... | | | |
| 320 | 0167 | | | poll9: | | | |
| 321 | 0167 | 56 C8 0E | | | and | r8,#%0E | |
| 322 | 016A | D0 C8 | | | sra | r8 | |
| 323 | 016C | A2 85 | | | cp | r8,r5 | ; vs my rrr |
| 324 | 016E | ED 00 B0 | | | jp | ne,uart_main | |
| 325 | 0171 | 88 2B | | poll10 | ld | r8,in_buff+1 | |
| 326 | 0173 | F0 C8 | | | swap | r8 | |
| 327 | 0175 | 56 C8 0E | | | and | r8,#%0E | |
| 328 | 0178 | D0 C8 | | | sra | r8 | |
| 329 | 017A | A2 84 | | | cp | r8,r4 | ; vs my sss |
| 330 | 017C | ED 00 B0 | | | jp | ne,uart_main | |
| 331 | 017F | 56 EC FD | | poll11 | and | URC,#%FF-%02 | ; stop UART receiver |
| 332 | | | | | | | |
| 333 | | | | ; At this point, we have either: | | | |
| 334 | | | | ; A broadcast message | | | |
| 335 | | | | ; A scanner message | | | |
| 336 | | | | ; A SNRM | | | |
| 337 | | | | ; An RR | | | |
| 338 | | | | ; | | | |
| 339 | | | | ; If we are offline, only a SNRM is acceptable; we should send | | | |
| 340 | | | | ; NSA, reset our counts, and mark ourselves on-line. | | | |
| 341 | | | | | | | |
| 342 | 0182 | 38 33 | | | ld | r3,our_stat | ; get our status |
| 343 | | | | | | | ; (used throughout below code) |
| 344 | | | | | | | ; |
| 345 | | | | | | | ; Address check removed to allow |
| 346 | | | | | | | ; device specific non-sequenced |
| 347 | | | | | | | ; system reset 9/21/88 |
| 348 | | | | | | | ; |
| 349 | 0184 | A6 2B 03 | | | cp | in_buff+1,#%03 | ; NSI msg? |
| 350 | 0187 | EB 0F | | | jr | ne,BCAST_tst | |
| 351 | 0189 | A6 2C 00 | | | cp | in_buff+2,#%00 | ; is it a system command? |
| 352 | 018C | ED 00 B0 | | | jp | ne,uart_main | ; system commands only for NSI frames |
| 353 | 018F | A6 2D 40 | | | cp | in_buff+3,#%40 | ; system reset? |
| 354 | 0192 | 6D 02 BB | | | jp | eq,sys_reset | ; if so, reset S8 and 8039 |
| 355 | | | | | | | ; IBM 7/26/88 |
| 356 | | | | | | | ; System reset is the only NSI frame |
| 357 | | | | | | | ; which concerns the scanner |
| 358 | 0195 | 8D 00 B0 | | | jp | uart_main | |
| 359 | | | | | | | |
| 360 | 0198 | | | BCAST_tst: | | | |
| 361 | 0198 | A6 2A 4A | | | cp | in_buff,#%4A | ; if the message was to the broadcast |
| 362 | 019B | 6B 03 | | | jr | eq,SNRM_tst | ; address and was not sys reset, |
| 363 | 019D | 8D 00 B0 | | | jp | uart_main | ; ignore it |
| 364 | | | | | | | |
| 365 | 01A0 | | | SNRM_tst: | | | |
| 366 | 01A0 | A6 2B 83 | | | cp | in_buff+1,#%83 | ; is it SNRM? |
| 367 | 01A3 | EB 17 | | | jr | ne,no_SNRM | ; ..no |
| 368 | | | | | | | |
| 369 | 01A5 | 77 32 | | | bitr | r3,#RR_pend | ; SNRMed so mark no RR pending |
| 370 | 01A7 | 77 35 | | | bits | r3,#SNRMed | ; ..yes - mark it |
| 371 | 01A9 | 77 31 | | | bits | r3,#online | ; ..and put us online |
| 372 | 01AB | 37 3C 05 | | | btjrf | NDilsr,r3,#lsrdsbl | |
| 373 | 01AE | F6 02 C3 | | | call | dilsr | ; if laser disable flag set, disable |
| 374 | | | | | | | ; laser after receiving a SNRM |
| 375 | 01B1 | 77 3C | | | bitr | r3,#lsrdsbl | ; clear flag |
| 376 | 01B3 | | | NDilsr: | | | |
| 377 | 01B3 | 39 33 | | | ld | our_stat,r3 | ; save stat |
| 378 | 01B5 | B0 C4 | | | clr | r4 | ; clear msg counts |

```
379  0187  B0 C5              clr    r5                  ; ...
380  0189  8D 00 B0           jp     uart_main           ; and exit
381
382                       ; If we just sent a message, then we only expect an RR.
383
384  018C  37 32 1D   no_SNRM btjrf no_RR,r3,#RR_pend    ; go if no RR reqd
385  018F  28 2B              ld     r2,in_buff+1        ; get SDLC byte
386  01C1  56 C2 1F           and    r2,#%1F             ; should be RRR00001
387  01C4  A6 C2 01           cp     r2,#1
388  01C7  EB 13              jr     .ne,no_RR           ; ..but it isnt
389
390                       ; RR received
391
392  01C9  77 32              bitr   r3,#RR_pend         ; reset RR pending bit
393  01CB  39 33              ld     our_stat,r3         ; save status
394
395  01CD  E6 35 00           ld     stat_req,#0         ; reset status pending flag
396  01D0  E6 36 00           ld     EC_req,#0           ; reset EC pending flag
397  01D3  37 3A 03           btjrf  RRa,r3,#lblsent     ; skip if current label not sent
398                                                      ; clear label buffer and permit
399  01D6  F6 04 AF           call   mk_ready            ; scans from the 8039
400  01D9  8D 00 B0   RRa     jp     uart_main           ; and exit
401
402  01DC  37 31 03   no_RR   btjrt  we_is_on,r3,#online ; go if online
403  01DF  8D 00 B0           jp     uart_main           ; ERROR - no valid msgs here
404
405  01E2              we_is_on:
406  01E2  28 2B              ld     r2,in_buff+1        ; get SDLC byte
407  01E4  56 C2 11           and    r2,#%11             ; should be RRR0SSS0
408  01E7  ED 00 B0           jp     nz,uart_main        ; ..but it isnt
409
410                       ; Got a good message...process it
411
412  01EA  28 2C              ld     r2,in_buff+2        ; get command byte
413  01EC  A6 C2 00           cp     r2,#%00
414  01EF  6D 02 94           jp     z,sys_cmd           ; go if system command
415
416  01F2  A6 C2 11           cp     r2,#%11             ; enable command
417  01F5  EB 17              jr     ne,cmd1
418  01F7  E6 35 01           ld     stat_req,#1         ; queue an unrequested status
419  01FA  E6 36 00           ld     EC_req,#0           ; clear any EC request
420  01FD  F6 04 18           call   tell_8039
421  0200  28 33              ld     r2,our_stat         ; did the 8039 get it?
422  0202  37 26 23           btjrf  cmd1a,r2,#t8039done
423  0205  77 26              bitr   r2,#t8039done
424  0207  29 33              ld     our_stat,r2
425  0209  46 03 02           or     Sta_byte2,#%2       ; 0000 0010
426  020C  88 70              jr     GoodCmdRtn
427
428  020E  A6 C2 12   cmd1    cp     r2,#%12
429  0211  EB 17              jr     ne,cmd2             ; disable
430  0213  E6 35 01           ld     stat_req,#1         ; queue an unrequested status
431  0216  E6 36 00           ld     EC_req,#0           ; clear any EC request
432  0219  F6 04 18           call   tell_8039
433  021C  28 33              ld     r2,our_stat         ; did the 8039 get it?
434  021E  37 26 07           btjrf  cmd1a,r2,#t8039done
435  0221  77 26              bitr   r2,#t8039done
436  0223  29 33              ld     our_stat,r2
437  0225  56 03 FD           and    Sta_byte2,#%fd      ; 1111 1101
438  0228  88 54      cmd1a   jr     GoodCmdRtn
439
440  022A  A6 C2 14   cmd2    cp     r2,#%14
441  022D  EB 17              jr     ne,cmd3             ; beep enable
442  022F  E6 35 01           ld     stat_req,#1         ; queue an unrequested status
443  0232  E6 36 00           ld     EC_req,#0           ; clear any EC request
444  0235  F6 04 18           call   tell_8039
445  0238  28 33              ld     r2,our_stat         ; did the 8039 get it?
446  023A  37 26 07           btjrf  cmd2a,r2,#t8039done
447  023D  77 26              bitr   r2,#t8039done
```

```
448  023F  29 33              ld     our_stat,r2
449  0241  46 02 10           or     Sta_byte1,#%10    ; 0001 0000
450  0244  8B 38       cmd2a  jr     GoodCmdRtn
451
452  0246  A6 C2 18    cmd3   cp     r2,#%18
453  0249  ED 02 63           jp     ne,cmd4           ; disable-beep
454  024C  E6 35 01           ld     stat_req,#1       ; queue an unrequested status
455  024F  E6 36 00           ld     EC_req,#0         ; clear any EC request
456  0252  F6 04 18           call   tell_8039
457  0255  28 33              ld     r2,our_stat       ; did the 8039 get it?
458  0257  37 26 07           btjrf  cmd3a,r2,#t8039done
459  025A  77 26              bitr   r2,#t8039done
460  025C  29 33              ld     our_stat,r2
461  025E  56 02 EF           and    Sta_byte1,#%ef    ; 1110 1111
462  0261  8B 1B       cmd3a  jr     GoodCmdRtn
463
464  0263  A6 C2 32    cmd4   cp     r2,#%32
465  0266  ED 00 B0           jp     ne,uart_main      ; scanner reset
466  0269  E6 35 01           ld     stat_req,#1       ; queue an unrequested status
467  026C  E6 36 00           ld     EC_req,#0         ; clear any EC request
468  026F  F6 04 18           call   tell_8039
469  0272  28 33              ld     r2,our_stat       ; did the 8039 get it?
470  0274  37 26 07           btjrf  GoodCmdRtn,r2,#t8039done
471  0277  77 26              bitr   r2,#t8039done
472  0279  29 33              ld     our_stat,r2
473  027B  56 03 FE           and    Sta_byte2,#%fe    ; mark scanner off bit
474  027E        GoodCmdRtn:
475  027E  28 33              ld     r2,our_stat
476  0280  77 22              bitr   r2,#RR_pend       ; any good command can serve as
477  0282  29 33              ld     our_stat,r2       ; an RR
478  0284  5E                 inc    r5                ; bump receive count
479  0285  56 C5 07           and    r5,#7             ; modulo 8
480  0288  E6 37 01           ld     set_RR,#1         ; queue an RR to next poll
481  028B  37 2A 03           btjrf  GoodCmdRtn1,r2,#lblsent
482  028E  F6 04 AF           call   mk_ready          ; if the command was sent in response
483               GoodCmdRtn1:                         ; to a label, reenable dma
484  0291  8D 00 B0           jp     uart_main
485
486  0294  28 2D       sys_cmd ld    r2,in_buff+3      ; get system command
487  0296  A6 C2 10           cp     r2,#%10           ; test request?
488  0299  6B 05              jr     eq,SysCmd1
489  029B  A6 C2 20           cp     r2,#%20           ; status request?
490  029E  EB 08              jr     ne,SysCmd2
491  02A0        SysCmd1:
492  02A0  E6 35 01           ld     stat_req,#1
493  02A3  E6 36 00           ld     EC_req,#0         ; clear any EC request
494  02A6  8B D6              jr     GoodCmdRtn
495  02A8        SysCmd2:
496  02A8  A6 C2 40           cp     r2,#%40           ; system reset
497  02AB  6B 0E              jr     eq,sys_reset
498  02AD  A6 C2 80           cp     r2,#%80
499  02B0  ED 00 B0           jp     ne,uart_main      ; bad system command
500  02B3  E6 36 01           ld     EC_req,#1
501  02B6  E6 35 00           ld     stat_req,#0       ; clear any status request
502  02B9  8B C3              jr     GoodCmdRtn
503
504  02BB        sys_reset:
505  02BB  2C 32              ld     r2,#%32           ; reset scanner
506  02BD  F6 04 18           call   tell_8039         ; to reset
507  02C0  8D 00 20           jp     %0020             ; restart program!
508
509  02C3        dilsr:
510  02C3  2C 12              ld     r2,#%12           ; load laser disable command
511  02C5  F6 04 18           call   tell_8039
512  02C8  56 03 FD           and    Sta_byte2,#%fd    ; 1111 1101
513  02CB  AF                 ret
514
515                    ; We got 1st poll character...look for 2nd
516
```

```
517  02CC  88 EC         polled   ld     R8,URC
518  02CE  37 80 FB               btjrf  polled,R8,#0    ; loop until RDA
519  02D1  98 EF                  ld     r9,UIO          ; get input
520  02D3  E6 EC FF               ld     URC,#%FF        ; clear status
521  02D6  A6 C9 CA               cp     r9,#%CA
522  02D9  ED 00 B9               jp     ne,poll2        ; else, ignore
523
524  02DC                poll_4me:
525
526                     ; If offline, we will always send ROL.
527                     ; If SNRMd, we will send NSA.
528                     ; If out_len <> 0, send message from out_buff.
529                     ; If out_len = 0, simply send EOP.
530
531  02DC                ok:
532  02DC  38 33                  ld     r3,our_stat
533  02DE  37 31 14               btjrt  p_4a,r3,#online ; go if on_line
534  02E1  38 03                  ld     r3,Sta_byte2
535  02E3  37 30 06               btjrf  SendROL,r3,#0   ; don't disable laser if scanner
536                                                       ; not alive
537  02E6  38 33                  ld     r3,our_stat
538  02E8  77 3D                  bits   r3,#lsrdsbl     ; set laser disable flag in our_stat
539  02EA  39 33                  ld     our_stat,r3
540  02EC                SendROL:
541  02EC  F6 04 4D               call   SEND_ROL        ; send ROL
542  02EF  F6 04 AF               call   mk_ready        ; enable inbound scans from 8039
543  02F2  8D 00 B0               jp     uart_main       ; ..and exit
544
545  02F5  37 34 0D       p_4a:   btjrf  p_4b,r3,#SNRMed ; go if not SNRMed
546  02F8  F6 04 52               call   SEND_NSA        ; if SNRM, send NSA
547  02FB  77 34                  bitr   r3,#SNRMed      ; reset request for NSA
548  02FD  39 33                  ld     our_stat,r3     ; ..in rsect
549  02FF  E6 35 01               ld     stat_req,#1     ; queue an unrequested status
550  0302  8D 00 B0               jp     uart_main       ; ..and exit
551
552  0305  A6 35 00       p_4b:   cp     stat_req,#%0    ; see if we need to send status
553  0308  6B 18                  jr     z,p_4c          ; skip if no request for status
554  030A  E6 01 00               ld     out_buff+1,#%0  ; need to wipe the SDLC byte
555  030D  EC 00                  ld     r14,#%0         ; msg pointer
556  030F  CC 05                  ld     r12,#%5         ; length = 5
557  0311  F6 03 82               call   MSG_OUT         ; send status
558  0314  38 33                  ld     r3,our_stat
559  0316  77 33                  bits   r3,#RR_pend     ; mark RR pending
560  0318  77 3A                  bitr   r3,#lblsent
561  031A  39 33                  ld     our_stat,r3
562  031C  E6 37 00               ld     set_RR,#0       ; clear RR out flag
563  031F  8D 00 B0               jp     uart_main
564
565  0322  A6 36 00       p_4c:   cp     EC_req,#0       ; see if an EC req has been queued
566  0325  6B 27                  jr     z,p_4d          ; again skip if no EC request
567  0327  E6 01 00               ld     out_buff+1,#0   ; must wipe SDLC byte or MSG_OUT fails
568  032A  46 02 01               or     out_buff+2,#%01 ; flag that EC present
569
570  032D  E4 05 34               ld     LblBuff1,out_buff+5
571  0330  E6 05 14               ld     out_buff+5,#EC  ; EC level
572  0333  EC 00                  ld     r14,#out_buff   ;
573  0335  CC 06                  ld     r12,#%6         ; length =6
574  0337  F6 03 82               call   MSG_OUT
575  033A  E4 34 05               ld     out_buff+5,LblBuff1
576
577  033D  38 33                  ld     r3,our_stat
578  033F  56 02 FE               and    out_buff+2,#%FE ; mark EC not in msg status
579  0342  77 33                  bits   r3,#RR_pend     ; mark RR pending
580  0344  77 3A                  bitr   r3,#lblsent
581  0346  39 33                  ld     our_stat,r3
582  0348  E6 37 00               ld     set_RR,#0       ; clear RR out flag
583  034B  8D 00 B0               jp     uart_main
584
585  034E  A6 28 00       p_4d:   cp     out_len,#0      ; is there a label to send?
```

```
586  0351  6B 1B              jr      eq,p_4e         ; skip if not
587  0353  C8 28              ld      r12,out_len     ; get length
588  0355  EC 00              ld      r14,#out_buff   ; ..and address
589  0357  EE                 inc     r14             ; point to SDLC byte
590  0358  D6 CE 00           ld      @r14,#%0        ; clear byte (see MSG_OUT for why)
591  035B  00 CE              dec     r14             ; point back to start
592  035D  F6 03 82           call    MSG_OUT         ; send msg
593  0360  38 33              ld      r3,our_stat
594  0362  77 33              bits    r3,#RR_pend     ; mark RR pending
595  0364  77 3B              bits    r3,#lblsent     ; mark label sent
596  0366  39 33              ld      our_stat,r3
597  0368  E6 37 00           ld      set_RR,#0       ; clear RR out flag
598  036B  8D 00 B0           jp      uart_main       ; exit
599
600  036E  A6 37 01    p_4e:  cp      set_RR,#1       ; check if RR is needed
601  0371  EB 09              jr      ne,p_4f
602  0373  E6 37 00           ld      set_RR,#0       ; clear flag
603  0376  F6 04 31           call    SEND_RR         ; send RR
604  0379  8D 00 B0           jp      uart_main
605
606  037C  F6 04 5A    p_4f:  call    SEND_EOP        ; else, send EOP
607  037F  8D 00 B0           jp      uart_main
608
609
610                        ; Message output... assumes register usage:
611                        ;    R14 = address of msg to send (RSECT)
612                        ;    R12 = length of message (max. 20 )
613                        ;    RR10 : will be used for checksums
614                        ;    R9   : will carry one byte for output
615                        ;    R8   : will carry flags for output
616                        ;    RR4  : SDLC counts
617  0382              MSG_OUT:
618  0382  56 EC FD           and     URC,#%FF-%02    ; receiver off
619  0385  46 D3 80           or      P3,#%80         ; P37 on (3695 xmitter)
620  0388  0C 0C              ld      R0,#12          ;                         10
621  038A  0A FE       lll1:  djnz    R0,lll1         ; delay for awhile        12/n
622  038C  5F                 sb1     ;                                         6
623  038D  46 FA 01           or      UMA,#%01        ; 9th bit high (1 state)  10
624  0390  4F                 sb0     ;                                         6
625  0391  9C 4A              ld      R9,#%4a         ; get 1st byte            10
626  0393  EE                 inc     R14             ;                         6
627  0394  99 EF              ld      UIO,R9          ; ..send it               10
628                                                   ;    need 380-388 for address
629  0396  C6 CA FF FF        ldw     RR10,#%FFFF     ; init. CRC               12
630  039A  F6 04 80           call    chksum          ; 18+166
631
632                        ; set SDLC counts:
633  039D  C7 8E              ld      R8,@R14         ; get byte                6
634  039F  76 C8 11           tm      R8,#%11         ; normal msg?             10
635  03A2  EB 1C              jr      nz,MOX          ; ..no - protocol         12
636
637  03A4  38 33              ld      r3,our_stat
638  03A6  37 32 0B           btjrf   RRNotPending,r3,#RR_pend
639  03A9  A6 C4 00           cp      r4,#0           ; if RR still pending
640  03AC  EB 04              jr      nz,sssNE0       ; decrement sss and
641  03AE  4C 07              ld      r4,#7           ; retransmit
642  03B0  8B 02              jr      RRNotPending    ; (modulo 8)
643  03B2              sssNE0
644  03B2  00 C4              dec     r4
645  03B4              RRNotPending:
646  03B4  88 C5              ld      R8,r5           ; SDLC rrr                6
647  03B6  F0 C8              swap    r8              ;                         6
648  03B8  42 84              or      R8,r4           ; SDLC sss                6
649  03BA  90 C8              rl      r8              ;                         6
650  03BC  D7 E8              ld      @R14,R8         ; stuff counts            6
651  03BE  8B 07              jr      M_0_0           ;                         12
652
653  03C0  FF          MOX:   nop
654  03C1  FF                 nop
```

```
655  03C2  FF                        nop
656  03C3  FF                        nop
657  03C4  FF                        nop
658  03C5  8B 00              jr     M_0_0              ;                          12
659
660  03C7  5F         M_0_0:  sb1                       ;                           6
661  03C8  56 FA FE           and    UMA,#%FF-%01       ; 9th bit 0 state          10
662  03CB  4F                 sb0                       ;                           6
663  03CC  00 CC      M_0_1   dec    R12                ;                           6
664  03CE  6B 0A              jr     z,M_0_2            ; go if no more data       10
665  03D0  C7 9E              ld     R9,@R14            ; get byte                  6
666  03D2  EE                 inc    R14                ;                           6
667
668  03D3  99 EF              ld     UIO,R9             ; (192 2nd) total 384      10
669
670  03D5  F6 04 80           call   chksum             ;                       12+166
671  03D8  8B F2              jr     M_0_1              ;                          12
672
673  03DA  98 CA      M_0_2   ld     R9,R10             ; get 1st chksum            6
674  03DC  89 3A              ld     sv11,R11           ; ..save 2nd                6
675  03DE  60 C9              com    R9                 ; compl. 1st one            6
676  03E0  99 EF              ld     UIO,R9             ; ..send it   (close)      10
677
678  03E2  F6 04 80           call   chksum             ; ..and add to CRC        178
679  03E5  98 3A              ld     R9,sv11            ; get original 2nd CRC      6
680  03E7  60 C9              com    R9                 ;                           6
681  03E9  99 EF              ld     UIO,R9             ; send it   total?         10
682
683  03EB  F6 04 80           call   chksum             ;                         178
684  03EE  9C 7E              ld     R9,#%7E            ; load flag byte           10
685  03F0  5F                 sb1                       ;                           6
686  03F1  46 FA 01           or     UMA,#%01           ; 9th bit 1 state          10
687  03F4  4F                 sb0                       ;                           6
688  03F5  0C 0F              ld     r0,#15             ;                          10
689  03F7  0A FE      MOX5    djnz   r0,MOX5            ;                         152
690  03F9  99 EF              ld     UIO,R9             ; xmit                     10
691
692  03FB  9C 15              ld     r9,#21
693  03FD  9A FE      M_0_3a  djnz   r9,M_0_3a
694
695  03FF  56 D3 7F           and    P3,#%7F            ; 3695 Tx off
696  0402  88 EF              ld     r8,UIO
697  0404  46 EC FE           or     URC,#%FE           ; UART Rx on
698  0407  5F                 sb1
699  0408  56 FA FE           and    UMA,#%FF-%01       ; 9th bit 0 state
700  040B  4F                 sb0                       ;
701  040C  88 01              ld     r8,out_buff+1      ; get SDLC byte
702  040E  76 C8 11           tm     r8,#%11            ; was it protocol?
703  0411  EB 04              jr     nz,M_0_4
704  0413  4E                 inc    r4                 ; bump send count, sss
705  0414  56 C4 07           and    r4,#7
706  0417  AF         M_0_4   ret                       ; exit routine
707
708                    tell_8039:                       ; RR will go out on next poll,
709
710  0418  08 D2              ld     r0,p2              ; test 8039 PON line
711  041A  37 0E 12           btjrf  t8039b,r0,#7       ; is the scanner on?
712                                                     ; if not, don't try to talk to 8039
713  041D  08 03              ld     r0,Sta_byte2       ; is the scanner marked on?
714  041F  37 00 0D           btjrf  t8039b,r0,#0       ; if not, don't try to talk to 8039
715  0422  87 21 00 80        lde    ls374,r2           ; load command byte into buffer chip
716  0426  56 D3 FB           and    P3,#%FB            ; bit 2 on port 3 (P27 on 8039)
717  0429  2C 28              ld     r2,#40             ; short delay to allow handshake
718  042B  2A FE      t8039a  djnz   r2,t8039a          ; to 8039 to complete (int_p23)
719  042D  8B 01              jr     t8039c
720  042F  8F         t8039b  di
721  0430  AF         t8039c  ret
722
723                    ; ============= send Receive-Ready ===========
```

```
724  0431                    SEND_RR:
725  0431   88 C5                ld      r8,r5               ; my RRR
726  0433   F0 C8                swap    r8
727  0435   90 C8                rl      r8
728  0437   46 C8 01             or      r8,#1
729  043A   89 01                ld      out_buff+1,r8
730  043C                    common_short:
731  043C   E6 00 4A             ld      out_buff,#%4A       ; my addr
732  043F   EC 00                ld      r14,#out_buff       ; point to buffer
733  0441   C8 33                ld      r12,our_stat
734  0443   77 CA                bitr    r12,#lblsent
735  0445   C9 33                ld      our_stat,r12
736  0447   CC 02                ld      r12,#2              ; count = 2
737  0449   F6 03 82             call    MSG_OUT
738  044C   AF                   ret
739
740                         ; ========= Send ROL ==============
741  044D                    SEND_ROL:
742  044D   E6 01 0F             ld      out_buff+1,#%0F     ; ROL
743  0450   8B EA                jr      common_short
744
745                         ;========= Send NSA ==============
746  0452                    SEND_NSA:
747  0452   E6 01 63             ld      out_buff+1,#%63     ; NSA
748  0455   E6 35 01             ld      stat_req,#1         ; queue an unrequested status
749  0458   8B E2                jr      common_short
750
751                         ;========= Send EOP ==============
752  045A                    SEND_EOP:
753  045A   56 EC FD             and     URC,#%FF-%02        ; receiver off
754  045D   46 D3 80             or      P3,#%80             ; P37 on (3695 xmitter) 195 to xmit
755  0460   0C 0E                ld      R0,#14              ; NOT hex #        10 cyc
756  0462   0A FE       lll7     djnz    R0,lll7             ; delay for awhile  n*10 (12 last)
757  0464   FF                   nop                         ;                   6
758  0465   5F                   sb1                         ;                   6
759  0466   46 FA 01             or      UMA,#%01            ; 9th bit 1 state   10
760  0469   4F                   sb0                         ;                   6
761
762  046A   E6 EF 5A             ld      UIO,#%5A            ; send EOP          10 total  192
763
764  046D   0C 11                ld      r0,#17              ; need 195 cycles    10
765  046F                    $loc_del:
766  046F   0A FE                djnz    r0,$loc_del         ;                   n*12
767  0471   FF                   nop                         ;
768  0472   56 D3 7F             and     P3,#%7F             ; 3695 Tx off  total 198  10
769  0475   88 EF                ld      r8,UIO              ; trash input?
770  0477   46 EC FE             or      URC,#%FE            ; UART Rx on
771  047A   5F                   sb1
772  047B   56 FA FE             and     UMA,#%FF-%01        ; 9th bit 0 state
773  047E   4F                   sb0                         ; 12/24/86
774  047F   AF                   ret
775
776                         ;
777                         ; ===== Checksum routine =================
778                         ; Uses RR10 for chksums.
779                         ; Current byte in R9.
780  0480   70 C3           chksum: push    r3              ; 10
781  0482   B2 9A                   xor     R9,R10          ; 6
782  0484   08 C9                   ld      R0,R9           ; 6
783  0486   F0 C9                   swap    R9              ; 8
784  0488   56 C9 F0                and     R9,#%F0         ; 10
785  048B   B2 90                   xor     R9,R0           ; 6
786  048D   38 C9                   ld      R3,R9           ; 6
787  048F   F0 C9                   swap    R9              ; 6
788  0491   56 C9 0F                and     R9,#%0F         ; 10
789  0494   B2 9B                   xor     R9,R11          ; 6
790  0496   A8 C9                   ld      R10,R9          ; 6
791  0498   98 C3                   ld      R9,R3           ; 6
792  049A   88 C9                   ld      R11,R9          ; 6
```

```
793  049C  F0 C9              swap    R9              ; 6
794  049E  E0 C9              rr      R9              ; 6
795  04A0  08 C9              ld      R0,R9           ; 6
796  04A2  56 C0 07           and     R0,#%07         ;10
797  04A5  56 C9 F8           and     R9,#%F8         ;10
798  04A8  B2 A9              xor     R10,R9          ; 6
799  04AA  B2 B0              xor     R11,R0          ; 3
800  04AC  50 C3              pop     r3              ; 10
801  04AE  AF                 ret                     ; 14
802
803                                                   ; device address, SDLC byte,
804                                                   ; and default status bytes (enabled)
805  04AF           mk_ready:
806  04AF  46 D2 20           or      P2,#%20         ; be sure P25 is high state
807                                                   ; 0010 0000
808  04B2  5F                 sb1
809  04B3  E6 F0 00           ld      DCH,#%0         ; DMA high byte
810  04B6  E6 F1 30           ld      DCL,#%30        ; DMA low byte, will int when zero
811  04B9  4F                 sb0
812
813  04BA  1C 05              ld      r1,#5           ; used to point into register file, by DMA
814                                                   ; on int will hold msg length ->out_len
815  04BC  E6 28 00           ld      out_len,#%0     ; clear semephore to communication side
816  04BF  E6 F4 1D           ld      HOC,#%1d        ; load/reload for handshake operation.
817                                                   ; note-do not split this command!
818  04C2  AF                 ret
819
820  04C3            int_p23:
821  04C3  4F                 sb0
822  04C4  70 C2              push    r2
823  04C6  70 C3              push    r3
824  04C8  E6 FC FF           ld      P2AIP,#%ff      ; reset int pending reg (see 8.7.4)
825                                                   ; in super8 book
826  04CB  46 D3 04           or      p3,#%04         ; raise handshake line to 8039
827                                                   ; (finish tell_8039)
828  04CE  3C 14              ld      r3,#20          ; timeout for handshake complete from 8039
829  04D0  28 D2    intp23a   ld      r2,p2
830  04D2  00 C3              dec     r3
831  04D4  A6 C3 00           cp      r3,#0
832  04D7  6B 46              jr      eq,intp23e
833  04D9  37 2E 39           btjrf   intp23d,r2,#7   ; if 8039 off, skip
834  04DC  37 26 F1           btjrf   intp23a,r2,#3   ; wait until p23 goes back up
835  04DF  38 33              ld      r3,our_stat
836  04E1  77 37              bits    r3,#t8039done   ; mark handshake done.
837  04E3  39 33              ld      our_stat,r3
838
839  04E5  38 38              ld      r3,int23cnt     ; count p23 interrupts
840  04E7  3E                 inc     r3              ; from reset
841  04E8  39 38              ld      int23cnt,r3
842  04EA  A6 C3 01           cp      r3,#1           ; first int23 since reset?
843  04ED  EB 0B              jr      ne,intp23b
844  04EF  2C 79              ld      r2,#%79         ; if so, send cksm again
845  04F1  B7 21 00 80        lde     ls374,r2        ; send cksm msg byte to buffer chip
846  04F5  56 D3 FB           and     p3,#%FB         ; drop port 3 bit 2 handshake
847  04F8  8B 25              jr      intp23e         ; and exit
848
849  04FA  A6 C3 02 intp23b   cp      r3,#2           ; second int23 since reset?
850  04FD  EB 10              jr      ne,intp23c
851  04FF  46 03 01           or      Sta_byte2,#%01  ; mark scanner alive status
852  0502  E6 35 01           ld      stat_req,#1     ; 8039 is ready to accept commands
853  0505  28 33              ld      r2,our_stat
854  0507  77 29              bits    r2,#cksm2       ; mark 8039 ready to accept commands
855  0509  29 33              ld      our_stat,r2
856  050B  1C 05              ld      r1,#5
857  050D  8B 10              jr      intp23e
858
859  050F  00 C3    intp23c   dec     r3              ; if third or more, normal scanner
860  0511  39 38              ld      int23cnt,r3     ; command
861  0513  8B 0A              jr      intp23e
```

```
862
863  0515  8F              intp23d  di                              ; if 8039 isn't on, disable interrupts
864  0516  56 03 FE                 and      Sta_byte2,#%FE         ; mark 8039 not on status bit
865  0519  E6 35 01                 ld       stat_req,#1            ; queue an unrequested status
866  051C  E6 38 00                 ld       int23cnt,#0
867
868  051F  50 C3           intp23e  pop      r3
869  0521  50 C2                    pop      r2
870  0523  BF                       iret
871
872                        int_p33:                                  ; hdw derived from msb on last byte
873
874                        ; Have EOT. r1 is size of output msg. (buff must be ≥ 0)
875                        ; semaphore to the
876                        ; UART code via out_len. (EOT not part of msg)
877
878  0524  4F                       sb0                              ; set register bank pointer
879  0525  E6 FC FF                 ld       P2AIP,#%ff              ; reset int pending reg (see 8.7.4)
880                                                                  ; in super8 book
881  0528  A6 C1 05                 cp       r1,#5                   ; zero length message (r1= 5 or 6)
882  052B  6B 05                    jr       eq,i33a0
883  052D  A6 C1 06                 cp       r1,#6
884  0530  EB 12                    jr       ne,intp33a
885  0532  70 C3           i33a0    push     r3
886  0534  E6 38 00                 ld       int23cnt,#0             ; clear int23 count
887  0537  3C 79                    ld       r3,#%79
888  0539  B7 31 00 80              lde      ls374,r3                ; sent cksm msg byte to buffer chip
889  053D  56 D3 FB                 and      p3,#%FB                 ; drop port 3 bit 2 handshake
890  0540  50 C3                    pop      r3
891  0542  8B 25                    jr       intp33c
892
893                        intp33a                                   ; label received from 8039
894
895  0544  E6 D6 C0                 ld       RP0,#%C0                ; note, r1 will contain # of char+1
896  0547  E6 F4 00                 ld       HOC,#%0                 ; turn off handshake and set T0 low
897  054A  56 D2 DF                 and      P2,#%df                 ; 1101 1111  P25 = T0
898  054D
899  054D  00 C1                    dec      r1                      ; set msg length
900  054F  19 28                    ld       out_len,r1
901  0551  70 C2                    push     r2
902  0553  36 C1 14                 sbc      r1,#20                  ; is the label longer that 15 bytes ?
903                                                                  ; (version D)
904  0556  5B 0F                    jr       mi,intp33b              ; if not, skip
905  0558
906                        ; if it is a version D label, must insert mtf byte 00 between
907                        ; last data byte and version id byte
908
909  0558  18 28                    ld       r1,out_len              ; restore r1
910  055A  00 C1                    dec      r1                      ; point to label id byte
911  055C  C7 21                    ld       r2,@r1                  ; save id byte
912  055E  D6 C1 00                 ld       @r1,#0                  ; set mtf byte to 0
913  0561  1E                       inc      r1                      ; point to new id byte location
914  0562  D7 12                    ld       @r1,r2                  ; load it
915  0564  1E                       inc      r1
916  0565  19 28                    ld       out_len,r1              ; set new message length
917  0567  50 C2           intp33b  pop      r2
918                                                                  ; semaphore to UART side (out_len ne 0)
919  0569  1C 05           intp33c  ld       r1,#5                   ; restore r1
920  056B  8F                       iret
921
922                        ;CODE CHECKSUM
923  056C  F0                       DB       f0H                     ; 1-13-89
924                        ;DATE
925  056D  01 13 89                 DB       01H,13H,89H
926                        ;PART NUMBER
927  0570  52 96 02 74              DB       'R',96H,02H,74H
928
929  0574                  vec_0
930  0574  6C 00                    ld       r6,#%0
```

```
931  0576                        vec_2
932  0576   6C 02          ld    r6,#%2
933  0578                        vec_4
934  0578   6C 04          ld    r6,#%4
935  057A                        vec_6
936  057A   6C 06          ld    r6,#%6
937  057C                        vec_c
938  057C   6C 0C          ld    r6,#%C
939  057E                        vec_e
940  057E   6C 0E          ld    r6,#%E
941  0580                        vec_10
942  0580   6C 10          ld    r6,#%10
943  0582                        vec_12
944  0582   6C 12          ld    r6,#%12
945  0584                        vec_14
946  0584   6C 14          ld    r6,#%14
947  0586                        vec_16
948  0586   6C 16          ld    r6,#%16
949  0588                        vec_18
950  0588   6C 18          ld    r6,#%18
951  058A                        vec_1a
952  058A   6C 1A          ld    r6,#%1a
953  058C                        vec_1c
954  058C   6C 1C          ld    r6,#%1c
955  058E                        vec_1e
956  058E   6C 1E          ld    r6,#%1e
957  0590   7C FF          ld    r7,#%ff
958  0592   79 FC          ld    P2AIP,r7      ; to clear int pending reg.
959  0594   79 FD          ld    P2BIP,r7
960  0596   BF             iret
961
962                              ends
963  0597                        end
963  0597                        end
```

| Defined | Symbol Name | Value |  | References |  |  |  |  |  |  |  |  |
|---|---|---|---|---|---|---|---|---|---|---|---|---|
| 360 | BCAST_tst |  | 0198 | 350 |  |  |  |  |  |  |  |  |
| Pre | CODE |  | 0000 | 175 | 177 | 962 |  |  |  |  |  |  |
| Pre | DATA |  | 0000 |  |  |  |  |  |  |  |  |  |
| 167 | EC | = | 0014 | 571 |  |  |  |  |  |  |  |  |
| 157 | EC_req |  | 0036 | 396 | 419 | 431 | 443 | 455 | 467 | 493 | 500 | 565 |
| 474 | GoodCmdRtn |  | 027E | 426 | 438 | 450 | 462 | 470 | 494 | 502 |  |  |
| 483 | GoodCmdRtn1 |  | 0291 | 481 |  |  |  |  |  |  |  |  |
| 145 | LblBuff1 |  | 0034 | 570 | 575 |  |  |  |  |  |  |  |
| 653 | MOX |  | 03C0 | 635 |  |  |  |  |  |  |  |  |
| 689 | MOX5 |  | 03F7 | 689 |  |  |  |  |  |  |  |  |
| 617 | MSG_OUT |  | 0382 | 557 | 574 | 592 | 737 |  |  |  |  |  |
| 660 | M_O_0 |  | 03C7 | 651 | 658 |  |  |  |  |  |  |  |
| 663 | M_O_1 |  | 03CC | 671 |  |  |  |  |  |  |  |  |
| 673 | M_O_2 |  | 03DA | 664 |  |  |  |  |  |  |  |  |
| 693 | M_O_3a |  | 03FD | 693 |  |  |  |  |  |  |  |  |
| 706 | M_O_4 |  | 0417 | 703 |  |  |  |  |  |  |  |  |
| 376 | NDilsr |  | 0183 | 372 |  |  |  |  |  |  |  |  |
| 645 | RRNotPending |  | 0384 | 638 | 642 |  |  |  |  |  |  |  |
| 149 | RR_pend | = | 0001 | 369 | 384 | 392 | 476 | 559 | 579 | 594 | 638 |  |
| 400 | RRa |  | 01D9 | 397 |  |  |  |  |  |  |  |  |
| Pre | RSECT |  | 0000 | 135 |  |  |  |  |  |  |  |  |
| 752 | SEND_EOP |  | 045A | 606 |  |  |  |  |  |  |  |  |
| 746 | SEND_NSA |  | 0452 | 546 |  |  |  |  |  |  |  |  |
| 741 | SEND_ROL |  | 044D | 541 |  |  |  |  |  |  |  |  |
| 724 | SEND_RR |  | 0431 | 603 |  |  |  |  |  |  |  |  |
| 365 | SNRM_tst |  | 01A0 | 362 |  |  |  |  |  |  |  |  |
| 150 | SNRMed | = | 0002 | 370 | 545 | 547 |  |  |  |  |  |  |
| 540 | SendROL |  | 02EC | 535 |  |  |  |  |  |  |  |  |
| 164 | Sta_byte1 | = | 0002 | 207 | 449 | 461 |  |  |  |  |  |  |
| 165 | Sta_byte2 | = | 0003 | 205 | 223 | 225 | 425 | 437 | 473 | 512 | 534 | 713 | 851 | 864 |
| 166 | Sta_byte3 | = | 0004 |  |  |  |  |  |  |  |  |  |
| 491 | SysCmd1 |  | 02A0 | 488 |  |  |  |  |  |  |  |  |

| | | | | | | | | | | | |
|---|---|---|---|---|---|---|---|---|---|---|---|
| 495 | SysCmd2 | | 02A8 | 490 | | | | | | | |
| 262 | addred | | 0106 | 258 | | | | | | | |
| 188 | chksm0 | | 007F | 201 | | | | | | | |
| 190 | chksm1 | | 0085 | 196 | 198 | | | | | | |
| 197 | chksm2 | | 0090 | 195 | | | | | | | |
| 202 | chksm3 | | 009C | 200 | | | | | | | |
| 780 | chksum | | 0480 | 298 | 630 | 670 | 678 | 683 | - | | |
| 152 | cksm2 | = | 0004 | 244 | 246 | 854 | | | | | |
| 428 | cmd1 | | 020E | 417 | | | | | | | |
| 438 | cmd1a | | 0228 | 422 | 434 | | | | | | |
| 440 | cmd2 | | 022A | 429 | | | | | | | |
| 450 | cmd2a | | 0244 | 446 | | | | | | | |
| 452 | cmd3 | | 0246 | 441 | | | | | | | |
| 462 | cmd3a | | 0261 | 458 | | | | | | | |
| 464 | cmd4 | | 0263 | 453 | | | | | | | |
| 730 | common_short | | 043C | 743 | 749 | | | | | | |
| 293 | crc0 | | 0138 | 285 | | | | | | | |
| 297 | crc1 | | 0140 | 300 | | | | | | | |
| 509 | dilsr | | 02C3 | 248 | 373 | | | | | | |
| 15 | dummy | = | 0000 | | | | | | | | |
| 885 | i33a0 | | 0532 | 882 | | | | | | | |
| 143 | in_buff | | 002A | 218 | 296 | 310 | 325 | 349 | 351 | 353 | 361 | 366 | 385 | 406 |
| | | | | 412 | 486 | | | | | | |
| 142 | in_len | | 0029 | 294 | | | | | | | |
| 159 | int23cnt | | 0038 | 208 | 839 | 841 | 860 | 866 | 886 | | |
| 820 | int_p23 | | 04C3 | 18 | | | | | | | |
| 872 | int_p33 | | 0524 | 18 | | | | | | | |
| 829 | intp23a | | 04D0 | 834 | | | | | | | |
| 849 | intp23b | | 04FA | 843 | | | | | | | |
| 859 | intr23c | | 050F | 850 | | | | | | | |
| 863 | intp23d | | 0515 | 833 | | | | | | | |
| 868 | intp23e | | 051F | 832 | 847 | 857 | 861 | | | | |
| 893 | intp33a | | 0544 | 884 | | | | | | | |
| 917 | intp33b | | 0567 | 904 | | | | | | | |
| 919 | intp33c | | 0569 | 891 | | | | | | | |
| 153 | lblsent | = | 0005 | 397 | 481 | 560 | 580 | 595 | 734 | | |
| 621 | lll1 | | 038A | 621 | | | | | | | |
| 756 | lll7 | | 0462 | 756 | | | | | | | |
| 168 | ls374 | = | 8000 | 715 | 845 | 888 | | | | | |
| 154 | lsrdsbl | = | 0006 | 372 | 375 | 538 | | | | | |
| 268 | me | | 0110 | 264 | | | | | | | |
| 805 | mk_ready | | 04AF | 399 | 482 | 542 | | | | | |
| 402 | no_RR | | 01DC | 384 | 388 | | | | | | |
| 384 | no_SNRM | | 01BC | 367 | | | | | | | |
| 531 | ok | | 02DC | | | | | | | | |
| 148 | online | = | 0000 | 245 | 371 | 402 | 533 | | | | |
| 144 | our_stat | | 0033 | 210 | 243 | 247 | 342 | 377 | 393 | 421 | 424 | 433 | 436 | 445 |
| | | | | 448 | 457 | 460 | 469 | 472 | 475 | 477 | 532 | 537 | 539 | 548 |
| | | | | 558 | 561 | 577 | 581 | 593 | 596 | 637 | 733 | 735 | 835 | 837 |
| | | | | 853 | 855 | | | | | | |
| 140 | out_buff | | 0000 | 554 | 567 | 568 | 570 | 571 | 572 | 575 | 578 | 588 | 701 | 729 |
| | | | | 731 | 732 | 742 | 747 | | | | |
| 141 | out_len | | 0028 | 585 | 587 | 815 | 900 | 909 | 916 | | |
| 273 | p_4_a | | 011A | 286 | | | | | | | |
| 545 | p_4a | | 02F5 | 533 | | | | | | | |
| 552 | p_4b | | 0305 | 545 | | | | | | | |
| 565 | p_4c | | 0322 | 553 | | | | | | | |
| 585 | p_4d | | 034E | 566 | | | | | | | |
| 600 | p_4e | | 036E | 586 | | | | | | | |
| 606 | p_4f | | 037C | 601 | | | | | | | |
| 325 | poll10 | | 0171 | 316 | | | | | | | |
| 331 | poll11 | | 017F | 317 | | | | | | | |
| 220 | poll2 | | 0089 | 252 | 256 | 260 | 266 | 522 | | | |
| 251 | poll2a | | 00EE | 244 | 245 | | | | | | |
| 254 | poll3 | | 00F3 | | | | | | | | |
| 258 | poll4 | | 00FB | | | | | | | | |
| 279 | poll5 | | 0123 | 275 | 280 | | | | | | |
| 282 | poll6 | | 0128 | | | | | | | | |
| 286 | poll7 | | 0132 | 284 | | | | | | | |

| | | | | | | | | | | | | |
|---|---|---|---|---|---|---|---|---|---|---|---|---|
| 320 | poll9 | 0167 | 312 | | | | | | | | | |
| 524 | poll_4me | 02DC | | | | | | | | | | |
| 517 | polled | 02CC | 261 | 518 | | | | | | | | |
| 242 | pon_ovr | 00DC | 224 | 228 | 232 | 235 | | | | | | |
| 230 | scnr_on | 00CC | 222 | | | | | | | | | |
| 160 | scnroncnt | 0039 | 211 | 231 | 233 | 234 | 238 | | | | | |
| 158 | set_RR | 0037 | 480 | 562 | 582 | 597 | 600 | 602 | | | | |
| 643 | sssNEO | 03B2 | 640 | | | | | | | | | |
| 22 | start | 0020 | | | | | | | | | | |
| 156 | stat_req | 0035 | 226 | 249 | 395 | 418 | 430 | 442 | 454 | 466 | 492 | 501 | 549 |
| | | | 552 | 748 | 852 | 865 | | | | | | |
| 170 | sv11 | 003A | 674 | 679 | | | | | | | | |
| 486 | sys_cmd | 0294 | 414 | | | | | | | | | |
| 504 | sys_reset | 02B8 | 354 | 497 | | | | | | | | |
| 718 | t8039a | 042B | 718 | | | | | | | | | |
| 720 | t8039b | 042F | 711 | 714 | | | | | | | | |
| 721 | t8039c | 0430 | 719 | | | | | | | | | |
| 151 | t8039done | = 0003 | 422 | 423 | 434 | 435 | 446 | 447 | 458 | 459 | 470 | 471 | 836 |
| 708 | tell_8039 | 0418 | 420 | 432 | 444 | 456 | 468 | 506 | 511 | | | |
| 215 | uart_main | 00B0 | 270 | 287 | 303 | 305 | 324 | 330 | 352 | 358 | 363 | 380 | 400 |
| | | | 403 | 408 | 465 | 484 | 499 | 543 | 550 | 563 | 583 | 598 | 604 |
| | | | 607 | | | | | | | | | |
| 929 | vec_0 | 0574 | 17 | | | | | | | | | |
| 941 | vec_10 | 0580 | 19 | | | | | | | | | |
| 943 | vec_12 | 0582 | 19 | | | | | | | | | |
| 945 | vec_14 | 0584 | 19 | | | | | | | | | |
| 947 | vec_16 | 0586 | 19 | | | | | | | | | |
| 949 | vec_18 | 0588 | 20 | | | | | | | | | |
| 951 | vec_1a | 058A | 20 | | | | | | | | | |
| 953 | vec_1c | 058C | 20 | | | | | | | | | |
| 955 | vec_1e | 058E | 20 | | | | | | | | | |
| 931 | vec_2 | 0576 | 17 | | | | | | | | | |
| 933 | vec_4 | 0578 | 17 | | | | | | | | | |
| 935 | vec_6 | 057A | 17 | | | | | | | | | |
| 937 | vec_c | 057C | 18 | | | | | | | | | |
| 939 | vec_e | 057E | 18 | | | | | | | | | |
| 405 | we_is_on | 01E2 | 402 | | | | | | | | | |

Lines Assembled : 963     Assembly Errors : 0

It can be seen therefore that the scanner of the present invention, including an internal interface, provides significant advantages over prior art systems of the type including a separate interface connecting a scanner to the cash register system. Furthermore, it will be appreciated that this interface circuit produces superior communication between the scanner and the cash register system.

Having described the invention in detail and by reference to the preferred embodiment thereof, it will be apparent that other modifications and variations are possible without departing from the scope of the invention defined in the appended claims.

What is claimed is:

1. An optical scanner for determining information relating to products to be purchased and providing such information to a cash register system, said scanner scanning coded labels on said products and providing a signal indicative of the coded label data, comprising:

scanning controller means, mounted in and responsive to said optical scanner, for identifying the data on said bar code labels, and interface means, mounted in said optical scanner and responsive to said scanning controller means, for providing coded label data to said cash register system, said interface means including an interface microprocessor, responsive to coded label data from said scanning controller means, interface memory means for storing control software for use by said interface microprocessor, and a driver circuit, responsive to said interface microprocessor, for supplying coded label data to said cash register system.

2. An optical scanner as claimed in claim 1, in which said scanning controller means includes a bar code decoder circuit for decoding scan signals to provide coded label data, a scanner microprocessor for correlating coded label data and supplying said coded label data to said interface means, and scanner memory means for storing control software for use by said scanner microprocessor.

3. An optical scanner for use at a checkout counter to determine information relating to products to be purchased, including coded label data, and to supply said information to a cash register system, comprising:

a scanner controller for reading coded labels on said products, and an interface circuit, mounted in said scanner and receiving power therefrom, for providing coded label data to said cash register system, said interface circuit including an interface microprocessor, responsive to coded label data from said optical scanning means, memory means for storing control software for use by said interface microprocessor, and a driver circuit, responsive to said interface microprocessor, for providing coded label data to said cash register system.

4. An optical scanner for use at a checkout counter as claimed in claim 3, in which said scanner controller includes a bar code decoder circuit for decoding scan signals to provide coded label data, a scanner microprocessor for correlating coded label data and supplying said coded label data to said interface circuit, and memory means for storing control software for use by said scanner microprocessor.

5. An optical scanner for determining information relating to products to be purchased and providing such information to a cash register system, said scanner scanning coded labels on said products and providing a signal indicative of the coded label data, comprising:

scanning controller means, mounted in and responsive to said optical scanner, for identifying the data on said bar code labels, interface means, mounted in said optical scanner and responsive to said scanning controller means, for providing coded label data to said cash register system, and interface power means for providing power to said interface means, said interface power means providing power from said scanner as long as such power is available and, subsequently, providing power for said interface from said cash register system.

6. An optical scanner as claimed in claim 5, in which said scanning controller means includes a bar code decoder circuit for decoding scan signals to provide coded label data, a scanner microprocessor for correlating coded label data and supplying said coded label data to said common interface circuit, and scanner memory means for storing control software for use by said scanner microprocessor.

7. An optical scanner as claimed in claim 5, in which said interface means comprises an interface microprocessor, responsive to coded label data from said scanning controller means, interface memory means for storing control software for use by said interface microprocessor, and a driver circuit, responsive to said interface microprocessor, for supplying coded label data to said cash register system.

8. An optical scanner for use at a checkout counter to determine information relating to products to be purchased, including coded label data, and to supply said information to a cash register system, comprising:

a scanner controller for reading coded labels on said products, an interface circuit, mounted in said scanner and receiving power therefrom, for providing coded label data to said cash register system, and an interface power means for providing power to said interface means, said interface power means providing power from said scanner as long as such power is available and, subsequently, providing power for said interface from said cash register system.

9. An optical scanner for use at a checkout counter as claimed in claim 8, in which said scanner controller includes a bar code decoder circuit for decoding scan signals to provide coded label data, a scanner microprocessor for correlating coded label data and supplying said coded label data to said interface circuit, and memory means for storing control software for use by said scanner microprocessor.

10. An optical scanner for use at a checkout counter as claimed in claim 8, in which said interface circuit comprises an interface microprocessor, responsive to coded label data from said optical scanning means, memory means for storing control software for use by said interface microprocessor, and a driver circuit, responsive to said interface microprocessor, for providing coded label data to said cash register system.

* * * * *